(12) United States Patent
Yamauchi

(10) Patent No.: US 8,941,628 B2
(45) Date of Patent: *Jan. 27, 2015

(54) PIXEL CIRCUIT AND DISPLAY DEVICE

(75) Inventor: Yoshimitsu Yamauchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 279 days.

This patent is subject to a terminal disclaimer.

(21) Appl. No.: 13/392,952

(22) PCT Filed: May 24, 2010

(86) PCT No.: PCT/JP2010/058744
§ 371 (c)(1),
(2), (4) Date: Feb. 28, 2012

(87) PCT Pub. No.: WO2011/027600
PCT Pub. Date: Mar. 10, 2011

(65) Prior Publication Data
US 2012/0154369 A1 Jun. 21, 2012

(30) Foreign Application Priority Data

Sep. 7, 2009 (JP) .................. 2009-206474

(51) Int. Cl.
*G09G 5/00* (2006.01)
*G09G 3/36* (2006.01)
*G02F 1/1362* (2006.01)

(52) U.S. Cl.
CPC .......... *G09G 3/3659* (2013.01); *G02F 1/13624* (2013.01); *G09G 2300/0852* (2013.01)
USPC ........................................... 345/204; 345/87

(58) Field of Classification Search
CPC . G09G 3/3225; G09G 3/3223; G09G 3/3241; G09G 3/325; G09G 3/3258; G09G 3/3614; G09G 3/3648; G09G 2300/0809; G09G 2300/0814; G09G 2300/0819; G09G 2300/0823

USPC .................. 345/1.1–111, 156–184, 204–215, 345/690–699
See application file for complete search history.

(56) References Cited

U.S. PATENT DOCUMENTS 8,089,570 B2 *   1/2012   Kim et al. ........................ 349/37
8,339,531 B2 * 12/2012   Yamauchi ........................ 349/41
(Continued)

FOREIGN PATENT DOCUMENTS

CN          1771529       5/2006
JP          4-060581 A    2/1992
(Continued)

OTHER PUBLICATIONS

International Search Report.

*Primary Examiner* — Gene W Lee
(74) *Attorney, Agent, or Firm* — Harness, Dickey & Pierce

(57) ABSTRACT

A display device includes liquid crystal capacitor element formed between a pixel electrode and a counter electrode. One terminals of the pixel electrode, a first switch circuit, and a second switch circuit, and a first terminal of a second transistor form an internal node. The first switch circuit and the second switch circuit have other terminals connected to a source line. The second switch circuit is configured by a series circuit of transistors, and a control terminal of the transistor, a second terminal of the transistor, and one terminal of a boost capacitor element form an output node. The other terminal of the boost capacitor element is connected to a boost line, the control terminal of the transistor is connected to a reference line, and the control terminal of the transistor is connected to a selecting line.

27 Claims, 35 Drawing Sheets

(56) References Cited

U.S. PATENT DOCUMENTS

| | | |
|---|---|---|
| 2003/0016202 A1 | 1/2003 | Edwards et al. |
| 2003/0164685 A1* | 9/2003 | Inukai ................... 315/169.3 |
| 2004/0130544 A1 | 7/2004 | Sun |
| 2007/0040785 A1 | 2/2007 | Edwards et al. |
| 2007/0052644 A1* | 3/2007 | Uchino et al. ............... 345/92 |
| 2009/0002582 A1 | 1/2009 | Sano |
| 2009/0015744 A1* | 1/2009 | Sekine ........................ 349/39 |
| 2009/0135170 A1 | 5/2009 | Hashimoto |
| 2009/0190052 A1* | 7/2009 | Jung et al. .................. 349/38 |
| 2009/0268112 A1* | 10/2009 | Lu et al. ...................... 349/38 |
| 2009/0303220 A1* | 12/2009 | You et al. .................... 345/211 |
| 2010/0118059 A1* | 5/2010 | Senda ......................... 345/690 |
| 2010/0123842 A1* | 5/2010 | Lee et al. ..................... 349/39 |
| 2010/0177083 A1* | 7/2010 | Yamashita ................. 345/211 |
| 2012/0299899 A1* | 11/2012 | Yamauchi ................. 345/211 |

FOREIGN PATENT DOCUMENTS

| | | |
|---|---|---|
| JP | 2004-212924 A | 7/2004 |
| JP | 2005-018088 A | 1/2005 |
| JP | 2006-343563 A | 12/2006 |
| JP | 2007-334224 A | 12/2007 |

\* cited by examiner

PIXEL CIRCUIT AND DISPLAY DEVICE

CROSS-REFERENCE TO RELATED APPLICATIONS

This application is a National Phase filing under 35 U.S.C. §371 of International Application No. PCT/JP2010/058744 filed on May 24, 2010, and which claims priority to Japanese Patent Application No. 2009-206474 filed on Sep. 7, 2009.

TECHNICAL FIELD

The present invention relates to a pixel circuit and a display device including the pixel circuit and, in particular, an active-matrix type display device.

BACKGROUND ART

In a mobile terminal such as a cellular phone or a mobile game console, a liquid crystal display device is generally used as a display means. Since a cellular phone is driven by a battery, a power consumption is strongly required to be reduced. For this reason, information such as time or a battery life that is required to be always displayed is displayed on a reflective sub-panel. In recent years, on the same main panel, a normal display by a full-color display and a reflective always-on display have been required to be compatible.

FIG. 34 shows an equivalent circuit of a pixel circuit in a general active-matrix type liquid crystal display device. FIG. 35 shows a circuit arrangement of an active-matrix type liquid crystal display device having m×n pixels. Both reference symbols m and n denote integers each of which is 2 or more.

As shown in FIG. 35, switch elements configured by thin-film transistors (TFTs) are arranged at intersections between m source lines SL1, SL2, . . . , SLm and n scanning lines GL1, GL2, . . . , GLn. In FIG. 34, the source lines SL1, SL2, . . . , SLm are represented by a source line SL, and, similarly, the scanning lines GL1, GL2, . . . , GLn are represented by a symbol GL.

As shown in FIG. 34, a liquid crystal capacitor element Clc and an auxiliary capacitor element Cs are connected in parallel to each other through a TFT. The liquid crystal capacitor element Clc is configured by a laminated structure in which a liquid crystal layer is formed between a pixel electrode 20 and a counter electrode 80. The counter electrode is also called a common electrode.

In FIG. 35 simply shows only a TFT and a pixel electrode (black rectangular portion) in each pixel circuit.

The auxiliary capacitor element Cs has one terminal (one electrode) connected to the pixel electrode 20 and the other terminal (other electrode) connected to an auxiliary capacitor line CSL to stabilize a voltage of pixel data held in the pixel electrode 20. The auxiliary capacitor element Cs advantageously suppresses a voltage of pixel data held in a pixel electrode from varying due to generation of a leakage current in the TFT, a variation in electric capacitance of the liquid crystal capacitor element Clc between a black display and a white display caused by dielectric anisotropy held by liquid crystal molecules, a variation in voltage through a parasitic capacitance between a pixel electrode and a peripheral wire, and the like. Voltages of the scanning lines are sequentially controlled to set TFTs connected to one scanning line to a conducting state, and voltages of pixel data supplied to source lines in units of scanning lines are programmed in corresponding pixel electrodes, respectively.

In a normal display by a full-color display, even though display contents are a still image, the same display contents are repeatedly programmed in the same pixel for each frame. In this manner, the voltages of the pixel data held in the pixel electrodes are updated to minimize a variation in voltage of the pixel data and to secure a display of a high-quality still image.

A power consumption to drive a liquid crystal display device is almost controlled by a power consumption to drive a source line by a source driver, and is almost expressed by a relational expression represented by the following numerical expression 1. In numerical expression 1, reference symbol P denotes a power consumption; f, a refresh rate (the number of times of a refresh action of one frame per unit time); C, a load capacitance driven by a source driver; V, a drive voltage of the source driver; n, the number of scanning lines; and m, the number of source lines. In this case, the refresh action is an operation that applies a voltage to a pixel electrode through a source line while keeping display contents.

$$P \propto f \cdot C \cdot V^2 \cdot n \cdot m \qquad \text{(Numerical Expression 1)}$$

In the always-on display, since the display contents are a still image, the voltage of the pixel data need not be always updated for each frame. For this reason, in order to further reduce the power consumption of the liquid crystal display device, a refresh frequency in the always-on display state is lowered. However, when the refresh frequency is lowered, a pixel data voltage held in a pixel electrode varies by an influence of a leakage current of a TFT. The variation in voltage causes a variation in display luminance (transmittance of liquid crystal) of each pixel and becomes to be observed as flickers. Since an average potential in each frame period also decreases, deterioration of display quality such as insufficient contrast may be probably caused.

In this case, as a method of simultaneously realizing a solution of a problem of deterioration of display quality caused by a decrease in refresh frequency in an always-on display of a still image such as a display of a battery life or time and a reduction in power consumption, for example, a configuration described in the following Patent Document 1 is disclosed. In the configuration disclosed in Patent Document 1, liquid crystal displays by both transmissive and reflective functions are possible. Furthermore, a memory unit is arranged in a pixel circuit in a pixel area in which a reflective liquid crystal display can be obtained. The memory unit holds information to be displayed in a reflective liquid crystal display unit as a voltage signal. In a reflective liquid crystal display state, a voltage held in the memory unit of the pixel circuit is read to display information corresponding to the voltage.

In Patent Document 1, the memory unit is configured by an SRAM, and the voltage signal is statically held. For this reason, a refresh action is not required, maintenance of display quality and a reduction in power consumption can be simultaneously realized.

PRIOR ART

Patent Document

[Patent Document 1] Unexamined Japanese Patent Publication No. 2007-334224

DISCLOSURE OF THE INVENTION

Problem to be Solved by the Invention

However, when the above configuration is applied to a liquid crystal display device used in a cellular phone or the like, in addition to an auxiliary capacitor element to hold a voltage of each pixel data serving as analog information in a normal operation, a memory unit to store the pixel data needs to be arranged for each pixel or each pixel group. In this manner, since the numbers of elements and signal lines to be formed on an array substrate (active matrix substrate) that configures the display unit in the liquid crystal display device increase, an aperture ratio in a transmission mode decreases. When a polarity-inverted drive circuit to AC-drive a liquid crystal is arranged together with the memory unit, the aperture ratio further decreases. In this manner, when the aperture ratio decreases due to the increase in number of elements or signal lines, a luminance of a display image decreases in a normal display mode.

In the liquid crystal display device, in a display of a still image obtained by an always-on display, in addition to the problem of a variation in voltage in a pixel electrode, a problem in which, when a voltage of the same polarity is continuously applied across a pixel electrode and a counter electrode, a small amount of ionic impurity contained in a liquid crystal layer is concentrated on any one of the pixel electrode and the counter electrode to cause the entire display screen to burn is posed. For this reason, in addition to the refresh action, a polarity inverting action to invert polarities of a voltage applied across the pixel electrode and the counter electrode is necessary.

In each of the normal display and the always-on display, in a display of a still image, as the polarity inverting action, an operation that stores pixel data of 1 frame in a frame memory and repeatedly programs a voltage corresponding to the pixel data while a polarity determined with reference to the counter electrode is inverted in each case is performed. For this reason, as described above, an operation that drives a scanning line and a source line from the outside and programs voltages of pixel data supplied to the source lines in units of scanning lines in the pixel electrodes, respectively, is necessary.

Thus, in an always-on display required to be operated with a low power consumption, when the scanning line and the source line are driven from the outside to perform the polarity inverting action, a larger power consumption occurs because a voltage amplitude of the pixel electrode is larger than that in the refresh action.

The present invention has been made in consideration of the above problems and, it is an object of the present invention to provide a pixel circuit and a display device that can prevent deteriorations of a liquid crystal and display quality with a low power consumption without causing a decrease in aperture ratio.

Means for Solving the Problem

In order to achieve the above object, the pixel circuit according to the present invention is characterized to employ the following configuration.

A pixel circuit according to the present invention includes:
a display element unit including a unit display element;
an internal node that configures a part of the display element unit and holds a voltage of pixel data applied to the display element unit;
a first switch circuit that transfers the voltage of the pixel data supplied from a data signal line to the internal node through at least predetermined switch element;
a second switch circuit that transfers the voltage supplied from the data signal line to the internal node without passing through the predetermined switch element; and
a control circuit that holds a predetermined voltage depending on the voltage of the pixel data held by the internal node at one terminal of a first capacitor element and controls connection/disconnection of the second switch circuit.

The pixel circuit includes first to third transistor elements each having a first terminal, a second terminal, and a control terminal that controls connection between the first and second terminals. Of the transistor elements, the first and third transistor elements are arranged in the second switch circuit and the second transistor element is arranged in the control circuit. The second switch circuit is configured by a series circuit having the first transistor element and the third transistor element, and the control circuit is configured by a series circuit having the second transistor element and the first capacitor element.

Both the first switch circuit and the second switch circuit have one terminals connected to the data signal line, and the other terminals connected to the internal node. The first terminal of the second transistor element is also connected to the internal node.

The control terminal of the first transistor element, the second terminal of the second transistor element, and one terminal of the first capacitor element are connected to each other to form a node. A control terminal of the second transistor element is connected to a first control line, and a control terminal of the third transistor element is connected to a second control line. Furthermore, the other terminal of the first capacitor element (i.e. the terminal which does not form the node) is connected to the second control line or a third control line.

In addition to the configuration, a second capacitor element having one terminal connected to the internal node and having the other terminal connected to a fourth control line or a predetermined fixed voltage line may be further arranged.

The predetermined switch element is configured by a fourth transistor element having a first terminal, a second terminal, and a control terminal that controls connection between the first and second terminals, and
the control terminal of the fourth transistor element is preferably connected to a scanning signal line.

The first switch circuit also preferably has a configuration that does not include a switch element except for the predetermined switch element.

The first switch circuit is preferably configured by a series circuit of the third transistor element and the predetermined switch element in the second switch circuit or a series circuit of a fifth transistor having a control terminal connected to the control terminal of the third transistor element in the second switch circuit and the predetermined switch element.

Furthermore, a display device according to the present invention in which
a plurality of pixel elements each having the above characteristics are arranged in a row direction and a column direction to configure a pixel circuit array,
the data signal line is arranged for each of the columns one by one,
the pixel circuits arranged along the same column have one terminals of the first switch circuits connected to the common data signal line,
the pixel circuits arranged along the same row or the same column have the control terminals of the second transistor elements connected to the common first control line,
the pixel circuits arranged along the same row or the same column have the control terminals of the third transistor elements connected to the common second control line, and
the pixel circuits arranged along the same row or the same column have the other terminals of the first capacitor elements connected to the common second control line or the common third control line, the display device includes: a data signal line drive circuit that independently drives the data signal lines; and a control line drive circuit that independently drives the first to third control lines.

In addition to the above configuration, the first switch circuit does not include a switch element except for the predetermined switch element, the predetermined switch element is a fourth transistor element having a first terminal, a second terminal, and a control terminal that controls connection between the first and second terminals, the first terminal, the second terminal, and the control terminal are connected to the internal node, the data signal line, and a scanning signal line, respectively, the scanning signal line is arranged for each of the rows one by one, and the pixel circuits arranged along the same row are connected to the common scanning signal line, and a scanning signal line drive circuit that independently drives the scanning signal lines is preferably arranged.

The predetermined switch element is configured by a fourth transistor element having a first terminal, a second terminal, and a control terminal that controls connection between both the terminals, the first switch circuit is configured by a series circuit of a third transistor element in the second switch circuit and the fourth transistor element or a series circuit of a fifth transistor having a control terminal connected to the control terminal of the third transistor element in the second switch circuit and the fourth transistor element, one scanning signal line and the second control line are arranged for each of the rows, the control terminal of the fourth transistor element is connected to the scanning signal line, and the pixel circuits arranged along the same row are connected to the common scanning signal line and the common second control line, and a scanning signal line drive circuit that independently drives the scanning signal lines is preferably arranged.

With the above configuration, in a programming action to independently program the pixel data in the pixel circuits arranged along one selected row, the scanning signal line drive circuit preferably applies a predetermined selected row voltage to the scanning signal line of the selected row to set the fourth transistor elements arranged along the selected row to a conducting state and applies a predetermined non-selected row voltage to the scanning signal line of a non-selected row to set the fourth transistor elements arranged along the non-selected row to a non-conducting state, and the data signal line drive circuit independently applies data voltages corresponding to pixel data to be programmed in the pixel circuits of the columns of the selected row to the data signal lines, respectively.

At this time, in the programming action, the control line drive circuit may apply a predetermined voltage to the second control line to set the third transistor element to a non-conducting state.

In a programming action to independently program the pixel data in the pixel circuits arranged along one selected row, the scanning signal line drive circuit preferably applies a predetermined selected row voltage to the scanning signal line of the selected row to set the fourth transistor elements arranged along the selected row to a conducting state and applies a predetermined non-selected row voltage to the scanning signal line of a non-selected row to set the fourth transistor elements arranged along the non-selected row to a non-conducting state, the control line drive circuit preferably applies a predetermined selecting voltage to the second control line of the selected row to set the third transistor element to a conducting state and applies a predetermined non-selecting voltage to the second control line of the non-selected row to set the third transistor element to a non-conducting state, and the data signal line drive circuit preferably independently applies data voltages corresponding to the pixel data to be programmed in the pixel circuits of the columns of the selected row to the data signal lines, respectively.

In the programming action, the control line drive circuit preferably applies a predetermined voltage to the first control line to set the second transistor element to a conducting state.

Furthermore, the display device according to the present invention is characterized in that, in addition to the above characteristics, in a self-refresh action to operate the second switch circuits and the control circuits to simultaneously compensate for variations in voltage of the internal nodes in the plurality of pixel circuits in the case where the other terminals of the first capacitor elements are connected to the third control line, the scanning signal line drive circuit applies a predetermined voltage to the scanning signal lines connected to all the pixel circuits in the pixel circuit array to set the fourth transistor element to a non-conducting state, the control line drive circuit applies a predetermined voltage to the first control line so that when a voltage state of binary pixel data held by the internal node is the first voltage state, the second transistor element blocks a current flowing from the one terminal of the first capacitor element to the internal node, and when the voltage state is the second voltage state, the second transistor element is set to a conducting state, applies a predetermined voltage to the second control line to set the third transistor element to a conducting state, and applies a voltage pulse having a predetermined voltage amplitude to the third control line to give a change in voltage by a capacitive coupling through the first capacitor element to the one terminal of the first capacitor element, so that when a voltage of the internal node is in the first voltage state, the change in voltage is not suppressed and the first transistor element is set to a conducting state, and when the voltage of the internal node is in the second voltage state, the change in voltage is suppressed and the first transistor element is set to a non-conducting state, and the data signal line drive circuit supplies a voltage of the pixel data in the first voltage state to all the data signal lines connected to the plurality of pixel circuits targeted by the self-refresh action.

In the case where the other terminal of the first capacitor element is connected to the second control line, a voltage pulse having a predetermined voltage amplitude is applied to the second control line to set the third transistor element to a conducting state, a change in voltage by a capacitive coupling through the first capacitor element is given to the one terminal of the first capacitor element, so that when the voltage of the internal node is in the first voltage state, the change in voltage is not suppressed and the first transistor element is set to a conducting state, and when the voltage of the internal node is in the second voltage state, the change in voltage is suppressed and the first transistor element is set to a non-conducting state.

In addition to this, as another characteristic, in a standby state immediately after the self-refresh action is ended, the control line drive circuit applies a predetermined voltage to the second control line to set the third transistor element to a non-conducting state, and ends the application of the voltage pulse.

Furthermore, at this time, the self-refresh action is also preferably repeated through the standby state that is 10 or more times the self-refresh action period described above.

In the standby state, the control line drive circuit preferably applies a fixed voltage to the data signal line. The fixed voltage may be set in a second voltage state.

In addition to the above characteristics, the plurality of pixel circuits targeted by the self-refresh action are sectioned into one row unit or a plurality of row units, at least the second control line and the second control line or the third control line connected to the other terminal of the first capacitor element are drivably arranged in units of the sections, and the control line drive circuit, with respect to a section that is not targeted by the self-refresh action, preferably applies a predetermined voltage to set the third transistor element to a non-conducting state to the second control line or does not apply the voltage pulse to the second control line or the third control line connected to the other terminal of the first capacitor element, and sequentially switches the sections targeted by the self-refresh action to separately execute the self-refresh action for each of the sections.

When the first switch circuit has a configuration that does not include a switch element except for the fourth transistor element, the plurality of pixel circuits targeted by the self-refresh action are sectioned into one column unit or a plurality of column units, at least the second control line and the second control line or the third control line connected to the other terminal of the first capacitor element are drivably arranged in units of the sections, and the control line drive circuit, with respect to a section that is not targeted by the self-refresh action, preferably applies a predetermined voltage to set the third transistor element to a non-conducting state to the second control line or does not apply the voltage pulse to the second control line or the third control line connected to the other terminal of the first capacitor element, and sequentially switches the sections targeted by the self-refresh action to separately execute the self-refresh action for each of the sections.

The display device according to the present invention, in addition to the above characteristics, in which the first switch circuit does not include a switch element except for the fourth transistor element and the other terminal of the first capacitor element is connected to the third control line, the unit display element is configured by a liquid crystal display element including a pixel electrode, a counter electrode, and a liquid crystal layer interposed between the pixel electrode and the counter electrode, in the display element unit, the internal node is connected to the pixel electrode directly or through a voltage amplifier, and a counter electrode voltage supply circuit that supplies a voltage to the counter electrode is arranged, is characterized by executing a series of operations:

in a self-polarity-inverting action to operate the first switch circuits, the second switch circuits, and the control circuits to simultaneously invert polarities of voltages applied across the pixel electrodes and the counter electrodes in the plurality of pixel circuits, as an initial state setting action performed before the self-polarity-inverting action is started, the scanning signal line drive circuit applies a predetermined voltage to the scanning signal line connected to all the pixel circuits in the pixel circuit array to set the fourth transistor element to a non-conducting state, the control line drive circuit applies a predetermined voltage to the first control line to generate a voltage difference at the one terminal of the first capacitor element depending on whether a voltage state of binary pixel data held by the internal node is in a first voltage state or a second voltage state, applies a predetermined voltage to the second control line to set the third transistor element to a non-conducting state, and applies a predetermined initial voltage to the third control line, after the initial state setting action, the control line drive circuit applies a pulse having a predetermined voltage amplitude to the third control line to give a change in voltage by a capacitive coupling through the first capacitor element to the one terminal of the first capacitor element, so that when a voltage of the internal node is in the first voltage state, since the second transistor element is set to a non-conducting state, the change in voltage is not suppressed and the first transistor element is set to a conducting state, and when the voltage of the internal node is in the second voltage state, since the second transistor element is set to a conducting state, the change in voltage is suppressed and the first transistor element is set to a non-conducting state, and, thereafter, applies a predetermined voltage to the first control line to set the second transistor element to a non-conducting state regardless of a voltage state of the internal node, after the scanning signal line drive circuit, thereafter, applies a scanning voltage pulse having a predetermined voltage amplitude to all the scanning signal lines connected to the plurality of pixel circuits targeted by the self-polarity-inverting action to temporarily set the fourth transistor element to a conducting state, the scanning signal line drive circuit returns the fourth transistor element in a non-conducting state, the counter electrode voltage supply circuit changes the voltage applied to the counter electrode between the two voltage states after the second transistor element is set to a non-conducting state until the scanning signal line drive circuit ends application of the scanning voltage pulse, the control line drive circuit applies a predetermined voltage to the second control line to set the third transistor element to a conducting state for at least a predetermined period after the scanning signal line drive circuit ends the application of the scanning voltage pulse and, thereafter, stops pulse application to the third control line, and the data signal line drive circuit applies a voltage in the first voltage state, at least while the scanning signal line drive circuit applies the scanning voltage pulse, to all the data signal lines connected to the plurality of pixel circuits targeted by the self-polarity-inverting action, and applies a voltage in the second voltage state to all the voltage supply lines connected to the plurality of pixel circuits targeted by the self-polarity-inverting action for at least a partial period immediately before the control line drive circuit ends the application of the predetermined voltage to set the third transistor element to a conducting state to the second control line.

As another method, the display device may execute a series of operations in which, as an initial state setting action before the self-polarity-inverting action is started, the control line drive circuit applies a predetermined initial voltage to the third control line connected to the other terminal of the first capacitor element, after the initial state setting action, the control line drive circuit applies a voltage pulse having a predetermined voltage amplitude to the second control line and the third control line, stops pulse applications to the second control line and the third control line at least after the scanning signal drive circuit ends the application of the voltage pulse, and, for at least a partial period immediately before the pulse applications to the second control line and the third control line are ended, the data signal line control circuit applies a voltage in the second voltage state to all the data signal lines connected to the plurality of pixel circuits targeted by the self-polarity-inverting action.

On the other hand, the display device may execute a series of operations in which, when the first capacitor element is connected to the second control line, as an initial state setting action performed before the self-polarity-inverting action is started, the control line drive circuit applies a predetermined voltage to the second control line to set the third transistor element to a non-conducting state, after the initial state setting action, the control line drive circuit applies a pulse having a predetermined voltage amplitude to the second control line, at least after the scanning signal line drive circuit ends the application of the voltage pulse, stops the pulse application to the second control line, and, for at least a partial period immediately before the pulse application to the second control line is ended, the data signal line drive circuit applies a voltage in the second voltage state to all the data signal lines connected to the plurality of pixel circuits targeted by the self-polarity-inverting action.

In each of the above configurations, in the pixel circuit, when the first switch circuit is configured by a series circuit of the third transistor element and the fourth transistor element or a series circuit a fifth transistor having a control terminal connected to the control terminal of the third transistor in the second switch circuit and the fourth transistor element, the control line drive circuit, for at least a predetermined period from the voltage pulse application of the scanning signal line drive circuit to the end of the pulse application, may apply a predetermined voltage to set the third transistor element to a conducting state to the second control line, thereafter, stop the pulse application to the second control line or the third control line connected to the other terminal of the first capacitor element.

At this time, when the first capacitor element is connected to the third control line, the second control line and the third control line may be driven at the same timing. Furthermore, even though the first capacitor element is connected to the second control line, the second control line and the third control line can be driven by the same method as described above.

A display device according to the present invention, as another characteristic, in which the pixel circuit has a configuration in which the first switch circuit does not include a switch element except for the fourth transistor element and the other terminal of the first capacitor element is connected to the third control line, the unit display element is configured by a liquid crystal display element including a pixel electrode, a counter electrode, and a liquid crystal layer interposed between the pixel electrode and the counter electrode, in the display element unit, the internal node is connected to the pixel electrode directly or through a voltage amplifier, and a counter electrode voltage supply circuit that supplies a voltage to the counter electrode is arranged, is characterized by executing a series of operations:

in a self-polarity-inverting action to operate the first switch circuits, the second switch circuits, and the control circuits to simultaneously invert polarities of voltages applied across the pixel electrodes and the counter electrodes in the plurality of pixel circuits, as an initial state setting action performed before the self-polarity-inverting action is started, the scanning signal line drive circuit applies a predetermined voltage to the scanning signal line connected to all the pixel circuits in the pixel circuit array to set the fourth transistor element to a non-conducting state, the control line drive circuit applies a predetermined voltage to the first control line so that a voltage difference is generated at the one terminal of the first capacitor element depending on whether a voltage state of binary pixel data held by the internal node is a first voltage state or a second voltage state, and in the case where the voltage of the first or second terminal of the first transistor element is set in the second voltage state, the first transistor element is set to a conducting state when the internal node is in the first voltage state, and the first transistor element is set to a non-conducting state when the internal node is in the second voltage state, due to the voltage difference at the one terminal of the first capacitor element, applies a predetermined voltage to the second control line to set the third transistor element to a non-conducting state, and applies a predetermined initial voltage to the third control line connected to the other terminal of the first capacitor element, after the initial state setting action, the control line drive circuit applies a predetermined voltage to the first control line to set the second transistor element to a non-conducting state regardless of whether the internal node is in the first voltage state or the second voltage state, after the scanning signal line drive circuit, thereafter, applies a pulse having a predetermined voltage amplitude to all the scanning signal lines connected to the plurality of pixel circuits targeted by the self-polarity-inverting action to temporarily set the fourth transistor element to a conducting state, the scanning signal line drive circuit returns the fourth transistor element in a non-conducting state, the counter electrode voltage supply circuit changes the voltage applied to the counter electrode between the two voltage states after the second transistor element is set to a non-conducting state until the scanning signal line drive circuit ends application of the voltage pulse, the control line drive circuit applies a predetermined voltage to the second control line to set the third transistor element to a conducting state for at least a predetermined period after the scanning signal line drive circuit ends application of the voltage pulse, and the data signal line drive circuit applies a voltage in the first voltage state, at least while the scanning signal line drive circuit applies the voltage pulse, to all the data signal lines connected to the plurality of pixel circuits targeted by the self-polarity-inverting action, and applies a voltage in the second voltage state to all the data signal lines connected to the plurality of pixel circuits targeted by the self-polarity-inverting action for at least a partial period immediately before the control line drive circuit ends the application of a predetermined voltage to set the third transistor element to a conducting state to the second control line.

On the other hand, in the pixel circuit, when the other terminal of the first capacitor element is connected to the third control line and the first switch circuit is configured by a series circuit of the third transistor element and the fourth transistor element or a series circuit of a fifth transistor having a control terminal connected to the control terminal of the third transistor element in the second switch circuit and the fourth transistor element, after the initial state setting action, the control line drive circuit, for at least a predetermined period from the voltage pulse application of the scanning signal line drive circuit to the end of the pulse application, may apply a predetermined voltage to set the third transistor element to a conducting state to the second control line.

Furthermore, in addition to the above characteristics, when the pixel circuit includes a second capacitor element having one terminal connected to the internal node and the other terminal connected to a fixed voltage line, after the scanning signal line drive circuit ends application of the voltage pulse, a variation in voltage of the internal node caused when the application of the voltage pulse is ended is preferably compensated for by adjusting a voltage of the fixed voltage line.

Effect of the Invention

With the configuration of the present invention, in addition to a normal programming action, action (self-refresh action) that returns an absolute value of a voltage across both the terminals of the display element unit to a value in the immediately previous programming action without performing a programming action. As in a liquid crystal display device, in a display device that requires a polarity inverting action, an action to invert a polarity of a voltage across both the terminals of the display element unit can be executed without performing a programming action (self-polarity-inverting action).

When a plurality of pixel circuits are arranged, a normal programming action is generally executed for each row. For this reason, at the maximum, driver circuits the number of which is equal to the number of rows of the arranged pixel circuits need to be driven.

According to the pixel circuit of the present invention, a self-refresh operation is performed to make it possible to simultaneously execute refresh action to all the plurality of pixels that are maximally arranged. For this reason, the number of times of driving of a driver circuit required from the start of the refresh action to the end thereof can be maximally reduced to make it possible to realize a low power consumption.

Since a memory unit such as an SRAM need not be additionally arranged in the pixel circuit, an aperture does not decrease unlike in the conventional art.

Furthermore, according to the pixel circuit of the present invention, a self-polarity-inverting action is performed to make it possible to simultaneously execute a polarity inverting action to all the plurality of pixels that are maximally arranged. In comparison with polarity inversion performed by a normal programming action, the number of times of driving of a driver circuit required from the start of the polarity inverting action to the end thereof can be maximally reduced to make it possible to realize a low power consumption.

According to the pixel circuit and the display device according to the present invention, the self-refresh action and the self-polarity-inverting action can be arbitrarily combined to each other. Thus, an effect of a reduction in power consumption in an image display can be further improved.

BEST MODE FOR CARRYING OUT THE INVENTION

Figure 34:
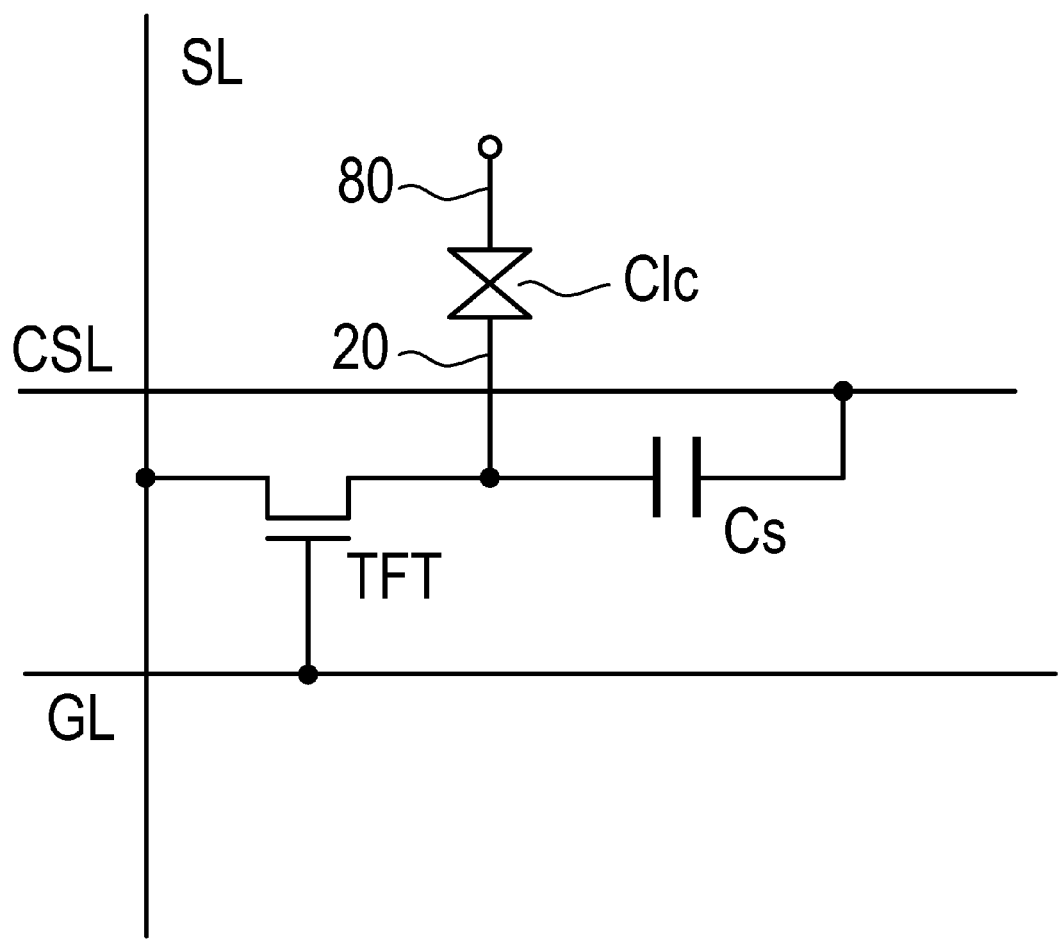
FIG. 34 is an equivalent circuit diagram of a pixel circuit in a general active-matrix type liquid crystal display device.
Figure 35:
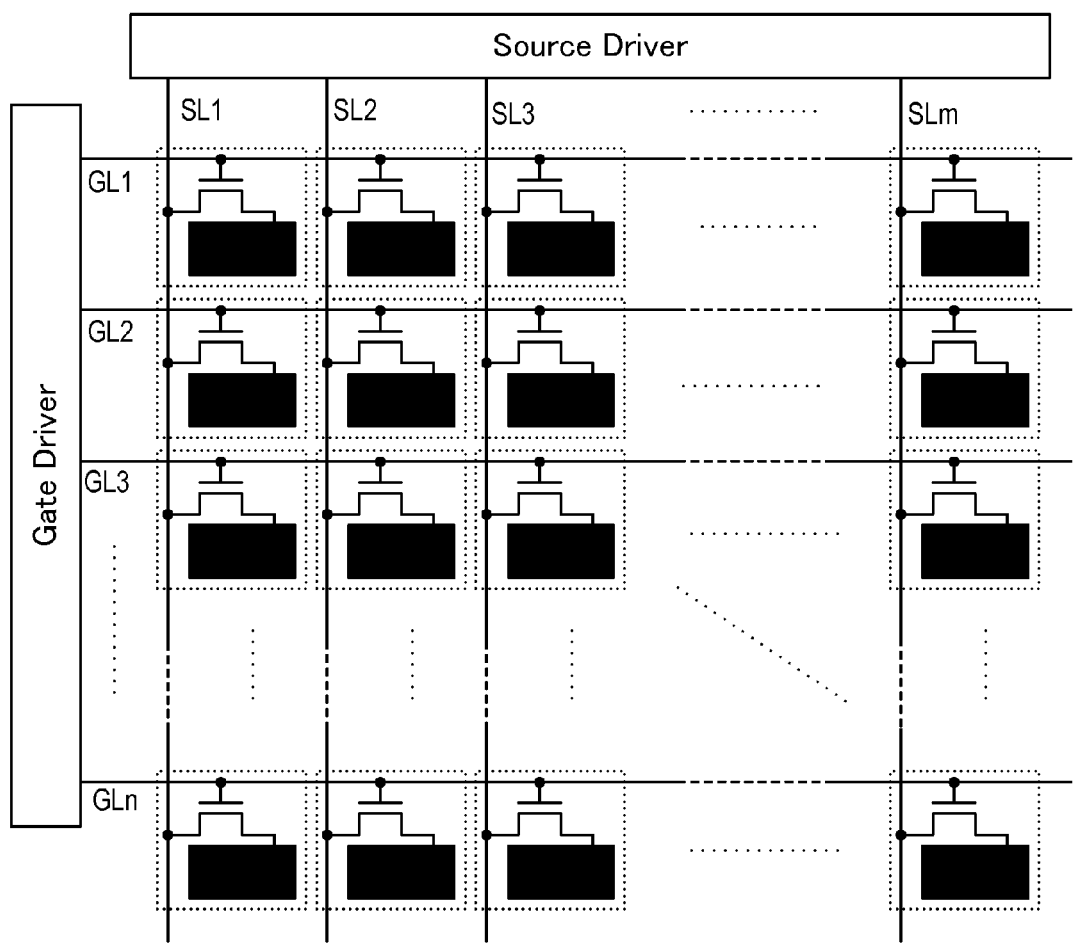
FIG. 35 is a block diagram showing a circuit arrangement of an active-matrix type liquid crystal display device having m×n pixels.

Embodiments of a pixel circuit and a display device of the present invention will be described below with reference to the accompanying drawings. The same reference numerals as in FIGS. 34 and 35 denote the same constituent elements in the embodiments.

First Embodiment

In the first embodiment, configurations of a display device of the present invention (to be simply referred to as a "display device" hereinafter) and a pixel circuit of the present invention (to be simply referred to as a "pixel circuit" hereinafter) will be described below.

<Display Device>

Figure 1:
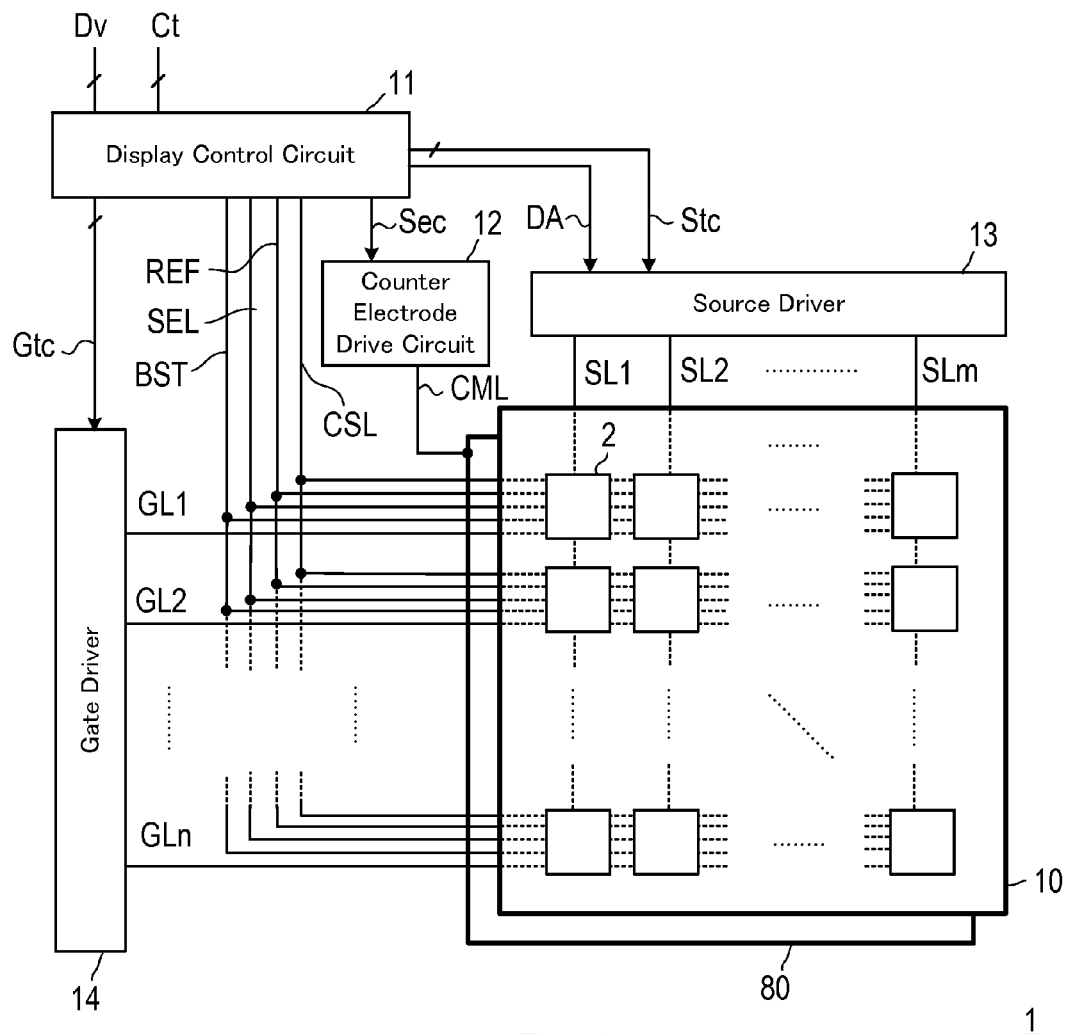
FIG. 1 is a block diagram showing an example of a schematic configuration of a display device according to the present invention.

FIG. 1 shows a schematic configuration of a display device 1. The display device 1 includes an active matrix substrate 10, a counter electrode 80, a display control circuit 11, a counter electrode drive circuit 12, a source driver 13, a gate driver 14, and various signal lines (will be described later). On the active matrix substrate 10, a plurality of pixel circuits 2 are arranged in row and column directions to form a pixel circuit array.

In FIG. 1, to avoid the drawings from being complex, the pixel circuits 2 are displayed to be blocked. In order to clarify that the various signal lines are formed on the active matrix substrate 10, for descriptive convenience, the active matrix substrate 10 is shown on the upper side of the counter electrode 80.

In the embodiment, the display device 1 has a configuration in which the same pixel circuits 2 are used to make it possible to perform screen display in two display modes including a normal display mode and an always-on display mode. The normal display mode is a display mode that displays a moving image or a still image in full color and uses a transmissive liquid crystal display using a back light. On the other hand, the always-on display mode of the embodiment is a display mode that performs two-tone (white and black) display in units of pixel circuits and allocates the three adjacent pixel circuits 2 to three primary colors (R, G, and B), respectively, to display eight colors. Furthermore, in the always-on display mode, a plurality of sets of three adjacent pixel circuits can also be combined to each other to increase the number of display colors by area coverage modulation. The always-on display mode according to the embodiment is a technique that can be used in transmissive liquid crystal display or reflective liquid crystal display.

In the following explanation, for descriptive convenience, a minimum display unit corresponding to one pixel circuit 2 is called a "pixel", and "pixel data" programmed in each of the pixel circuits serves as tone data of each color in color display in three primary colors (R, G, and B). When color display is to be performed by using, in addition to the three primary colors, white and black luminance data, the luminance data is included in pixel data.

Figure 2:
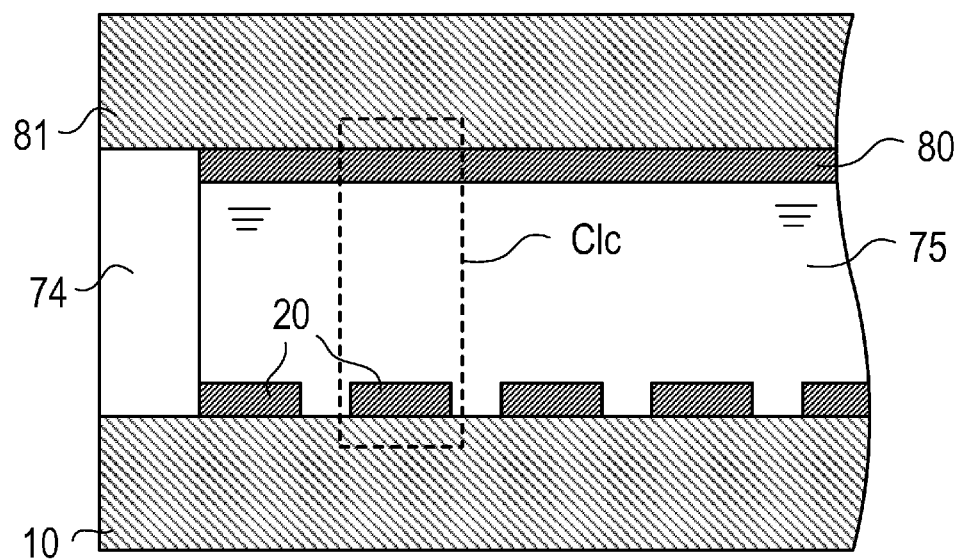
FIG. 2 is a schematic structural diagram of a partial section of a liquid display device.

FIG. 2 is a schematic sectional structural diagram showing a relation between the active matrix substrate 10 and the counter electrode 80, and shows a structure of a display element unit 21 (see FIG. 4) serving as a constituent element of the pixel circuit 2. The active matrix substrate 10 is a light-transmitting transparent substrate made of, for example, glass or plastic.

As illustrated in FIG. 1, the pixel circuits 2 including signal lines are formed on the active matrix substrate 10. In FIG. 2, the pixel electrode 20 is illustrated as a representative of a constituent element of the pixel circuit 2. The pixel electrode 20 is made of a light-transmitting transparent conductive material, for example, ITO (indium tin oxide).

A light-transmitting counter substrate 81 is arranged to face the active matrix substrate 10, and a liquid crystal layer 75 is held in a gap between both the substrates. Deflection plates (not shown) are stuck to outer surfaces of both the substrates.

The liquid crystal layer 75 is sealed by a seal member 74 at the peripheral portions of both the substrates. On the counter substrate 81, the counter electrode 80 made of a light-transmitting transparent conductive material such as ITO is formed to face the pixel electrode 20. The counter electrode 80 is formed as a single film to spread on an almost entire surface of the counter substrate 81. In this case, a unit liquid crystal display element Clc (see FIG. 4) is formed by one pixel electrode 20, the counter electrode 80, and the liquid crystal layer 75 held therebetween.

A back light device (not shown) is arranged on a rear surface side of the active matrix substrate 10 to make it possible to emit light oriented from the active matrix substrate 10 to the counter substrate 81.

As shown in FIG. 1, a plurality of signal lines are formed in vertical and horizontal directions on the active matrix substrate 10. The plurality of pixel circuits 2 are formed in the form of a matrix at positions where m source lines (SL1, SL2, ..., SLm) extending in the vertical direction (column direction) and n gate lines (GL1, GL2, ..., GLn) extending in the horizontal direction (row direction). Both reference symbols m and n denote natural numbers that are 2 or more. Each of the source lines is represented by a "source line SL", and each of the gate lines is represented by a "gate line GL".

In this case, the source line SL corresponds to a "data signal line", and the gate line GL corresponds to a "scanning signal lines". The source driver 13 corresponds to a "data signal line drive circuit", the gate driver 14 corresponds to a "scanning signal line drive circuit", the counter electrode drive circuit 12 corresponds to a "counter electrode voltage supply circuit", and a part of the display control circuit 11 corresponds to a "control line drive circuit".

In FIG. 1, the display control circuit 11 and the counter electrode drive circuit 12 are shown to be independent of the source driver 13 and the gate driver 14. However, in the drivers, the display control circuit 11 and the counter electrode drive circuit 12 may be included.

Figure 3:
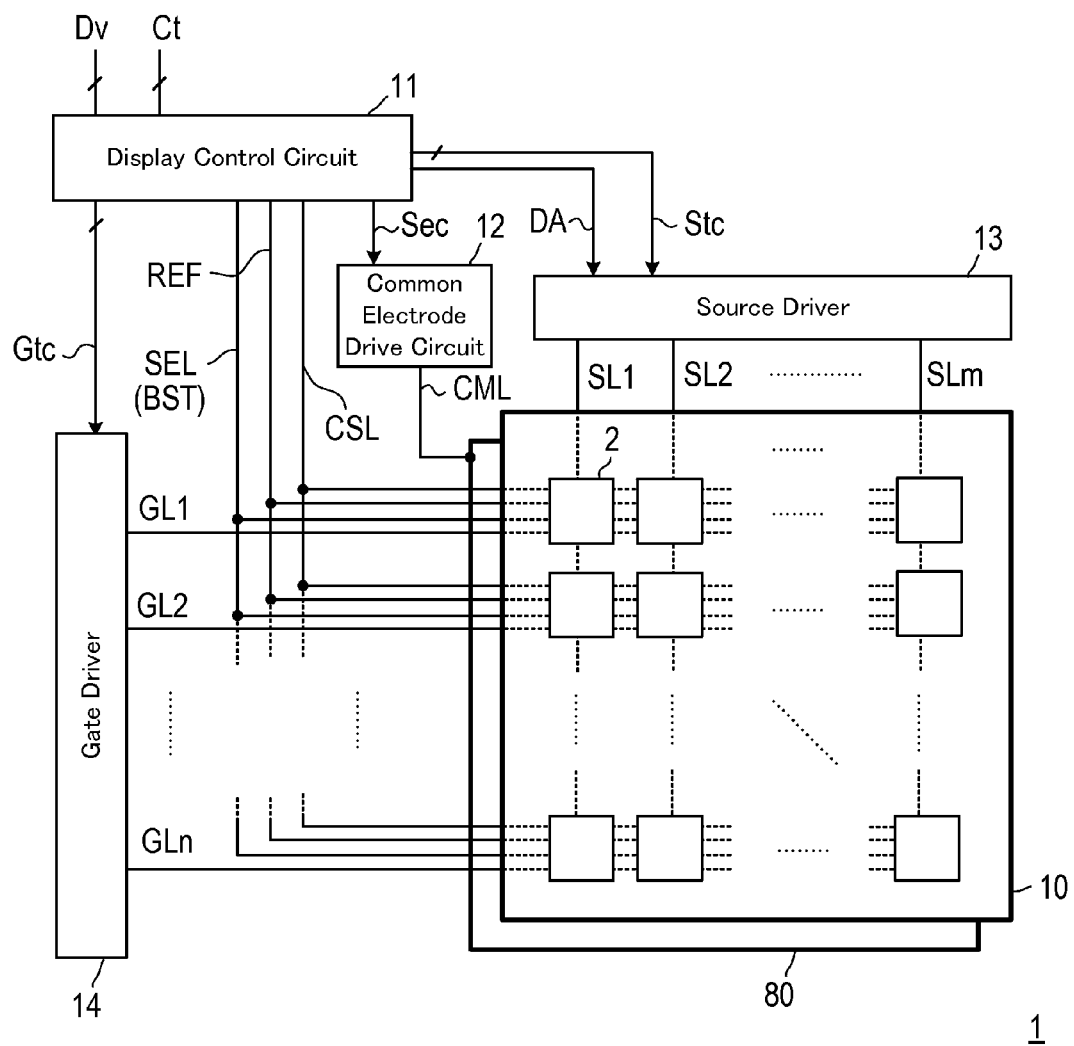
FIG. 3 is a block diagram showing an example of a schematic configuration of a display device according to the present invention.

In the embodiment, as signal lines that drive the pixel circuits 2, in addition to the source line SL and the gate line GL described above, a reference line REF, a selecting line SEL, an auxiliary capacitive line CSL, and a boost line BST are arranged. The boost line BST can be arranged as a signal line different from the selecting line SEL, or can also be common to the selecting line SEL. The boost line BST and the selecting line SEL are made common to each other, the number of signal lines to be arranged on the active matrix substrate 10 can be reduced, and an aperture of each pixel can be increased. FIG. 3 shows a configuration of a display device when the selecting line SEL and the boost line BST are common to each other.

The reference line REF, the selecting line SEL, and the boost line BST correspond to a "first control line", a "second control line", and a "third control line", and are driven by the display control circuit 11. The auxiliary capacitive line CSL corresponds to a "fourth control line" or a "fixed voltage line", and is driven by the display control circuit 11 for example.

In FIG. 1 and FIG. 3, the reference line REF, the selecting line SEL, and the auxiliary capacitive line CSL are arranged along rows to extend in the row direction, and wires of the rows are connected to each other at a peripheral portion of the pixel circuit array. However, the wires of the rows are independently driven, and a common voltage may be able to be applied depending on operating modes. Depending on a type of a circuit configuration of the pixel circuit 2 (will be described later), some or all of the reference line REF, the selecting line SEL, and the auxiliary capacitive line CSL can also be arranged along the columns to extend in the column direction. Basically, the reference line REF, the selecting line SEL, and the auxiliary capacitive line CSL are commonly used in the plurality of pixel circuits 2. When the boost line BST is arranged independently of the selecting line SEL, the boost line BST may be arranged by the same manner as that of the selecting line SEL.

The display control circuit 11 is a circuit that controls programming actions in a normal display mode and an always-on display mode (will be described later) and a self-refresh action and a self-polarity-inverting action in the always-on display mode.

In the programming action, the display control circuit 11 receives a data signal Dv representing an image to be displayed and a timing signal Ct from an external signal source, and, based on the signals Dv and Ct, as signals to display an image on the display element unit 21 (see FIG. 4) of the pixel circuit array, generates a digital image signal DA and a data-side timing control signal Stc given to the source driver 13, a scanning-side timing control signal Gtc given to the gate driver 14, a counter voltage control signal Sec given to the counter electrode drive circuit 12, and signal voltages applied to the reference line REF, the selecting line SEL, the auxiliary capacitive line CSL, and the boost line BST, respectively.

The source driver 13 is a circuit that applies a source signal having a predetermined voltage amplitude at a predetermined timing to the source lines SL under the control of the display control circuit 11 in the programming action, the self-refresh action, and the self-polarity-inverting action.

In the programming action, the source driver 13, based on the digital image signal DA and the data-side timing control signal Stc, generates a voltage matched with a voltage level of a counter voltage Vcom corresponding to a pixel value of one display line represented by the digital image signal DA as source signals Sc1, Sc2, ..., Scm every one-horizontal period (to be also referred to as a "1H period"). The voltage is a multi-tone analog voltage in the normal display mode, and is a two-tone (binary) voltage in the always-on display mode. The source signals are applied to the source lines SL1, SL2, ..., SLm, respectively.

In the self-refresh action and the self-polarity-inverting action, the source driver 13 performs the same voltage application to all the source lines SL connected to the target pixel circuits 2 at the same timing under the control of the display control circuit 11 (will be described in detail later).

The gate driver 14 is a circuit that applies a gate signal having a predetermined voltage amplitude to the gate lines GL at a predetermined timing in the programming action, the self-refresh action, and the self-polarity-inverting action. The gate driver 14, like the pixel circuit 2, may be formed on the active matrix substrate 10.

In the programming action, the gate driver 14 sequentially selects the gate lines GL1, GL2, ..., GLn every almost one-horizontal period in each frame period of the digital image signal DA on the basis of the scanning-side timing control signal Gtc to program the source signals Sc1, Sc2, ..., Scm in the pixel circuits 2.

In the self-refresh action and the self-polarity-inverting action, the gate driver 14 performs the same voltage application at the same timing to all the gate lines GL connected to the target pixel circuits 2 under the control of the display control circuit 11 (will be described in detail later).

The counter electrode drive circuit 12 applies the counter voltage Vcom to the counter electrode 80 through a counter electrode wire CML. In the embodiment, the counter electrode drive circuit 12 outputs the counter voltage Vcom in the normal display mode and the always-on display mode such that the level of the counter voltage Vcom is alternately switched between a predetermined high level (5 V) and a predetermined low level (0 V). In this manner, it is called "counter AC drive" that the counter electrode 80 is driven while switching the counter voltage Vcom between the high level and the low level.

The "counter AC drive" in the normal display mode switches the counter voltage Vcom between the high level and the low level every one-horizontal period and one-frame period. That is, in a certain one-frame period, in two sequential horizontal periods, a voltage polarity across the counter electrode 80 and the pixel electrode 20 changes. Even in the same one-horizontal period, in two sequential frame periods, a voltage polarity across the counter electrode 80 and the pixel electrode 20 changes.

On the other hand, in the always-on display mode, in one-frame period, the same voltage level is maintained, but the voltage polarity across the counter electrode 80 and the pixel electrode 20 changes in two sequential programming actions.

When a voltage having the same polarity is continuously applied across the counter electrode 80 and the pixel electrode 20, a display screen burns in (surface burn-in), and the polarity inverting action is required. However, the "counter AC drive" is employed, an amplitude of a voltage applied to the pixel electrode 20 in the polarity inverting action can be reduced.

<Pixel Circuit>

Figure 4:
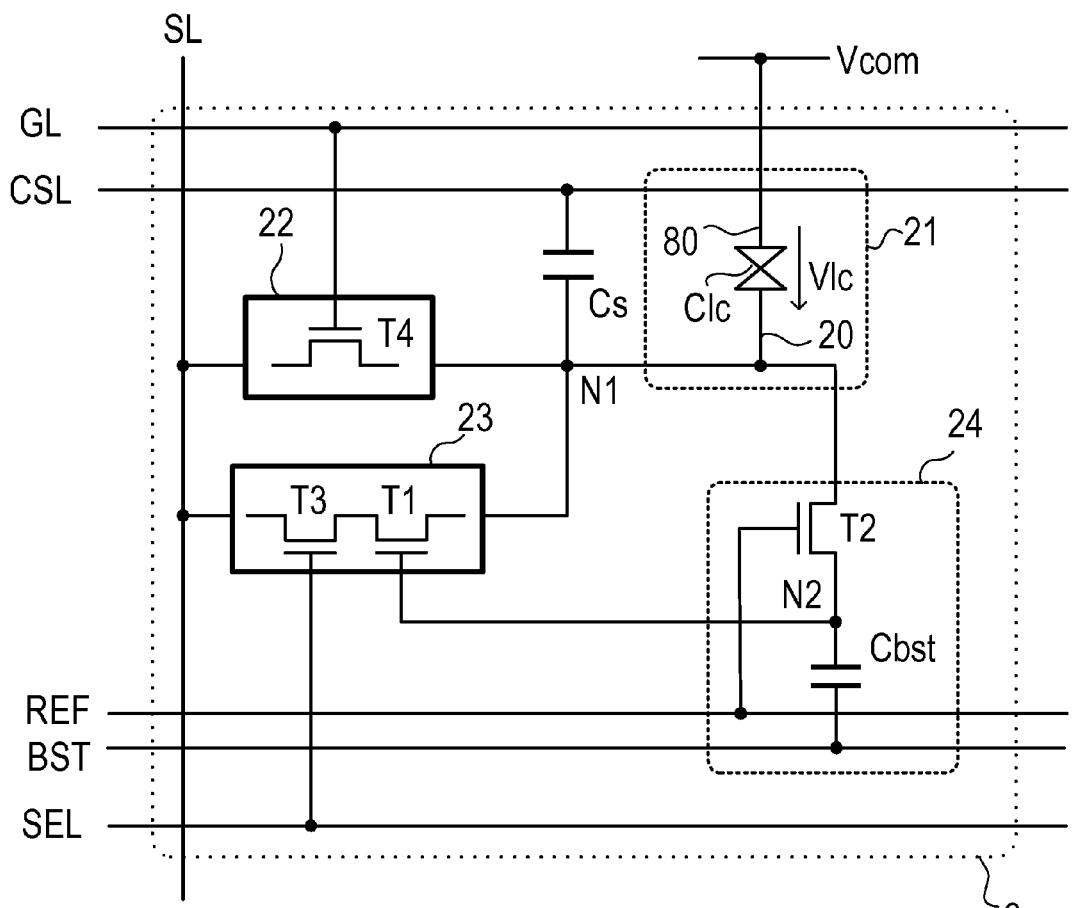
FIG. 4 is a circuit diagram showing a basic circuit configuration of a pixel circuit of the present invention.
Figure 5:
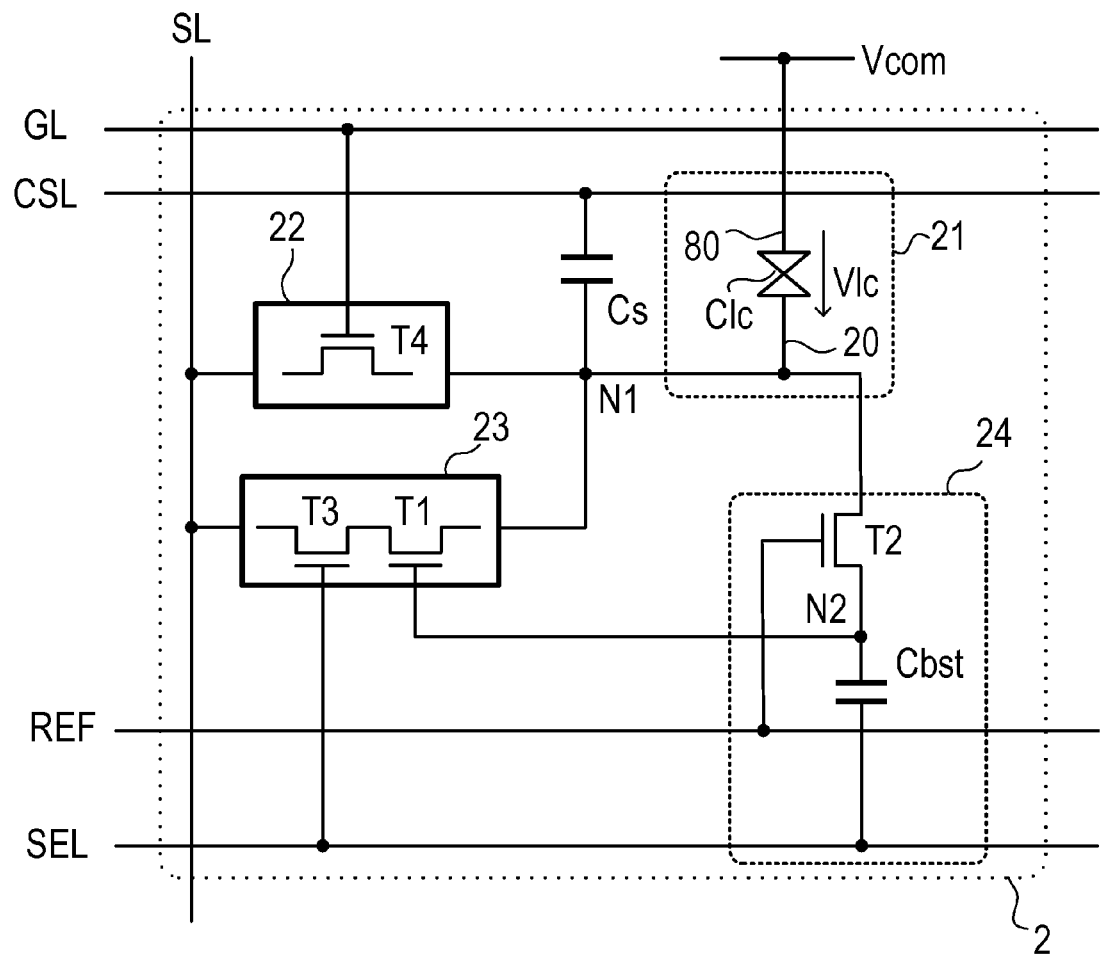
FIG. 5 is a circuit diagram showing another basic circuit configuration of the pixel circuit of the present invention.

A configuration of the pixel circuit 2 will be described below with reference to FIGS. 4 to 15. FIGS. 4 and 5 show a basic circuit configuration of the pixel circuit 2 of the present invention. The pixel circuit 2, being common in all circuit configurations, includes a display element unit 21 including the unit liquid crystal display element Clc, a first switch circuit 22, a second switch circuit 23, a control circuit 24, and an auxiliary capacitor element Cs. The auxiliary capacitor element Cs corresponds to a "second capacitor element".

The basic circuit configuration shown in FIG. 4 shows a common circuit configuration including basic circuit configurations of first to third types (will be described later), and the basic circuit configuration shown in FIG. 5 includes basic circuit configurations of fourth to sixth types. Since the unit liquid crystal display element Clc has been described with reference to FIG. 2, an explanation thereof will be omitted.

The pixel electrode 20 is connected to one terminals of the first switch circuit 22, the second switch circuit 23, and the control circuit 24 to form an internal node N1. The internal node N1 holds a voltage of pixel data supplied from the source line SL in the programming action.

The auxiliary capacitor element Cs has one terminal connected to the internal node N1 and the other terminal connected to the auxiliary capacitive line CSL. The auxiliary capacitor element Cs is additionally arranged to make it possible to cause the internal node N1 to stably hold the voltage of the pixel data.

The first switch circuit 22 has one terminal on which the internal node N1 is not configured and that is connected to the source line SL. The first switch circuit 22 includes a transistor T4 that functions as a switch element. The transistor T4 means the transistor having a control terminal connected to the gate line and corresponds to a "fourth transistor". When at least the transistor T4 is in an off state, the first switch circuit 22 is set to a non-conducting state, and conductivity between the source line SL and the internal node N1 is interrupted.

The second switch circuit 23 has one terminal on which the internal node N1 is not configured and that is connected to the source line SL. The second switch circuit 23 includes a series circuit of a transistor T1 and a transistor T3. The transistor T1 means a transistor having a control terminal that is connected to an output node N2 of the control circuit 24, and corresponds to a "first transistor element". The transistor T3 means a transistor having a control terminal that is connected to the selecting line SEL, and corresponds to a "third transistor element". When both the transistor T1 and the transistor T3 are turned on, a second switch circuit 21 becomes in a conducting state, and a conducting state between the source line SL and the internal node N1 is set.

The control circuit 24 includes a series circuit of the transistor T2 and a boost capacitor element Cbst. A first terminal of the transistor T2 is connected to the internal node N1, and a control terminal thereof is connected to the reference line REF. The second terminal of the transistor T2 is connected to the first terminal of the boost capacitor element Cbst and the control terminal of the transistor T1 to form an output node N2. The second terminal of the boost capacitor element Cbst is connected to the boost line BST as shown in FIG. 4 or connected to the selecting line SEL as shown in FIG. 5.

One terminal of the auxiliary capacitor element Cs and one terminal of the liquid crystal capacitor element Clc are connected to the internal node N1. In order to avoid reference numerals from being complicated, an electrostatic capacitance ("auxiliary capacitance") of the auxiliary capacitor element is expressed by Cs, and an electrostatic capacitance (called a "liquid crystal capacitance") of a liquid crystal capacitor element is expressed by Clc. At this time, a full capacitance being parasitic in the internal node N1, i.e., a pixel capacitance Cp in which pixel data is programmed and that is to be held is approximately expressed by the sum of the liquid crystal capacitance Clc and the auxiliary capacitance Cs (Cp≈Clc+Cs).

At this time, the boost capacitor element Cbst is set to establish Cbst<<Cp when the electrostatic capacitance (called a "boost capacitance") is described as Cbst.

The output node N2 holds a voltage depending on a voltage level of the internal node N1 when the transistor T2 is turned on, and holds the initial hold voltage when the transistor T2 is turned off even though the voltage level of the internal node N1 changes. By the hold voltage of the output node N2, the transistor T1 of the second switch circuit 23 is on/off-controlled.

All the transistors T1 to T4 of four types are thin film transistors such as polycrystalline silicon TFTs or amorphous silicon TFTs formed on the active matrix substrate 10. One of the first and second terminals corresponds to a drain electrode, the other corresponds to a source electrode, and the control terminal corresponds to a gate electrode. Furthermore, each of the transistors T1 to T4 may be configured by a single transistor element. When it is necessary to suppress a leakage current in an off state, the plurality of transistors may be connected in series with each other to commonly use the control terminal. In an explanation of action of the pixel circuit 2, as all the transistors T1 to T4, N-channel type polycrystalline silicon TFTs each having a threshold voltage of about 2 V are supposed.

The pixel circuit 2, as will be described later, may have various circuit configurations. However, the circuit configurations may be patterned as follows.

1) With respect to the configuration of the first switch circuit 22, two patterns, i.e., a pattern in which the first switch circuit 22 is configured by only the transistor T4 and a pattern in which the first switch circuit 22 is configured by a series circuit of the transistor T4 and another transistor element are possible. In the latter, another transistor element configuring the series circuit may be the transistor T3 in the second switch circuit 23 or another transistor element having the control terminal connected to the control terminal of the transistor T3 in the second switch circuit 23.

2) With respect to a signal line connected to a second terminal (terminal on an opposite side of the terminal forming the output node N2) of the boost capacitor element Cbst, two patterns, i.e., a pattern in which the signal line is connected to the boost line BST and a pattern in which the signal line is connected to the selecting line SEL are possible. In the latter, the selecting line SEL also serves as the boost line BST. As described above, the former corresponds to FIG. 4, and the latter corresponds to FIG. 5.

3) A plurality of modification patterns can be used depending on a difference between arrangement positions of the transistor T3 in the second switch circuit 23.

With respect to a case in which the control terminal of the transistor T3 is connected to the boost line BST, pixel circuits are classified by types.

Figure 6:
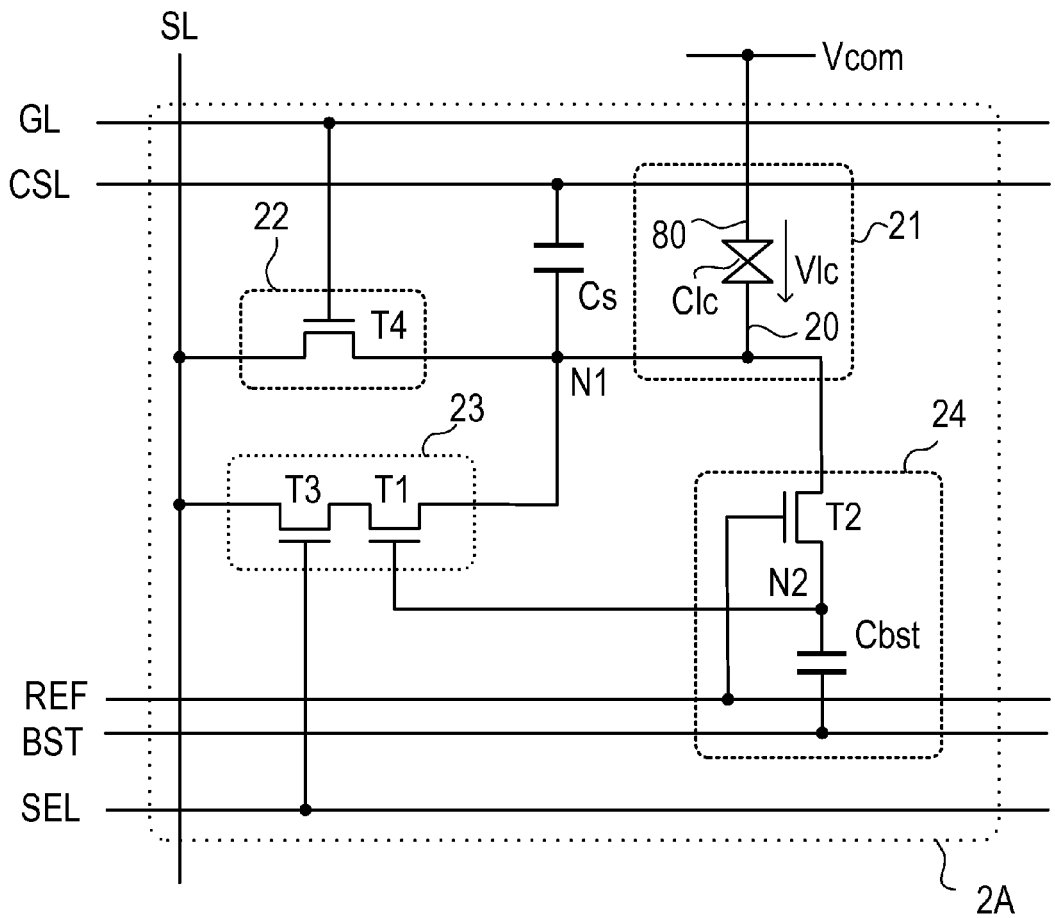
FIG. 6 is a circuit diagram showing a circuit configuration of a first type of the pixel circuit of the present invention.

At this time, when the first switch circuit 22 is configured by only the transistor T4, a pixel circuit 2A of a first type shown in FIG. 6 is supposed. In the first type, the second switch circuit 23 is configured by a series circuit of the transistor T1 and the transistor T3. As an example, a configuration in which the first terminal of the transistor T1 is connected to the internal node N1, the second terminal of the transistor T1 is connected to the first terminal of the transistor T3, and the second terminal of the transistor T3 is connected to the source line SL is shown. However, the arrangements of the transistor T1 and the transistor T3 of the series circuit may be replaced with each other, and a circuit configuration in which the transistor T1 is interposed between the two transistors T3 may be used. The two modified circuit configurations are shown in FIG. 7 and FIG. 8.

Figure 7:
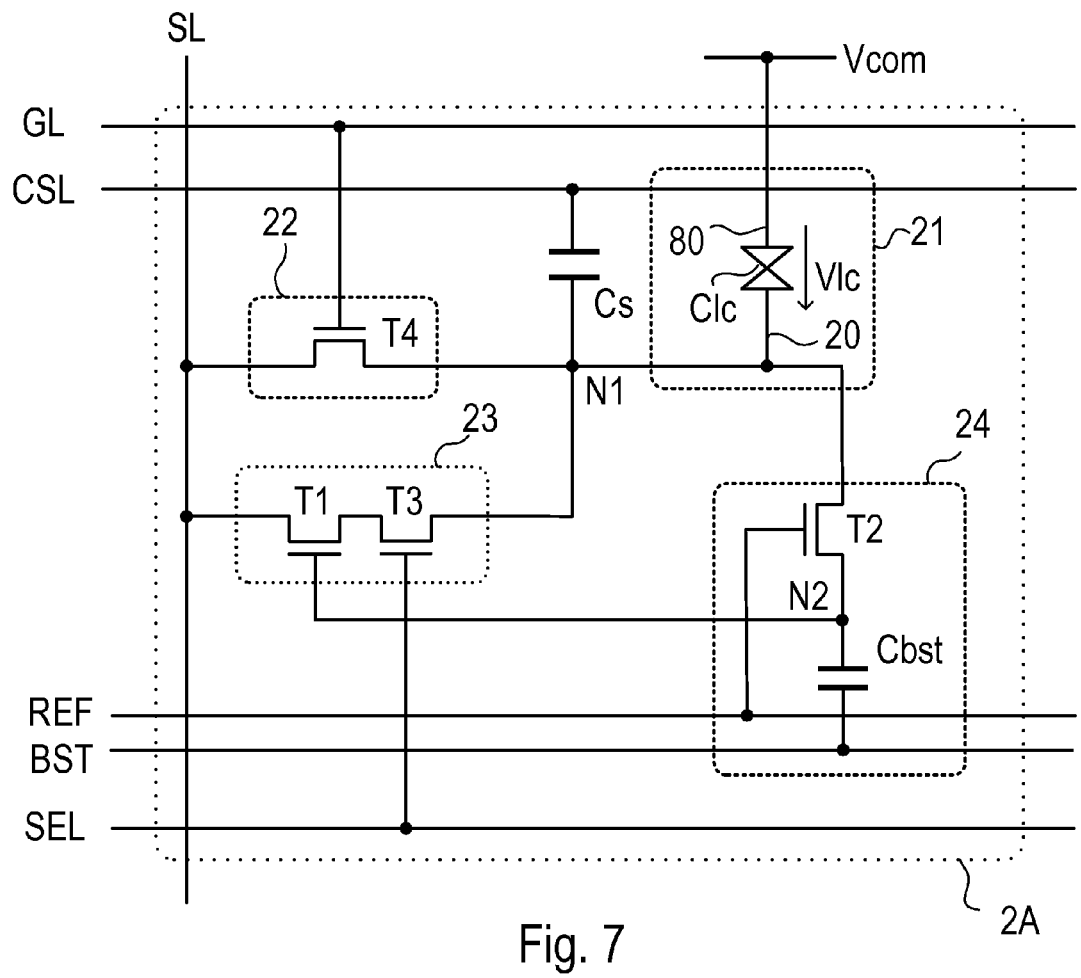
FIG. 7 is a circuit diagram showing another circuit configuration of the first type of the pixel circuit of the present invention.
Figure 8:
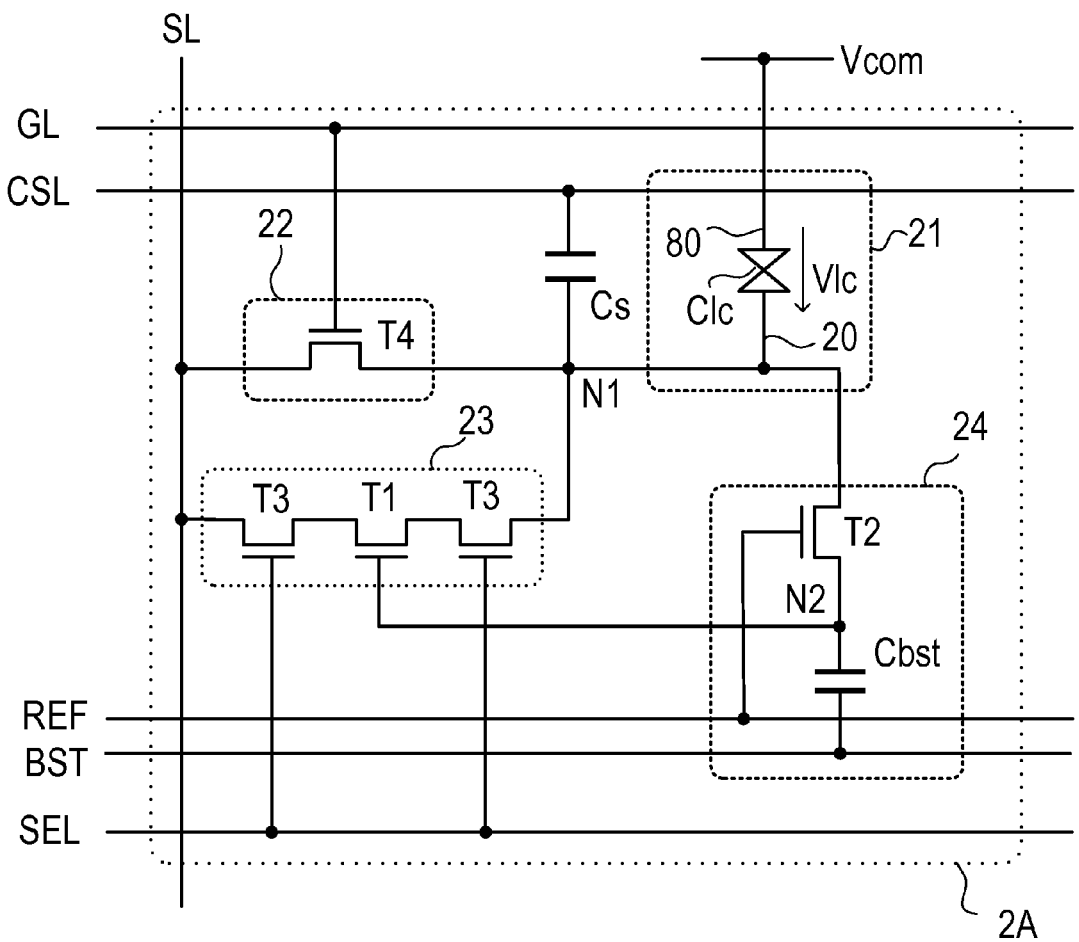
FIG. 8 is a circuit diagram showing still another circuit configuration of the first type of the pixel circuit of the present invention.

When the second switch circuit 23 is configured by a series circuit of the transistors T1 and T3, the number of elements of the transistors T1 and T3 is not limited to the number of elements shown in FIGS. 6 to 8.

Figure 9:
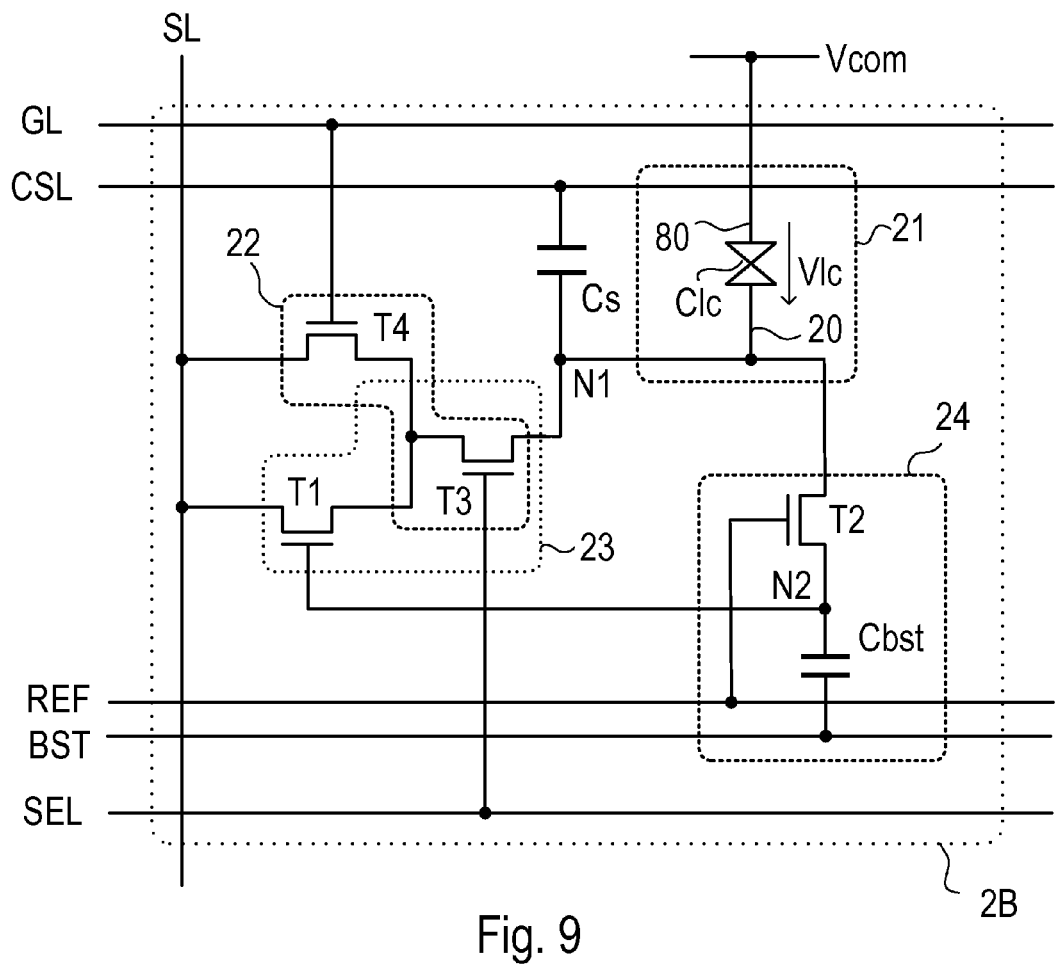
FIG. 9 is a circuit diagram showing a circuit configuration of a second type of the pixel circuit of the present invention.
Figure 10:
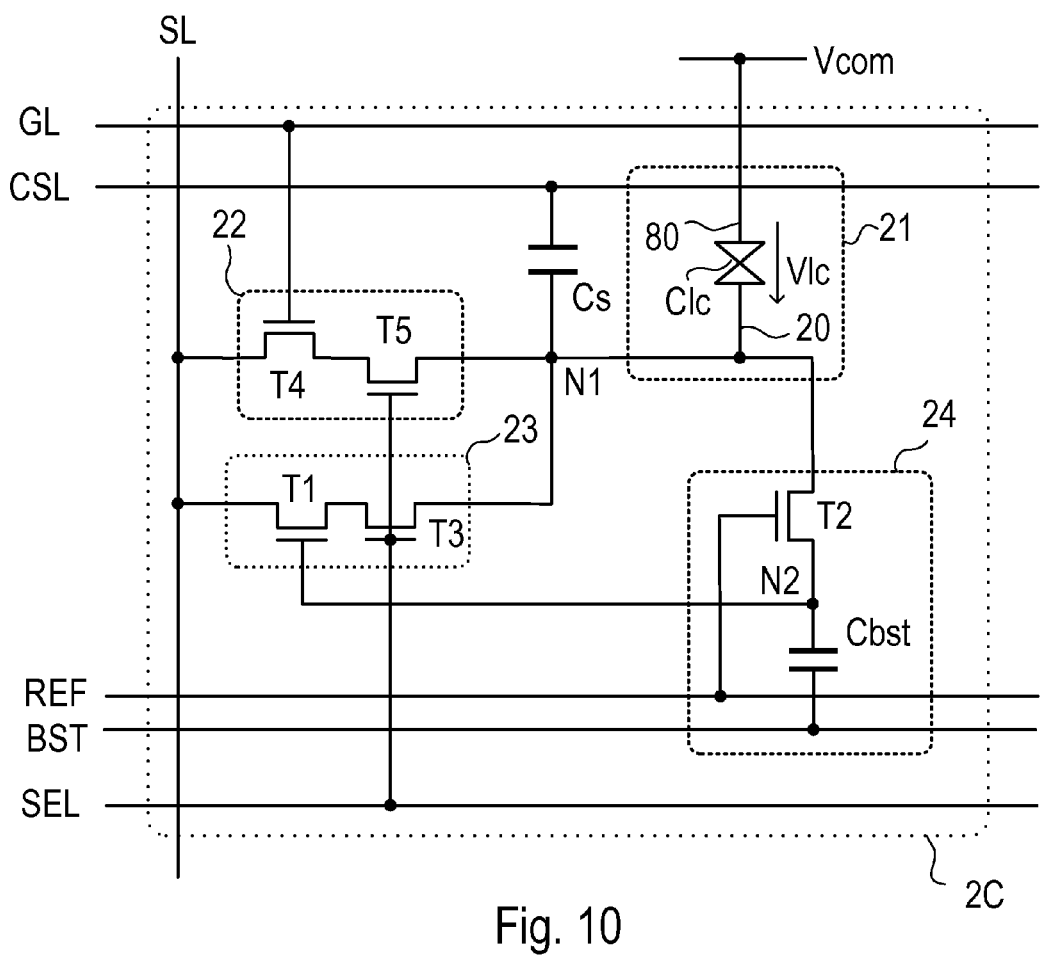
FIG. 10 is a circuit diagram showing a circuit configuration of a third type of the pixel circuit of the present invention.
Figure 11:
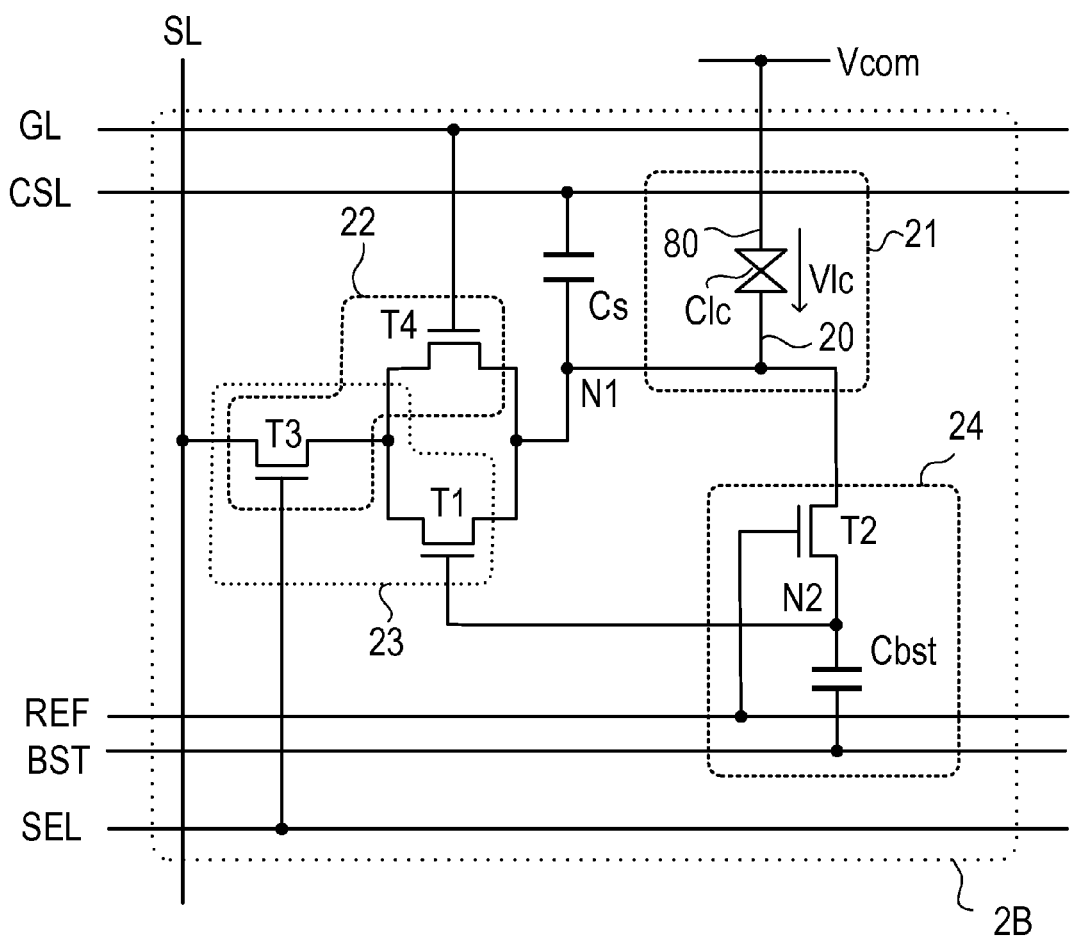
FIG. 11 is a circuit diagram showing another circuit configuration of the second type of the pixel circuit of the present invention.
Figure 12:
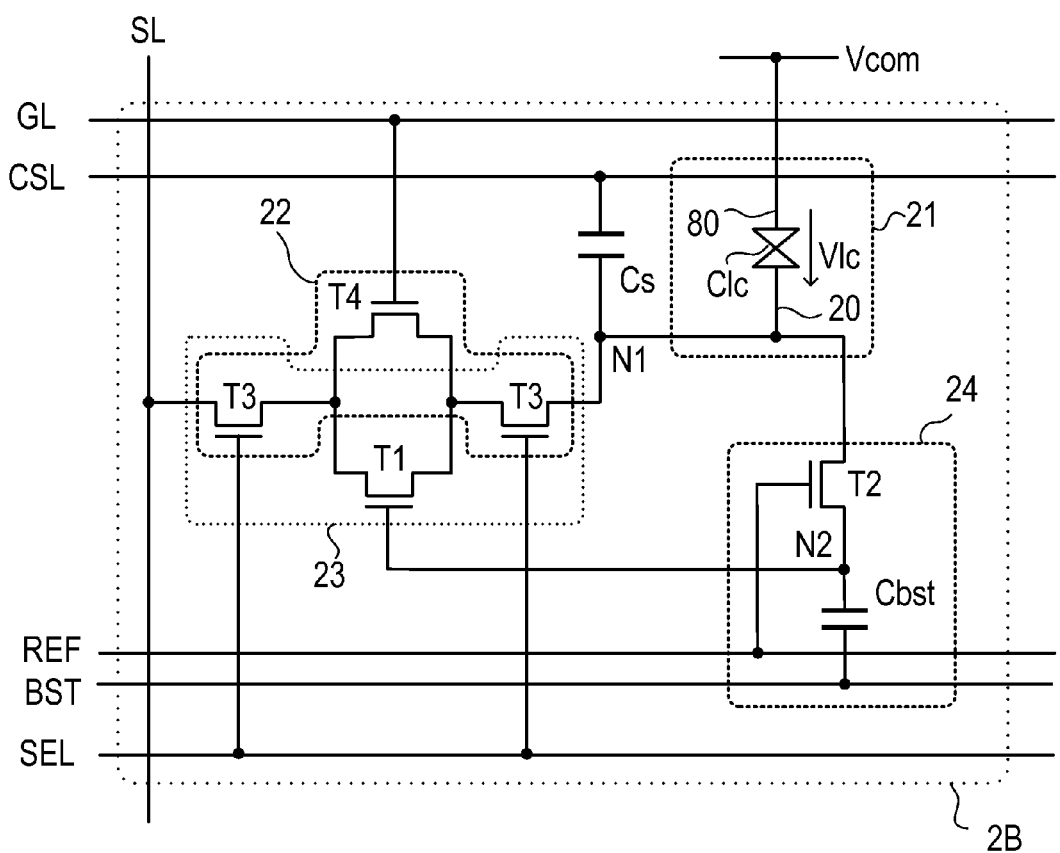
FIG. 12 is a circuit diagram showing still another circuit configuration of the second type of the pixel circuit of the present invention.

When the first switch circuit 22 is configured by a series circuit of the transistor T4 and another transistor element, a pixel circuit 2B of a second type shown in FIG. 9 and a pixel circuit 2C of a third type shown in FIG. 10 are supposed.

In the second type, as a transistor element except for the transistor T4 configuring the first switch circuit 22, a transistor in the second switch circuit 23 also serves. More specifically, the first switch circuit 22 is configured by a series circuit of the transistor T4 and the transistor T3, and the second switch circuit 23 is configured by a series circuit of the transistor T1 and the transistor T3. The first terminal of the transistor T3 is connected to the internal node N1, the second terminal of the transistor T3 is connected to the first terminal of the transistor T1 and the first terminal of the transistor T4, the second terminal of the transistor T4 is connected to the source line SL, and the second terminal of the transistor T1 is connected to the source line SL.

Furthermore, as in FIGS. 7 and 8 of the first type, also in the second type, the arrangements of the transistor T1 and the transistor T3 in the second switch circuit 23 may be replaced with each other, and a circuit configuration in which the transistor T1 is interposed between the two transistors T3 may be used. The two modified circuit configurations described above are shown in FIG. 11 and FIG. 12.

In the third type shown in FIG. 10, as the transistor element except for the transistor T4 configuring the first switch circuit 22, a transistor T5 having a control terminal connected to the control terminal of the transistor T3 in the second switch circuit 23 is used. The transistor T5 corresponds to a "fifth transistor". Since the control terminals of the transistor T5 and the transistor T3 are connected to each other, the transistor T5 is on/off-controlled by the selecting line SEL like the transistor T3. Since the transistor except for the transistor T4 configuring the first switch circuit 22 is on/off-controlled by the selecting line SEL, the third type is common in the second type shown in FIG. 9.

In the third type, the arrangements of the transistors T4 and T5 in the first switch circuit 22 may be replaced with each other, or the arrangements of the transistors T1 and T3 in the second switch circuit 23 may be replaced with each other. The number of transistor elements in each of the switch circuits can also be increased.

Figure 13:
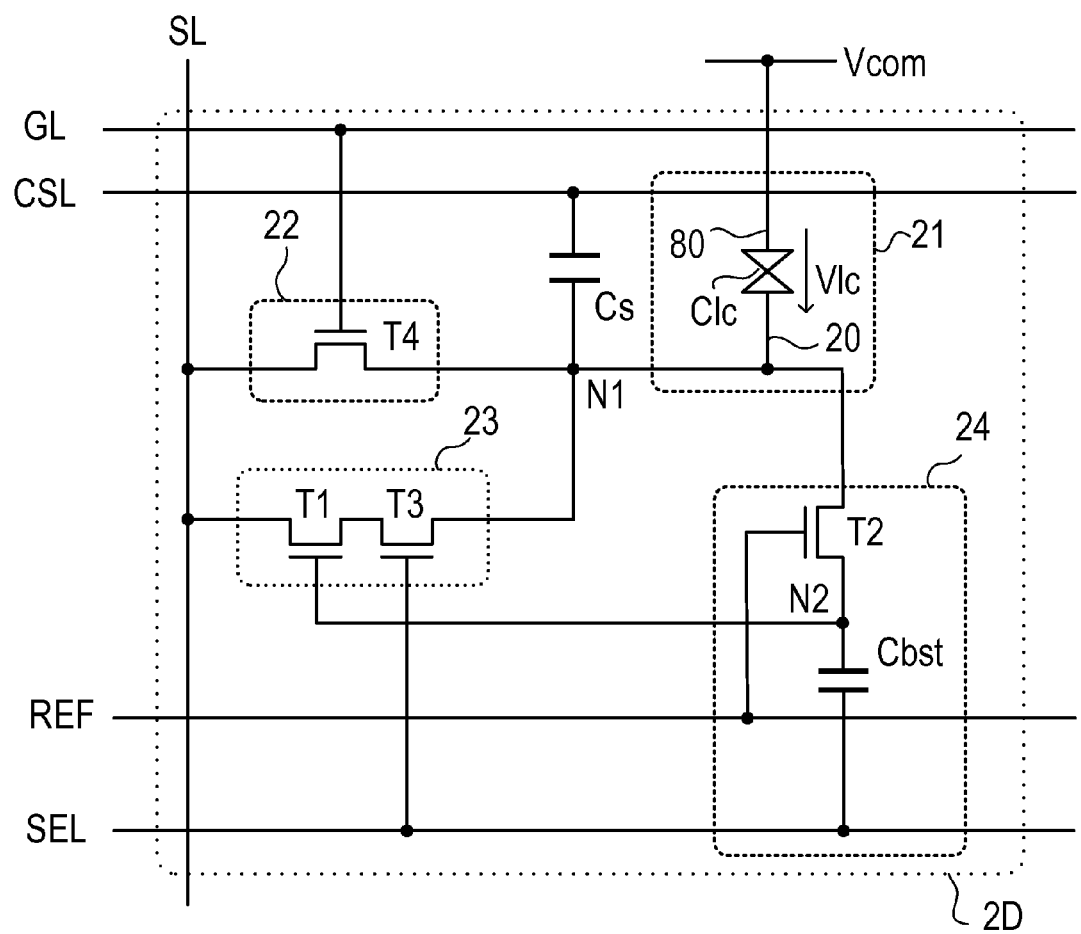
FIG. 13 is a circuit diagram showing a circuit configuration of a fourth type of the pixel circuit of the present invention.
Figure 14:
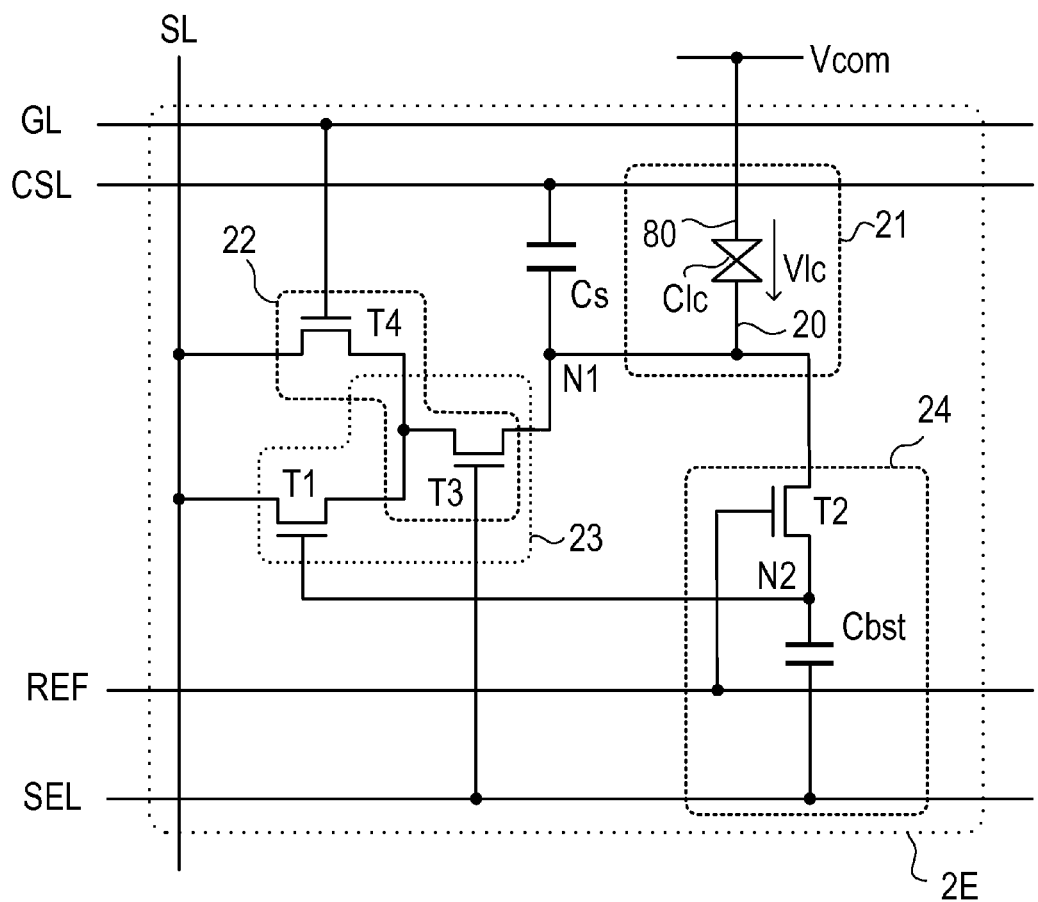
FIG. 14 is a circuit diagram showing a circuit configuration of a fifth type of the pixel circuit of the present invention.
Figure 15:
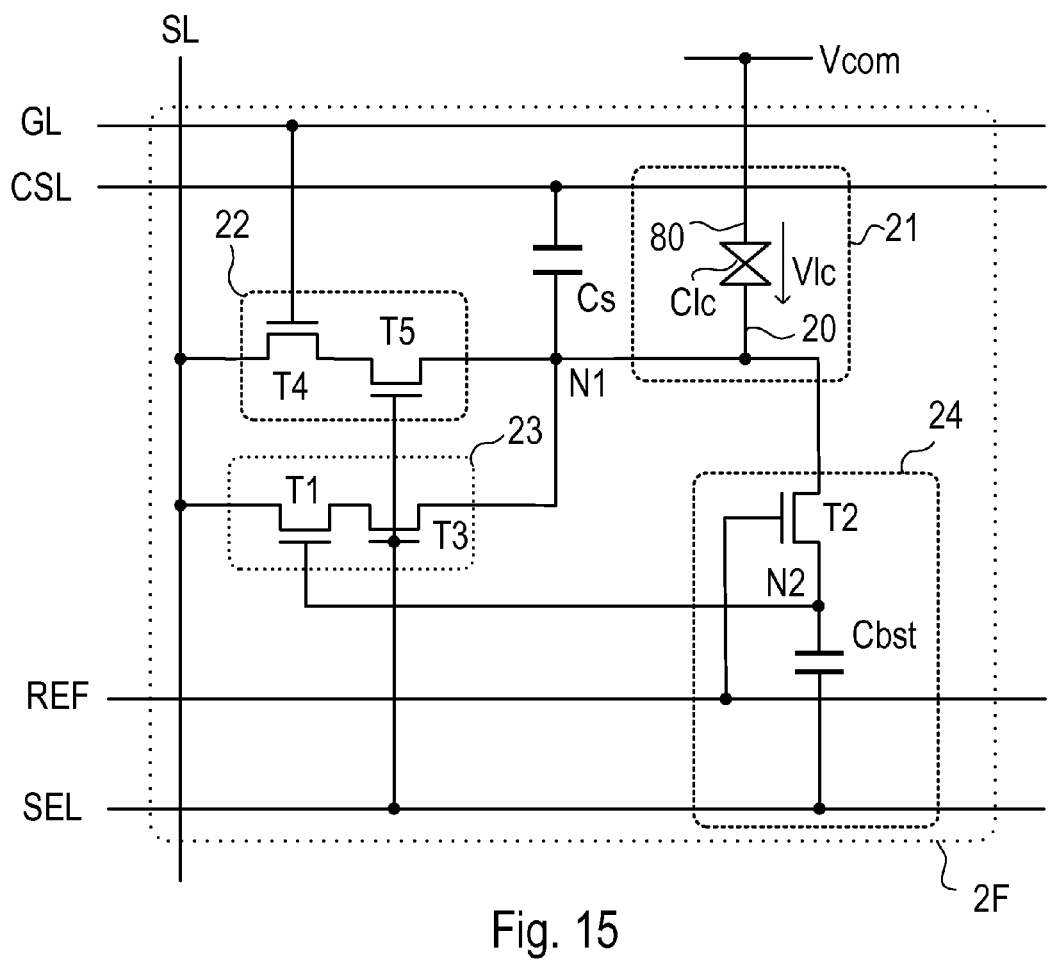
FIG. 15 is a circuit diagram showing a circuit configuration of a sixth type of the pixel circuit of the present invention.

Furthermore, in the first to third types described above, the selecting line SEL may be connected to the second terminal of the boost capacitor element Cbst. The configurations are called the fourth to sixth types, and typical circuit configurations are shown in FIGS. 13 to 15. In each of the types, the same modified circuits as those of the first to third types can be obtained.

Second Embodiment

In the second embodiment, as typified by the circuits of the first to the sixth types, the pixel circuit 2A of the first type shown in FIG. 6 will be described below with respect to a self-refresh action with reference to the accompanying drawings. As will be described later, also in a pixel circuit of another type, as in the first type, the self-refresh action can be realized.

The self-refresh action is an action in an always-on display mode, and is an action in which the first switch circuit 22, the second switch circuit 23, and the control circuit 24 are operated by a predetermined sequence to the plurality of pixel circuits 2 to recover potentials (or a potential of the internal node N1) to a potential programmed by an immediately previous programming action at the same time in a lump. The self-refresh action is an action being unique to the present invention and performed by the pixel circuits 2A to 2F. The self-refresh action can achieve a very low power consumption in comparison with an "external refresh action" that performs a normal programming action as in the conventional technique to recover the potential of the pixel electrode 20. The "the same time" in the "at the same time in a lump" is "the same time" having a time range of a series of self-refresh actions.

In the conventional technique, the programming action is performed to perform an action (external polarity inverting action) that inverts only a polarity of a liquid crystal voltage Vcl applied across the pixel electrode 20 and the counter electrode 80 while maintaining an absolute value of the liquid crystal voltage Vcl. When the external polarity inverting action is performed, the polarity is inverted, and the absolute value of the liquid crystal voltage Vcl is updated to an absolute value in a state at the time of an immediately previous programming action. More specifically, polarity inversion and refreshing are simultaneously performed. For this reason, although a refresh action is not normally executed to update only the absolute value of the liquid crystal voltage Vcl without inverting the polarity by the programming action, in terms of comparison with the self-refresh action, such a refresh action is called an "external refresh action" in the following explanation for descriptive convenience.

Even though the refresh operation is executed by the external polarity inverting action, the programming action is still performed. More specifically, in comparison with the conventional method, a very low power consumption can also be achieved by the self-refresh action according to the embodiment.

Voltages are applied to all the gate lines GL, the source lines SL, the selecting line SEL, the reference line REF, the auxiliary capacitive line CSL, the boost line BST, and the counter electrode 80 that are connected to the pixel circuits 2 targeted by the self-refresh action at the same timing. At the same timing, the same voltage is applied to all the gate lines GL, the same voltage is applied to all the reference lines REF, the same voltage is applied to all the auxiliary capacitive lines CSL, and the same voltage is applied to all the boost lines BST. The timing control of the voltage applications is performed by the display control circuit 11 shown in FIG. 1, and the voltage applications are performed by the display control circuit 11, the counter electrode drive circuit 12, the source driver 13, and the gate driver 14, respectively.

In the always-on display mode according to the embodiment, since two-tone (binary) pixel data is held in units of pixel circuits, a pixel voltage V20 held in the pixel electrode 20 (internal node N1) exhibits two voltage states including a first voltage state and a second voltage state. In the embodiment, like the counter voltage Vcom described above, the first voltage state and the second voltage state will be explained as a high level (5 V) and a low level (0 V), respectively.

In a state immediately previous to the execution of the self-refresh action, it is supposed that a pixel in which a pixel electrode 20 is programmed with a high-level voltage and a pixel in which a pixel electrode is programmed with a low-level voltage are mixed. However, according to the self-refresh action of the embodiment, even though the pixel electrode 20 is programmed with any one of high-level and low-level voltages, a voltage applying process based on the same sequence is performed to make it possible to execute a refresh action to all the pixel circuits. This will be described below with reference to a timing chart and a circuit diagram.

A case in which a high-level voltage is programmed in the internal node N1 by an immediately previous programming action and recovered is called a "case A", and a case in which a low-level voltage is programmed in the internal node N1 by the previous programming action and recovered is called a "case B".

Figure 16:
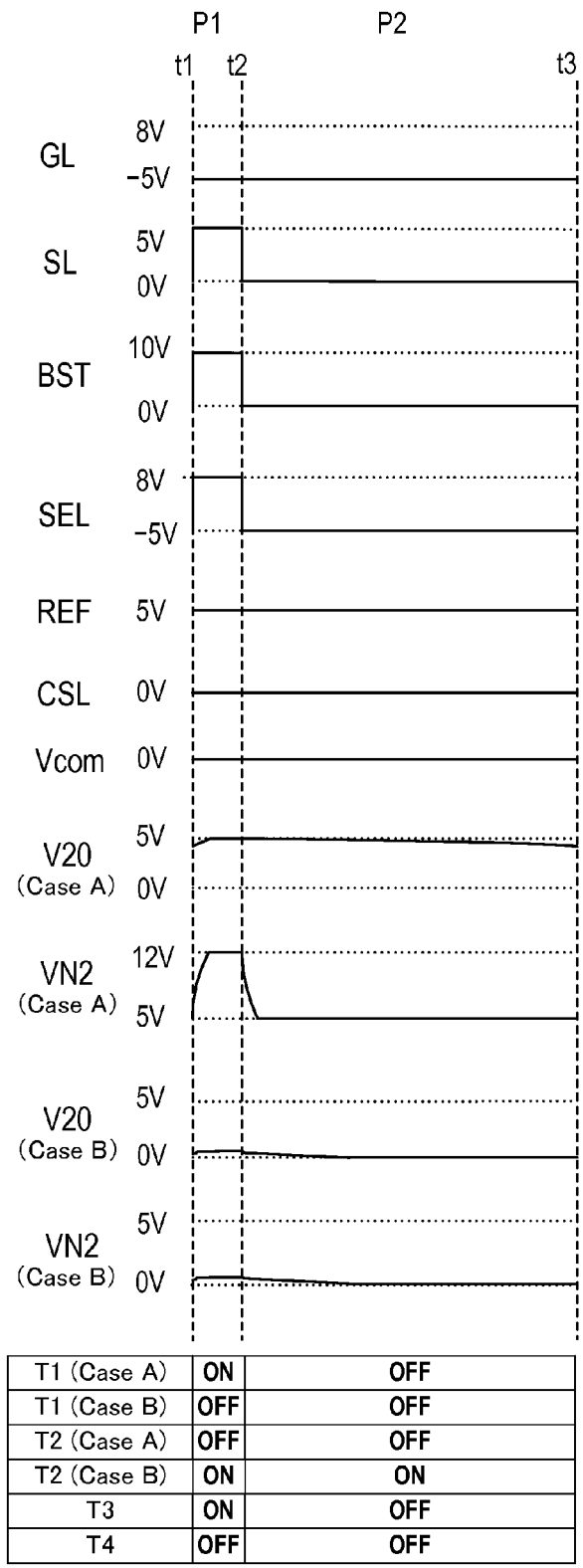
FIG. 16 is a timing chart of a self-refresh action performed by the pixel circuit of the first type.

FIG. 16 shows a timing chart of a self-refresh action of a first type. As shown in FIG. 16, the self-refresh action is exploded into two phases P1 and P2. Start times of the phases are represented by t1 and t2, respectively. FIG. 16 shows voltage waveforms of all the gate lines GL, the source lines SL, the selecting line SEL, the reference line REF, the auxiliary capacitive line CSL, and the boost line BST that are connected to the pixel circuits 2A targeted by the self-refresh action, and a voltage waveform of the counter voltage Vcom. In the embodiment, all the pixel circuits of the pixel circuit array are targeted by the self-refresh action.

Furthermore, in FIG. 16, voltage waveforms of pixel voltages V20 of the internal nodes N1 in the case A and the case B, a voltage VN2 of the output node N2, and on/off states in the phases of the transistors T1 to T4 are shown.

It is assumed that, at a point of time before time t1, high-level programming is performed in the case A and low-level programming is performed in the case B.

When a time has elapsed after the programming action is executed, the pixel voltage V20 varies with generation of leakage currents of the transistors in the pixel circuit. In the case A, the pixel voltage V20 is 5 V immediately after the programming action. However, the value decreases to a value lower than the initial value with time. Similarly, in the case B, the pixel voltage V20 is 0 V immediately after the programming action. However, the value increases to a value larger than the initial value with time. This is shown in the figure such that the pixel voltage V20 in the case A exhibits a voltage slightly lower than 5 V at a point of time t1, and the pixel voltages V20 in the case B exhibits a voltage slightly higher than 0 V.

Voltage levels applied to the lines in units of phases will be described below.

<<Phase P1>>

In a phase P1 started from time t, a voltage is applied to a gate line GL1 such that the transistor T4 is completely turned off. The voltage is set to −5 V.

A voltage (5 V) corresponding to the first voltage state is applied to the source line SL. A voltage is applied to the selecting line SEL such that the transistor T3 is completely turned on. The voltage is set to 8 V.

The counter voltage Vcom applied to the counter electrode 80 and a voltage applied to the auxiliary capacitive line CSL are set to 0 V. The above description means that the voltage is not limited to 0 V but still kept at a voltage value obtained at a point of time before time t1.

To the reference line REF, a voltage is applied such that the transistor T2 is set to a non-conducting state when a voltage state of the internal node N1 is a high level (case A) and the transistor T2 is set to a conducting state when the voltage state is a low level (case B). The voltage is set to 5 V.

As will be described later in the fifth embodiment, since the transistor T2 is in a conducting state in the programming action, the nodes N1 and N2 are set to high-level potential (5 V) in the case A in which high-level programming is performed, and the nodes N1 and N2 are set to low-level potential (0 V) in the case B in which low-level programming is performed.

Upon completion of the programming action, the transistor T2 is set to a non-conducting state. However, since the node N1 is disconnected from the source line SL, the potentials of the nodes N1 and N2 are still held. More specifically, the potentials of the nodes N1 and N2 immediately before time t1 are approximately 5 V in the case A and are approximately 0 V in the case B. The "approximately" is a description given in consideration of a variation in potential by generation of a leakage current.

When a voltage of 5 V is applied to the reference line REF at time t1, the nodes N1 and N2 are approximately 5 V in the case A. For this reason, a voltage Vgs between the gate and the source of the transistor T2 approximately becomes 0 V and is lower than a threshold voltage of 2 V, so that the transistor T2 is set to a non-conducting state. In contrast to this, in the case B, since the nodes N1 and N2 configuring the drain or the source of the transistor T2 are approximately set to 0 V, the voltage Vgs between the gate and the source of the transistor T2 approximately becomes 5 V and is higher than a threshold voltage of 2 V, so that the transistor is set to a conducting state.

Specifically, in the case A, the transistor T2 need not be completely in a non-conducting state, and electricity need only be prevented from being conducted from the node N2 to the node N1.

To the boost line BST, a high-level voltage is applied such that the transistor T1 is set to a conducting state when the voltage state of the node N1 is a high level (case A) and set to a non-conducting state when the voltage state is a low level (case B).

The boost line BST is connected to one terminal of the boost capacitor element Cbst. For this reason, when a high-voltage level is applied to the boost line BST, the potential of the other terminal of the boost capacitor element Cbst, i.e., the potential of the output node N2 is raised. In this manner, it will be called "boost raising" that the voltage applied to the boost line BST is increased to raise the potential of the output node N2.

As described above, in the case A, the transistor T2 is in a non-conducting state at time t1 in the case A. For this reason, a variation in potential of the node N2 caused by boost raising is determined by a ratio of a boost capacitance Cbst to a full capacitance parasitic in the node N2. As an example, when the ratio is 0.7, a voltage of one electrode of a boost capacitor element increases by ΔVbst, and a voltage of the other electrode, i.e., the node N2, consequently increases by about 0.7ΔVbst.

In the case A, since the pixel voltage V20 approximately exhibits 5 V at time t1, the transistor T1 is in a conducting state when a high potential higher than the pixel voltages V20 by the threshold voltage of 2 V is applied to the gate of the transistor T1, i.e., the output node N2. In the embodiment, a voltage applied to the boost line BST at time t1 is set to 10 V. In this case, the output node N2 consequently increases by 7 V. At a point of time immediately before time t1, since the node N2 exhibits a potential (5 V) almost equal to that of the node N1, the node N2 exhibits about 12 V by boost raising. Thus, since a potential difference equal to or higher than a threshold voltage is generated between the gate and the node N1 in the transistor T1, the transistor T1 is in a conducting state.

On the other hand, in the case B, the transistor T2 is in a conducting state at time t1. More specifically, unlike in the case A, the output node N2 and the internal node N1 are electrically connected to each other. In this case, a variation in potential of the output node N2 caused by boost raising is influenced by, in addition to a boost capacitance Cbst and a full parasitic capacitance of the node N2, a full parasitic capacitance of the internal node N1.

One terminal of the auxiliary capacitor element Cs and one terminal of the liquid crystal capacitor element Clc are connected to the internal node N1, a full capacitance Cp being parasitic in the internal node N1 is approximately expressed by a sum of the liquid crystal capacitance Clc and the auxiliary capacitance Cs as described above. The boost capacitance Cbst has a value that is considerably smaller than that of a liquid crystal capacitance Cp. Therefore, a ratio of the boost capacitance to the total of capacitances is very low, for example, a value of 0.01 or less. In this case, when a potential of one electrode of the boost capacitor element increases by ΔVbst, a potential of the other electrode, i.e., the output node N2 increases by only about 0.01ΔVbst at most. More specifically, in the case B, ΔVbst=10 V is satisfied, a potential VN2 of the output node N2 rarely increases.

In the case B, since low-level programming is performed in the immediately previous programming action, the output node N2 exhibits about 0 V immediately before time t1. Therefore, even though boost raising is performed at time t1, a potential enough to set the transistor T1 to a conducting state is not given to the gate of the transistor T1. More specifically, unlike in the case A, the transistor T1 is still in a non-conducting state.

In the case B, a potential of the output node N2 immediately before time t1 is not necessarily 0 V, and it only has to be a potential that does not set at least T1 to a conducting state. Similarly, in the case A, a potential of the node N1 immediately before time t1 is not necessarily 5 V, and it only has to be a potential that sets the transistor T1 to a conducting state by performing boost raising when the transistor T2 is in a non-conducting state.

In the case A, boost raising is performed to set the transistor T1 to a conducting state. Since a high-level voltage is applied to the selecting line SEL to set the transistor T3 to a conducting state, the second switch circuit 23 is set to a conducting state. Thus, the high-level voltage in the first voltage state applied to the source line SL is applied to the internal node N1 through the second switch circuit 23. In this manner, the potential of the internal node N1, i.e., the pixel voltage V20 returns to the first voltage state. This is shown in FIG. 16 such that, the value of the pixel voltage V20 returns to 5 V when a short period of time has elapsed from time t1.

On the other hand, in the case B, since the transistor T1 is still in a non-conducting state even after boost raising, the second switch circuit 23 is in a non-conducting state. Thus, the high-level voltage applied to the source line SL is not given to the node N1 through the second switch circuit 23. More specifically, the potential of the node N1 still exhibits a value at a level almost equal to that at time t1, i.e., approximately 0 V.

As described above, in the phase P1, a refresh action of the pixel voltage V20 (case A) programmed in the first voltage state is performed.

<<Phase P2>>

In a phase P2 started from time t2, voltages applied to the gate line GL, the reference line REF, and the auxiliary capacitive line CSL and the counter voltage Vcom are set to the same values as those in the phase P1.

A voltage applied to the source line SL decreases to a voltage in the second voltage state (0 V).

A voltage to set the transistor T3 to a non-conducting state is applied to the selecting line SEL. The voltage is set to −5 V. In this manner, the second switch circuit 23 is set to a non-conducting state.

A voltage applied to the boost line BST is decreased to a voltage in a state before boost raising is performed. The voltage is set to 0 V. When the voltage of the boost line BST decreases, a potential of the node N1 is pushed down.

Also in the phase P2, since the transistor T2 is in a conducting state in the case B, even though the voltage of the boost line BST changes, the potential of the node N2 is rarely influenced. More specifically, the potential is maintained at about 0 V. The node N1 and the node N2 exhibit the same potential.

In the phase P2, the same voltage state is maintained for a time considerably longer than that in the phase P1. Meanwhile, a low-level voltage (0 V) is applied to the source line SL. For this reason, due to generation of a leakage current in this period, the pixel voltage V20 in the case B changes to be close to 0 V with time. More specifically, at a point of time immediately before time t1, even though a potential of the pixel voltage V20 in the case B is higher than 0 V, the potential changes to be close to 0 V in the period of the phase P2.

On the other hand, in the case A, the potential of the pixel voltage V20 returns to 5 V by the phase P1. However, due to the presence of a leakage current thereafter, the potential gradually decreases with time.

As described above, in the phase P2, an action to cause the pixel voltage V20 (case B) programmed in the second voltage state to be gradually close to 0 V is performed. A so-called refresh action of the pixel voltage V20 programmed in the second voltage state is performed.

Thereafter, the phases P1 and P2 are repeated to make it possible to return the pixel voltages V20 in both the cases A and B to those in the immediately previous programming state.

As in the conventional technique, when a refresh action is to be performed by programming performed by voltage application through the source line SL, the gate lines GL need to be horizontally scanned one by one. For this reason, high-level voltages the number of which is the number (n) of gate lines need to be applied to the gate lines GL. Since a potential having the same level as a potential level programmed in the immediately previous programming action needs to be applied to the source lines SL, the source driver 13 needs to be driven n times at most.

In contrast to this, according to the embodiment, pulse voltages are simultaneously applied to the source line SL, the selecting line SEL, and the boost line BST once while applying a constant voltage to the reference line REF. Thereafter, when a low-level potential is only maintained, the potentials of the pixel electrodes 20 can be returned to a potential state in the programming action with respect to all the pixels. More specifically, in a 1-frame period, in order to return the potentials of the pixel electrodes 20 of the pixels, it is only necessary to change the voltages applied to the lines once. Meanwhile, a low-level voltage need only be applied to all the gate lines GL.

Thus, according to the self-refresh action of the embodiment, in comparison with a normal external refresh action, the number of times of voltage application to the gate lines GL and the number of times of voltage application to the source lines SL can be considerably reduced. Furthermore, the way of controlling the voltage application can also be simplified. For this reason, power consumptions of the gate driver 14 and the source driver 13 can be considerably reduced.

The self-refresh action of the embodiment will be concluded as follows. The first switch circuit 22 is set in a non-conducting state for the phases P1 to P2. In the phase P1, the second switch circuit 23 is set to a conducting state in the case A, and a high-level voltage corresponding to the first voltage state is given from the source line SL to the internal node N1. On the other hand, in the case B, the second switch circuit 23 is set to a non-conducting state not to give the high-level voltage to the internal node N1. In the phase P2, the second switch circuits 23 both in the cases A and B are set to a non-conducting state to give a low-level voltage to the source line SL.

Based on the above, it can be understood that the same timing chart as that in FIG. 16 is applied to circuits of the second and third types to make it possible to realize all the same self-refresh action.

Figure 17:
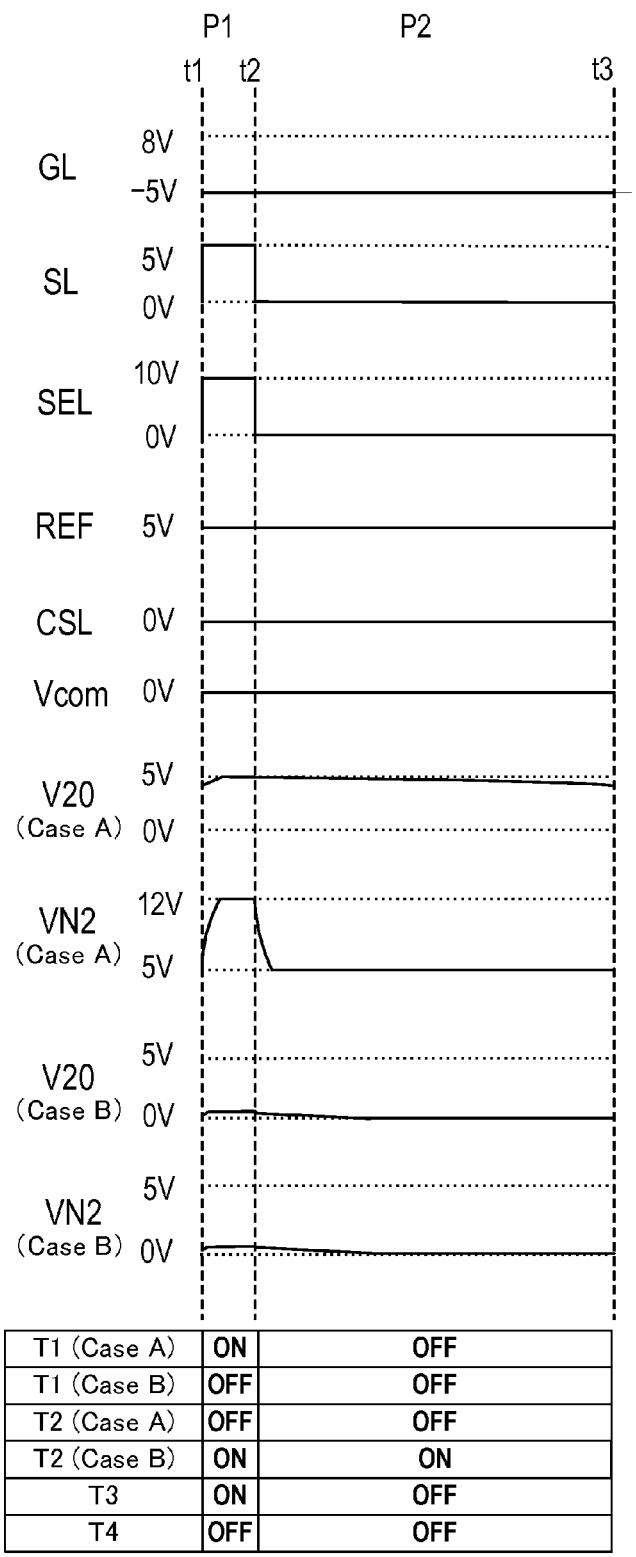
FIG. 17 is a timing chart of self-refresh actions performed by the pixel circuits of the fourth to sixth types.

As is apparent from FIG. 16, a voltage pulse is applied to the selecting line SEL and the boost line BST at the same timing. A voltage to set the transistor T3 to a conducting state in the phase P1 and a voltage to set the transistor T3 to a non-conducting state in the phase P2 may be applied to the selecting line SEL. Thus, the voltage applied to the boost line BST is applied to the selecting line SEL to make it possible to realize a self-refresh action in the pixel circuits of the fourth to sixth types. A timing chart obtained at this time is shown in FIG. 17. Since the actions are common in the first type, an explanation thereof will be omitted. In FIG. 17, of voltage applied to the SEL, a low-level voltage value may be set within a range in which the low-level voltage is given to the gate of the transistor T3 to make it possible to completely turn off the transistor T3. A high-level voltage value may be set within a range in which the high-level voltage is given to the gate of the transistor T3 to make it possible to turn on the transistor T3 one terminal of which +5 V is applied to and to turn on the transistor T1 by raising the potential of the output node N2 in the case A.

Third Embodiment

In the third embodiment, as a representative of the circuits of the first to sixth types, a self-polarity-inverting action performed by the pixel circuit 2A of the first type shown in FIG. 6 will be described below with reference to the drawings. As will be described later, also in a pixel circuit of another type, as in the first type, the self-polarity-inverting action can be realized.

The self-polarity-inverting action is an action in an always-on display mode, and is an action in which the first switch circuit 22, the second switch circuit 23, and the control circuit 24 are operated by a predetermined sequence to the plurality of pixel circuits 2 to invert the polarity of liquid crystal voltage Vlc applied across the pixel electrode 20 and the counter electrode 80 at the same time in a lump while keeping the absolute value of the liquid crystal voltage Vlc. The self-polarity-inverting action is an action unique to the present invention performed by the pixel circuits 2A to 2F to make it possible to realize a very low power consumption contrary to a conventional "external polarity inverting action". The "the same time" in the "at the same time in a lump" is "the same time" having a time range of a series of self-polarity-inverting actions.

The same voltages are applied to all the gate lines GL, the source lines SL, the selecting line SEL, the reference line REF, the auxiliary capacitive line CSL, the boost line BST, and the counter electrode 80 that are connected to the pixel circuits 2 targeted by the self-polarity-inverting action at the same timing. The timing control of the voltage applications is performed by the display control circuit 11 shown in FIG. 1, and the voltage applications are performed by the display control circuit 11, the counter electrode drive circuit 12, the source driver 13, and the gate driver 14, respectively.

Voltages are applied to all the gate lines GL, the source lines SL, the selecting line SEL, the reference line REF, the auxiliary capacitive line CSL, the boost line BST, and the counter electrode 80 that are connected to the pixel circuits 2 targeted by the self-polarity-inverting action at the same timing. At the same timing, the same voltage is applied to all the gate lines GL, the same voltage is applied to all the reference lines REF, the same voltage is applied to all the auxiliary capacitive lines CSL, and the same voltage is applied to all the boost lines BST. The timing control of the voltage applications is performed by the display control circuit 11, and the voltage applications are performed by the display control circuit 11, the counter electrode drive circuit 12, the source driver 13, and the gate driver 14, respectively.

The liquid crystal voltage Vlc is expressed by the following numerical expression 2 using a counter voltage Vcom of the counter electrode 80 and the pixel voltage V20 held by the pixel electrode 20.

$$Vlc = V20 - Vcom \quad \text{(Numerical Expression 2)}$$

The always-on display mode of the embodiment, as in the second embodiment, will be described such that the pixel voltage V20 exhibits two voltage states including the first voltage state and the second voltage state, the first voltage state and the second voltage state being set at a high level (5 V) and a low level (0 V), respectively. At this time, liquid crystal voltage Vlc is +5 V or −5 V when the pixel voltage V20 is different from the counter voltage Vcom, and is 0 V when the pixel voltage V20 and the counter voltage Vcom are the same voltages.

More specifically, by the self-polarity-inverting action, the pixel circuit 2 having liquid crystal voltage Vlc=+5 V has liquid crystal voltage Vlc=−5 V, the pixel circuit 2 having liquid crystal voltage Vlc=−5 V has liquid crystal voltage Vlc=+5 V, and the pixel circuit 2 having liquid crystal voltage Vlc=0 V maintains liquid crystal voltage Vlc=0 V.

More specifically, by the self-polarity-inverting action, the counter voltage Vcom and the pixel voltage V20 transitions from a high level (5 V) to a low level (0 V) or from the low level (0 V) to the high level (5 V). A case in which the counter voltage Vcom transitions from the low level (0 V) to the high level (5 V) will be described below. In this case, a case in which the pixel electrode 20 is programmed in a high-level state before self-polarity-inverting action is defined as a "case A", and a case in which the pixel electrode 20 is programmed in a low level state is defined as a "case B". At this time, in the case A, the pixel voltage V20 transitions from a high level to a low level by the self-polarity-inverting action. In the case B, the pixel voltage V20 transitions from a low level to a high level.

Figure 18:
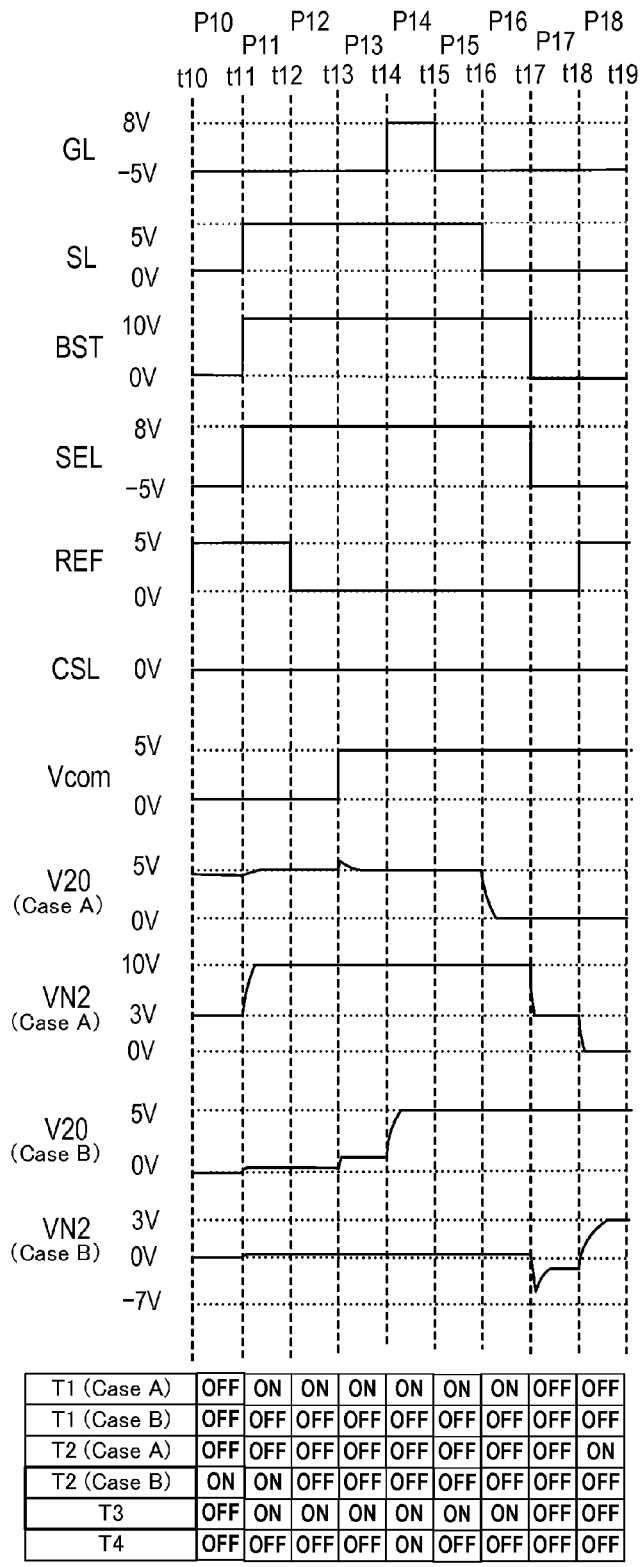
FIG. 18 is a timing chart of a self-polarity-inverting action performed by the pixel circuit of the first type.

FIG. 18 is a timing chart of a self-polarity-inverting action performed by the pixel circuit of the first type. As shown in FIG. 18, the self-polarity-inverting action is exploded into nine phases P10 to P18. Start times of the phases are represented by t10, t11, . . . , t18, respectively. FIG. 18 shows voltage waveforms of all the gate lines GL, the source lines SL, the selecting line SEL, the reference line REF, the auxiliary capacitive line CSL, and the boost line BST that are connected to the pixel circuits 2A targeted by the self-polarity-inverting action, and a voltage waveform of the counter voltage Vcom. In the embodiment, all the pixel circuits of the pixel circuit array are targeted by the self-polarity-inverting action.

Furthermore, in FIG. 18, voltage waveforms of pixel voltages V20 of the nodes N1 in the case A and the case B, a voltage VN2 of the output node N2, and on/off states in the phases of the transistors T1 to T4 are shown.

<<Phase P10>>

In the phase P10 started from time t10, initial state setting for the self-polarity-inverting action is performed.

A voltage is applied to the gate line GL such that the transistor T4 is completely turned off. The voltage is set to −5 V. A voltage (0 V) corresponding to the second voltage state is applied to the source line SL.

A voltage is applied to the selecting line SEL such that the transistor T3 is completely turned off. The voltage is set to −5 V. 0 V is applied to the boost line BST.

The counter voltage Vcom applied to the counter electrode 80 and a voltage applied to the auxiliary capacitive line CSL are set to 0 V. In this embodiment, the voltage applied to the auxiliary capacitive line CSL is fixed to 0 V but is not limited to 0 V. The counter voltage Vcom changes into 5 V to perform polarity inversion in the subsequent phases.

To the reference line REF, a voltage is applied such that the transistor T2 is set to a non-conducting state when a voltage state of the node N1 is a high level (case A) and the transistor T2 is set to a conducting state when the voltage state is a low level (case B). The voltage is set to 5 V.

The reason a negative voltage of −5 V is used as a voltage value applied to the gate line GL to completely set the transistor T4 to an off state is that the pixel voltage V20 may transition to a negative voltage with a change in voltage of the counter voltage Vcom while keeping the liquid crystal voltage Vlc, and, in such a state, it is necessary to prevent the first switch circuit 22 which is in the non-conducting state from being unnecessarily set to a conducting state. In the always-on display mode, since the voltage of the source line SL is in the first voltage state (5 V) or the second voltage state (0 V), even though the voltage of the internal node N1 becomes a negative voltage, the transistor T1 of the second switch circuit 23 functions as a reverse-bias diode. For this reason, the voltage of the selecting line SEL does not always have to be controlled to a negative voltage like the gate line GL to turn off the transistor T3.

<<Phase P11>>

In a phase P11 started from time t11, an application voltage to the source line SL shifts to the first voltage state (5 V).

A voltage is applied to the selecting line SEL such that the transistor T3 is completely turned on. The voltage is set to 8 V.

To the boost line BST, a high-level voltage is applied such that the transistor T1 exhibits a conducting state by raising the potential of the node N2 in the case A. The voltage is set to 10 V. In the case B, since the transistor T2 is in a conducting state, even though the potential of the node N2 is rarely increased by boost raising, and the transistor T1 is still kept in a non-conducting state. Therefore, the second switch circuit 23 is set to a conducting state in the case A, and the second switch circuit 23 is in a non-conducting state in the case B. In both the cases, the first switch circuit 22 is in a non-conducting state.

In the phase P10, when the potential of the node N2 in the case A is at a level at which the transistor T1 can be set to a conducting state, a high-level voltage applying action to the boost line BST does not always have to be performed. The case will be described in detail in the fourth embodiment.

<<Phase P12>>

In a phase P12 started from time t12, a voltage of the reference line REF is set to a low level, and the transistor T2 is set to a non-conducting state regardless of the cases A and B. In this manner, the output node N2 is disconnected from the internal node N1 regardless of the cases A and B. In the case A, the potential VN2 of the output node N2 exhibits a high level by boost raising in the phase P11. On the other hand, in the case B, the potential VN2 of the output node N2 exhibits a low-level potential (approximately 0 V) without being influenced by boost raising. Since the transistor T2 is set to a non-conducting state, even though the potential of the node N1 changes, the potential of the node N2 is kept.

<<Phase P13>>

In a phase P13 started from time t13, the counter voltage Vcom shifts to a high level (5 V).

In this manner, the potential of the counter electrode 80 increases, a potential of the other electrode of the liquid crystal capacitor element Clc, i.e., a potential of the pixel electrode 20 partially increases. A variation in potential at this time is determined by a ratio of the liquid crystal capacitance Clc to a full parasitic capacitance being parasitic in the node N1. The liquid crystal capacitance Clc and the auxiliary capacitance Cs are sufficiently larger than other parasitic capacitance. Actually, the variation in potential is determined by a ratio of the liquid crystal capacitance Clc to a total capacitance of the liquid crystal capacitance Clc and the auxiliary capacitance Cs. As an example, the ratio is set to 0.2. In this case, when the variation in potential of the counter electrode 80 is $\Delta$Vcom, the potential of the pixel electrode 20 increases by 0.2$\Delta$Vcom. Since $\Delta$Vcom=5 V is satisfied, at a point of time t13, a potential V20 of the pixel electrode 20 increases by about 1 V in each of the cases A and B.

However, in the case A, the second switch circuit 23 is in a conducting state. For this reason, a current flowing from the node N1 at which the potential slightly increases from 5 V to the source line SL to which 5 V is applied is generated. In this manner, the pixel voltage V20 decreases toward 5 V with time. On the other hand, in the case B, since the second switch circuit 23 is in a non-conducting state, the above phenomenon does not occur.

As a result, in the phase P13, an absolute value of the liquid crystal voltage Vlc is 1 V at most in the case A, and is about 4 V in the case B. Immediately before time t10, the absolute value of the liquid crystal voltage Vlc is 5 V in the case A, and is 0 V in the case B. More specifically, in the phase P13, the absolute value of the liquid crystal voltage Vlc is a value different from that obtained at a point of time t10 in each of the cases A and B. For this reason, theoretically, after the point of time, a displayed image changes. However, a period until polarity inversion is finally completed is shortened to make a time for a temporary change of the display state short, a variation in average value of the liquid crystal voltage Vlc becomes so small that the variation cannot be visually sensed by a human being. For example, when the period of each of the phases is set to about 30 μsec, the temporary change of the display state is visually neglected by a human being without a problem.

<<Phase P14>>

In a phase P14 started from time t14, a high-level voltage is applied to the gate line GL to set the transistor T4 to a conducting state. The voltage is set to 8 V. The first switch circuit 22 is set to a conducting state by the phase P14.

In the case A, the pixel voltage V20 exhibits 5 V continuously from the phase P13. On the other hand, in the case B, since the first switch circuit 22 is set to a conducting state by the phase P14, a high-level voltage of the source line SL is given to the internal node N1 through the first switch circuit 22, and the pixel voltage V20 exhibits 5 V. More specifically, the pixel voltage V20 is set to the first voltage state in the phase P13 regardless of the cases A and B.

<<Phase P15>>

In a phase P15 started from time t15, a low-level voltage is applied to the gate line GL again to set the transistor T4 to a non-conducting state. In this manner, the first switch circuit 22 is set to a non-conducting state. On the other hand, the second switch circuit 23 is continuously in a conducting state in only the case A, and is in a non-conducting state in the case B.

At this time, when the transistor T4 is completely turned off, the first voltage state (5 V) of the internal node N1 varies by capacitive coupling between the gate of the transistor T4 and the internal node N1. In this case, a voltage of the auxiliary capacitive line CSL may be adjusted, and the variation in voltage of the internal node N1 may be compensated for by capacitive coupling through a second capacitor element C2.

<<Phase P16>>

In a phase P16 started from time t16, a low-level voltage (0 V) corresponding to the second voltage state is applied to the source line SL.

In the case A, since the second switch circuit 23 is in a conducting state, a current flowing from the internal node N1 exhibiting a high-voltage potential to the source line SL through the second switch circuit 23 is generated, and the node N1 has the same potential as that of the source line SL exhibiting the second voltage state. More specifically, the pixel voltage V20 decreases to 0 V.

On the other hand, in the case B, the second switch circuit 23 is in a non-conducting state. As a matter of course, the first switch circuit 22 is also in a non-conducting state. Therefore, the node N1 is not electrically connected to the source line SL, and, as in the case A, a current flowing from the node N1 to the source line SL is not generated. Thereafter, the pixel voltage V20 is continuously kept at 5 V.

At the point of time, −5 V is applied to the liquid crystal voltage Vlc in the case A, and ±0 V is applied in the case B. Therefore, polarity inversion has been completed. Thereafter, the displayed image returns to the image that is displayed immediately before the self-polarity-inverting action is started. After a phase P17, since the absolute value of the Vlc does not change, the displayed image does not change.

<<Phase P17>>

In the phase P17 started from time t17, the application voltage to the boost line BST returns to a low-level voltage (0 V), and a low-level voltage is applied to the selecting line SEL to set the transistor T3 to a non-conducting state. Since the transistor T2 is in a non-conducting state, the potential of the output node N2 is also decreased by voltage drop of the boost line BST.

In the case A, at a point of time in the phase P16, the potential VN2 of the output node N2 is about 10 V. For this reason, in the phase P17, the potential decreases by about 7 V to exhibits about 3 V.

On the other hand, in the case B, at the point of time in the phase P16, the potential VN2 of the output node N2 is about 0 V. Therefore, as in the case A, the VN2 begins to decrease toward about −7 V that is lower than 0 V by 7 V. However, at this time, since the gate potential of the transistor T2 is 0 V, when an absolute value of a negative potential of the output node N2 is larger than a threshold voltage Vth of the transistor T2, the transistor T2 is set to a conducting state in a direction from the internal node N1 to the output node N2. As a result, thereafter, the potential VN2 of the output node N2 begins to increase. The potential VN2 increases to a value at which the transistor T2 is cut off, i.e., to a value that is lower than the gate potential by the threshold voltage Vth, and then stops. In the embodiment, since the threshold voltage Vth of the transistor T2 is 2 V, the VN2 increases to about −2 V and stops.

<<Phase P18>>

In a phase P18 started from time t18, a voltage of the reference line REF is returned to 5 V in the phase P10.

In the case A, immediately before time t18, since a potential of the internal node N1 serving as the source of the transistor T2 is 0 V, a potential difference Vgs with the gate of the transistor T2 is the threshold voltage Vth or more. For this reason, the transistor T2 is set to a conducting state in a direction from the output node N2 to the internal node N1. Since a parasitic capacitance of the internal node N1 is larger than that of the output node N2, the potential VN2 of the output node N2 is attracted by the potential V20 of the internal node N1 to decrease toward 0 V. On the other hand, the potential of the internal node N1 rarely changes, and is still kept at 0 V.

Also in the case B, immediately before time t18, since a potential of the output node N2 serving as the source of the transistor T2 is −2 V, a potential difference Vgs with the gate of the transistor T2 is the threshold voltage Vth or more. For this reason, the transistor T2 is set to a conducting state in a direction from the internal node N1 to the output node N2. In this manner, the potential VN2 of the output node N2 increases to a value at which the transistor T2 is cut off, i.e., to a value that is lower than the gate potential (5 V) by the threshold voltage Vth, and then stops. In the embodiment, since the threshold voltage Vth is 2 V, the value of the VN2 increases to about 3 V, and then stops. The value corresponds to the value VN2 at time t10 in the case A.

In a conventional external polarity inverting action, since the gate lines GL need to be scanned in a vertical direction one by one, a high-level voltage needs to be applied to the gate lines GL the number of which is the number (n) of gate lines. Furthermore, the source driver 13 also needs to be driven n times at most. In contrast to this, according to the method of the embodiment, when the voltage application steps according to the phases P10 to P18 are commonly performed to all the pixels, the polarity of the liquid crystal voltage Vlc can be inverted while switching the counter voltage Vcom between a high level and a low level. Therefore, since the numbers of times of voltage application to the gate line GL and voltage application to the source line SL can be considerably reduced, power consumptions of the gate driver 14 and the source driver 13 can be considerably reduced.

In FIG. 18, the case in which the counter voltage Vcom transitions from the low level (0 V) to the high level (5 V) is explained. However, when the counter voltage Vcom transitions from the high level (5 V) to the low level (0 V), the transition timing is the same as described above. When the phase P13 starts (t13), the transition is performed.

At this time, at a point of time before polarity inversion, the liquid crystal voltage Vlc is ±0 V in the case A, and is −5 V in the case B. In the case A, the pixel voltage V20 is set to the second voltage state (0 V) at a point of time in the phase P16, and the liquid crystal voltage Vlc returns to ±0 V. In the case B, the pixel voltage V20 is forcibly set to the first voltage state in the phase P14, and the liquid crystal voltage Vlc becomes +5 V. More specifically, the voltage changes from −5 V to +5 V, and polarity inversion is executed.

The self-polarity-inverting action according to the embodiment will be concluded as follows.

The first switch circuit 22 is set in a non-conducting state for the phases P10 to P13. In the phase P11, boost raising is performed to set the transistor T1 to a conducting state in only the case A in which the transistor T1 is in a non-conducting state. A voltage of the source line SL is set to the first voltage state (5 V), and the second switch circuit 23 is set to a conducting state to set the node N1 to the first voltage state (5 V).

In the phase P12, the transistor T2 is set to a non-conducting state in both the cases A and B. After the polarity of Vcom is inverted in the phase P13, the first switch circuit 22 is set to a conducting state in the phase P14. In this manner, the internal node N1 is set to the first voltage state (5 V) in both the cases.

Thereafter, after the first switch circuit 22 is set to a non-conducting state in the phase P15, the voltage of the source SL is set to a second voltage state (0 V) in the phase P16. In this manner, the node N1 is set to the second voltage stage (0 V) in only the case A in which the second switch circuit 23 is in a conducting state. In the case B, since both the first switch circuit 22 and the second switch circuit 23 are in a non-conducting state at the point of time, the node N1 is kept in the first voltage state (5 V).

The second switch circuit 23 in the case A is set to a non-conducting state in the phase P17, and the conducting state of the transistor T2 is returned to the state in the phase P10 in the phase P18.

Based on the above, it can be understood that the same timing chart as that in FIG. 18 is applied to circuits of the second and third types to make it possible to realize all the same self-polarity-inverting action.

Figure 19:
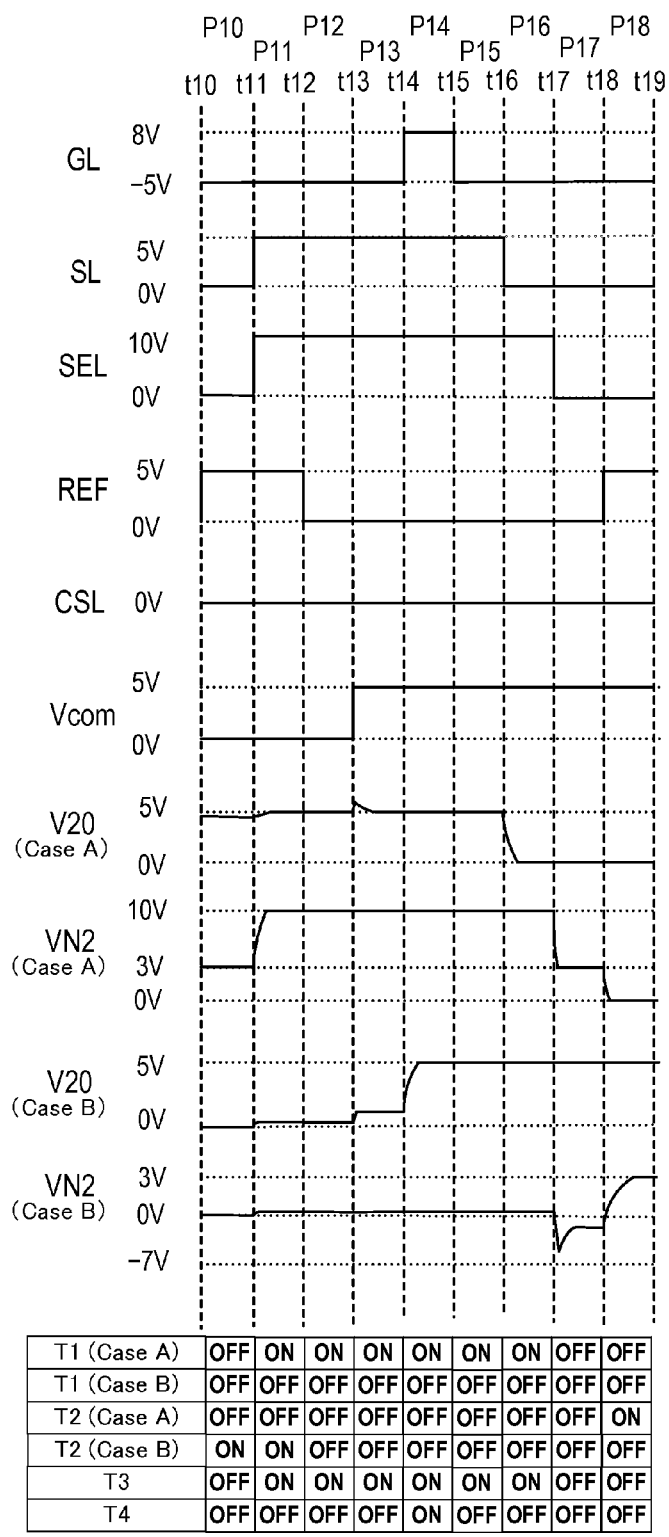
FIG. 19 is a timing chart of self-polarity-inverting actions performed by the pixel circuits of the fourth to sixth types.

Referring to FIG. 18, it is found that a voltage pulse is applied to the selecting line SEL and the boost line BST at the same timing. A voltage to set the transistor T3 to a conducting state in the phases P11 to P16 and a voltage to set the transistor T3 to a non-conducting state in the phases P17 to P18 may be given to the selecting line SEL. Thus, the application voltage of the boost line BST shown in FIG. 18 is applied to the selecting line SEL to make it possible to realize a self-polarity-inverting action in the pixel circuits of the fourth to sixth types. A timing chart obtained at this time is shown in FIG. 19. Since the actions are common in the first type, an explanation thereof will be omitted.

In the method according to the embodiment, since the internal node N1 is shifted to the first voltage state in both the cases A and B by the phase P14, an application voltage to the source line SL is not always set to the first voltage state in a stage previous to the phase P14. As shown in the timing charts in FIGS. 18 and 19, when application voltages to the boost line BST and the selecting line SEL are set at a high level in the phase P11, at the point of time, the second switch circuit 23 is set to a conducting state in the case A. For this reason, thereafter, when the second voltage state (0 V) is applied to the source line SL, the internal node N1 in the case A decreases from the first voltage state (5 V) to the second voltage state (0 V).

Since the internal node N1 is forcibly returned to the first voltage state (0 V) again in the phase P14, even though the above action is performed, polarity inversion is correctly executed. However, in comparison with the method described above, the potential of the internal node N1 largely varies. In a method of setting application voltages to the boost line BST and the selecting line SEL at a high level in the phase P11, in order to suppress the variation in the internal node N1 in a self-polarity-inverting action period as much as possible, an application voltage to the source line SL is preferably set to the first voltage state (5 V) at a point of time in the phase P11.

Figure 20:
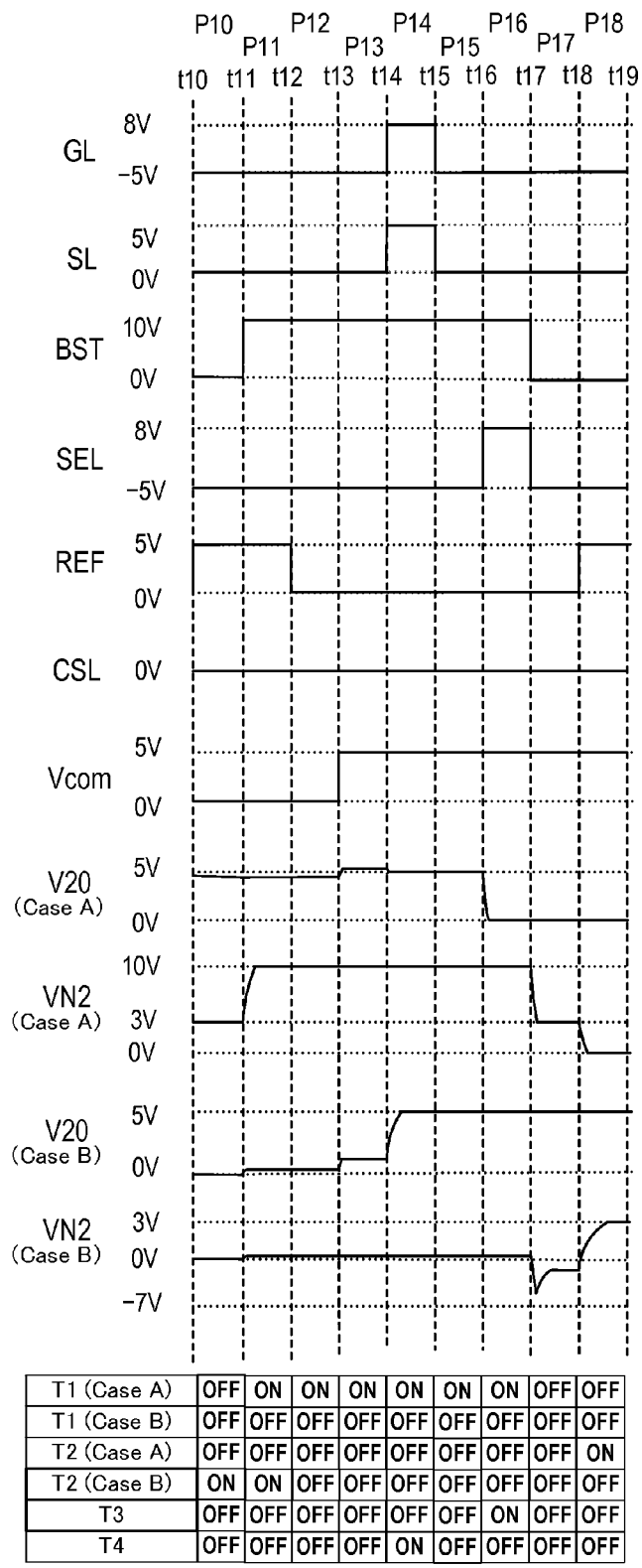
FIG. 20 is another timing chart of a self-polarity-inverting action performed by the pixel circuit of the first type.

When the boost line BST and the selecting line SEL are independently configured, an application voltage to the selecting line SEL may be set to a high-level voltage in only the phase P16 in which the internal node N1 is set to the second voltage state through the second switch circuit 23 in only the case A, and may be set to a low-level voltage in other periods. An example of a timing chart obtained at this time is shown in FIG. 20 (the pixel circuit 2A of the first type). In this case, since high-level voltage application to the boost line BST and high-level voltage application to the selecting line SEL can be performed at different timings, also in the case A, the second switch circuit 23 can be set to a non-conducting state in boost raising. Thus, even though an application voltage to the source line SL is set to the first voltage state (0 V) in a stage previous to the phase P14, a variation in potential of the internal node N1 in the case A does not occur.

Figure 21:
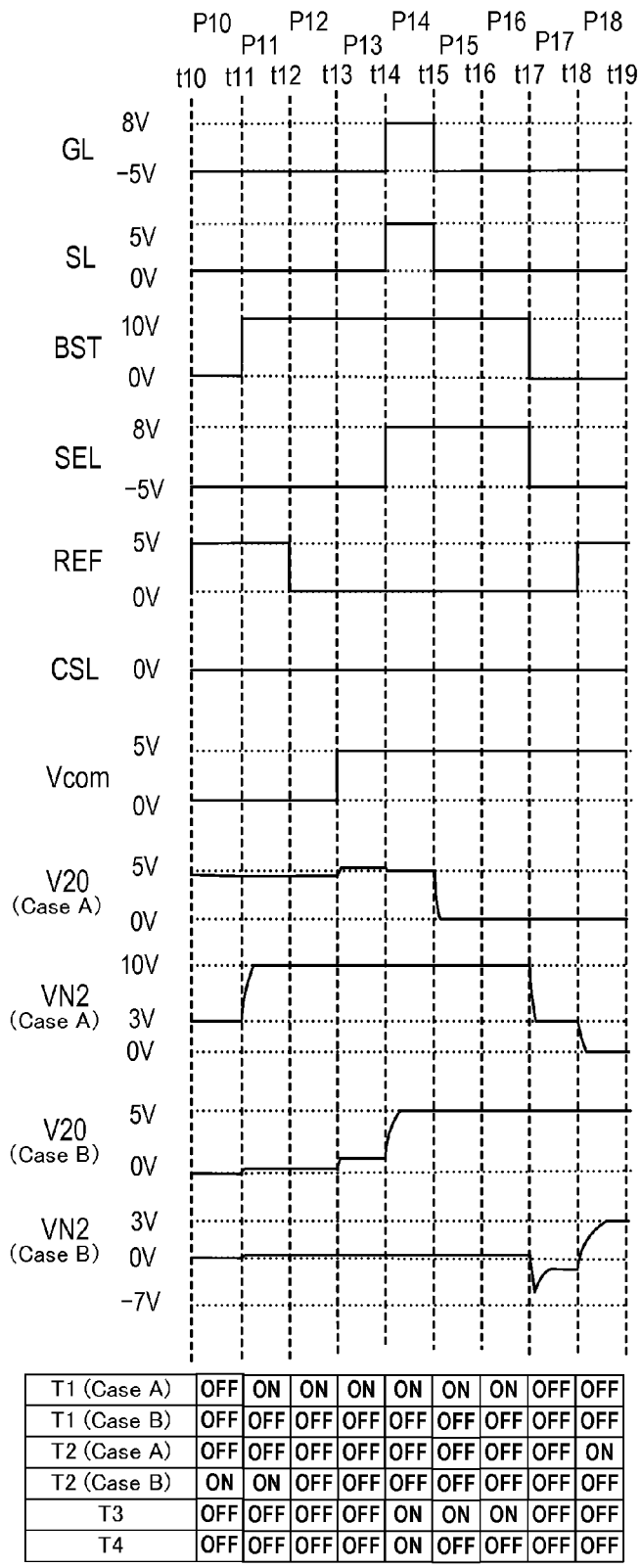
FIG. 21 is another timing chart of self-polarity-inverting actions performed by the pixel circuits of the second to third types.

In the pixel circuits of the second and third types, the transistor T3 needs to be set to a conducting state at a point of time in the phase P14. For this reason, in the phases P14 to P16, a high-level voltage may be applied to the selecting line SEL (see FIG. 21).

Inversion of the counter voltage Vcom in the phase P13 need only be performed before high-level voltage application to the gate line GL in the phase P14 is ended. After fall time t12 of an application voltage to the reference line REF, the counter voltage Vcom can be inverted before fall time t15 of an application voltage to the gate line GL.

Fourth Embodiment

In the fourth embodiment, a case in which self-polarity inversion is performed on the basis of a sequence different from that in the third embodiment will be described with reference to the accompanying drawings. Even in this embodiment, as in the third embodiment, the pixel circuit 2A of the first type shown in FIG. 6 will be typically explained.

As in the third embodiment, voltages are applied to all the gate lines GL, the source lines SL, the selecting line SEL, the reference line REF, the auxiliary capacitive line CSL, the boost line BST, and the counter electrode 80 that are connected to the pixel circuits 2 targeted by the self-polarity-inverting action at the same timing. At the same timing, the same voltage is applied to all the gate lines GL, the same voltage is applied to all the reference lines REF, the same voltage is applied to all the auxiliary capacitive lines CSL, and the same voltage is applied to all the boost lines BST.

Figure 22:
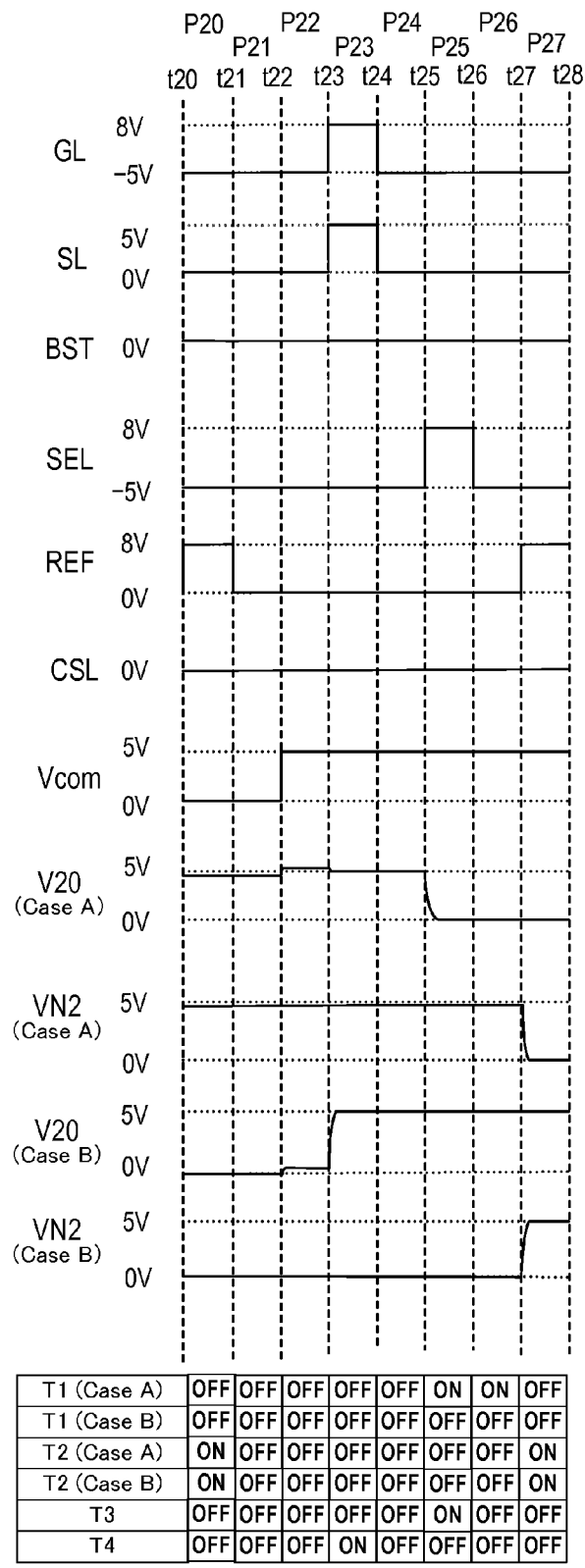
FIG. 22 is still another timing chart of a self-polarity-inverting action performed by the pixel circuit of the first type.

FIG. 22 is a timing chart of a self-polarity-inverting action according to the embodiment. As shown in FIG. 22, the self-polarity-inverting action is exploded into eight phases P20 to P27. Start times of the phases are represented by t20, t21, . . . , t27, respectively. Items shown in FIG. 22 are the same as those in FIG. 18. An explanation of parts common in the third embodiment will be arbitrarily omitted.

<<Phase P20>>

In a phase P20 started from time t20, an initial state setting operation before the self-polarity-inverting action is started is performed.

Application voltages to the gate line GL, the source line SL, the selecting line SEL, the boost line BST, and the auxiliary capacitive line CSL and the counter voltage Vcom are the same as those in the phase P10 in the third embodiment.

A voltage value that sets the transistor T2 to a conducting state is applied to the reference line REF regardless of a voltage state of the internal node N1. The voltage is necessarily higher than the voltage in the phase P10 in the third embodiment. The voltage is set to 8 V. In this manner, the transistor T2 exhibits a conducting state in both the cases A and B.

In this manner, in both the cases A and B, the nodes N1 and N2 exhibit the same potential. Both the nodes exhibit the first voltage state in the case A, and both the nodes exhibit the second voltage state in the case B. At this time, the transistor T1 exhibits a cut-off state.

<<Phase P21>>

In the phase P21 started from time t21, the reference line REF is set at a low level (0 V), and the transistor T2 is turned off in both the cases A and B. In this manner, the output node N2 is disconnected from the internal node N1 in both the cases A and B.

<<Phase P22>>

In a phase P22 started from time t22, the counter voltage Vcom shifts to a high level (5 V). In this manner, as in the phase P13, the potential V20 of the pixel electrode 20 increases by about 1 V in each of the cases A and B. On the other hand, the output node N2 is not influenced by an increase in counter voltage Vcom because the transistor T2 is in an off state, and an immediately previous potential is kept. In a period from time t22 when the phase P22 is started to time t25 when the phase P25 is started, an absolute value of the liquid crystal voltage Vlc is different from that obtained at a point of time t20. However, since the period is very short, a change of an image cannot be visually recognized, and a problem is not posed. After time t25, the absolute value of the liquid crystal voltage Vlc is the same as that obtained immediately before time t11 in both the cases A and B.

<<Phase P23>>

In a phase P23 started from time t23, a high-level voltage is applied to the gate line GL to set the transistor T4 to a conducting state. The voltage is set to 8 V. In this manner, in the pixel circuit 2A, the first switch circuit 22 is set to a conducting state.

An application voltage to the source line SL shifts to the first voltage state (5 V). In this manner, the potential V20 of the internal node N1 is shifted to the first voltage state regardless of the cases A and B. Since the transistor T2 is in a non-conducting state, the potential VN2 of the node N2 is still kept in the state in the phase P22.

<<Phase P24>>

In a phase P24 started from time t24, a low-level voltage is applied to the gate line GL again to set the transistor T4 to a non-conduction state. In this manner, the first switch circuit 22 is set to a non-conducting state. An application voltage to the source line SL shifts to the second voltage state (0 V). Since the first switch circuit 22 is in a non-conducting state, the potential of the internal node N1 is kept at the value in the phase P23.

At this time, when the transistor T4 is completely turned off, the first voltage state (5 V) of the internal node N1 may vary by capacitive coupling between the gate of the transistor T4 and the internal node N1. In this case, a voltage of the auxiliary capacitive line CSL may be adjusted, and the variation in voltage of the internal node N1 may be compensated for by capacitive coupling through the second capacitor element C2.

<<Phase P25>>

In a phase P25 started from time t25, a voltage is applied to the selecting line SEL such that the transistor T3 is completely turned off. The voltage is set to 8 V.

At this time, in the case A, the potential VN2 of the output node N2 is about 5 V, and 0 V is applied to the source line SL. For this reason, the transistor T1 is turned on. More specifically, the second switch circuit 23 is set to a conducting state. Immediately before time t25, the potential V20 of the internal node N1 exhibits about 5 V, and 0 V is applied to the source line SL. Thus, a current is generated from the internal node N1 to the source line SL through the second switch circuit 23. In this manner, the potential V20 of the internal node N1 transitions to the second voltage state (0 V). On the other hand, in the case B, since the VN2 is about 0 V, the transistor T1 is still in an off state. That is, the second switch circuit 23 is in a non-conducting state, and the potential of the internal node N1 is kept at 5 V.

At the point of time, −5 V is applied to the liquid crystal voltage Vlc in the case A, and ±0 V is applied in the case B. Therefore, polarity inversion has been completed. Thereafter, the displayed image returns to the image that is displayed immediately before the self-polarity-inverting action is started. After a phase P25, since the absolute value of the Vlc does not change, the displayed image does not change.

<<Phase P26>>

In a phase P26 started from time t26, an application voltage to the selecting line SEL returns to a low level (0 V) to set the transistor T3 to a non-conducting state. In this manner, the internal node N1 is electrically separated from the source line SL.

<<Phase P27>>

In a phase P27 started from time t27, regardless of the cases A and B, a voltage is applied to reference line REF such that the transistor T2 is set to a conducting state. The voltage is set to 8 V.

In this manner, in both the cases A and B, the nodes N1 and N2 are electrically connected to each other and have the same potential. Since a parasitic capacitance of the internal node N1 is larger than that of the output node N2, the potential of the output node N2 changes toward the potential of the internal node N1. More specifically, the potential V20 of the node N2 is set to a second voltage state (0 V) in the case A, and the potential V20 is set to a first voltage state (5 V) in the case B.

When a configuration that is shown in FIG. 7 and in which one terminal of the transistor T1 is directly connected to the source line SL is employed as the pixel circuit 2A of the first type, 5 V is applied to the node N2, and 0 V is applied to the source line SL. For this reason, since a potential difference that is equal to or larger than a threshold voltage is generated between the gate and the source of the transistor T1, the transistor T1 is set to a conducting state in the phase P20. This state is continued until the phase P24. After the phase P25, the same actions as those in the pixel circuit in FIG. 6 are performed.

In the method according to this embodiment, even though the transistor T3 is in an on state in the phase P23, +5 V is applied to the source line SL at this time. For this reason, a potential of the internal node N1 can be set to the first voltage state. Based on this, a rise timing of the selecting line SEL can be advanced as in the third embodiment. The case will be described below with reference to FIG. 23.

The selecting line SEL rises to 8 V before the reference line REF is dropped to 0 V. With the rising of the selecting line SEL, 5 V is applied to the source line SL. At this time, the transistor T3 is turned on, and 5 V is applied to, of the terminals of the transistor T1, a terminal on the opposite side of the internal node N1. In the case B, since the potential of the output node N2 is about 0 V, the transistor T1 is in an off state. Even in the case A, since the potential of the output node N2 is about 5 V, a voltage that is equal to or higher than the threshold voltage is not applied across the gate and the source, and the transistor T1 is still in an off state.

The reference line REF is set to 0 V in the phase P22 to set the transistor T2 to an off state. Thereafter, as in the above embodiment, after the counter voltage Vcom is shifted to a high level (phase P23), the gate line GL is set to a high level (phase P24). At this time, since 5 V has been applied to the source line SL, the potential V20 of the internal node N1 is set to the first voltage state in both the cases. Thereafter, in the phase P25, the gate line GL is shifted to a low level, and an application voltage to the source line SL is shifted to the second voltage state.

At this time, since the selecting line SEL has been set at a high level, the same voltage state as in the phase P25 in the timing chart in FIG. 22 is obtained. More specifically, the transistor T1 is set to a conducting state in only the case A, and the potential of the internal node N1 decreases to the second voltage state. On the other hand, in the case B, since the potential of the output node N2 is low, the transistor T1 is still in a non-conducting state. For this reason, the potential of the internal node N1 is continuously maintained in the first voltage state.

Thereafter, the same voltages as those in the timing chart in FIG. 22 need only be supplied. More specifically, after the selecting line SEL is shifted to a low level in the phase P26 to turn off the transistor T3, the reference line REF is shifted to a high level in the phase P27 to turn on the transistor T2. In this manner, the potential V20 of the internal node N1 appears at the output node N2.

In this manner, when the internal node N1 is set to the first voltage state through the transistor T4, the source line SL can be set to the first voltage state. For this reason, the selecting line SEL can be shifted to a high level in a stage before the gate line GL is shifted to a high level.

In the method shown in the timing chart in FIG. 22, the first switch circuit 22 needs to be set to a conducting state in the phase P23. For this reason, when the first switch circuit 22 is the pixel circuit of the second or third type configured by a series circuit of the transistor T4 and another transistor element, a part of the sequence needs to be changed. The second and third types are the same in that connection/disconnection control of another transistor element connected in series with the transistor T4 is performed by the selecting line SEL. For this reason, the pixel circuits of the second and third types are realized by the same sequence. A timing chart to perform a self-polarity-inverting action according to this embodiment to pixel circuits 2B and 2C of the second and third types is shown in FIG. 24.

Figure 24:
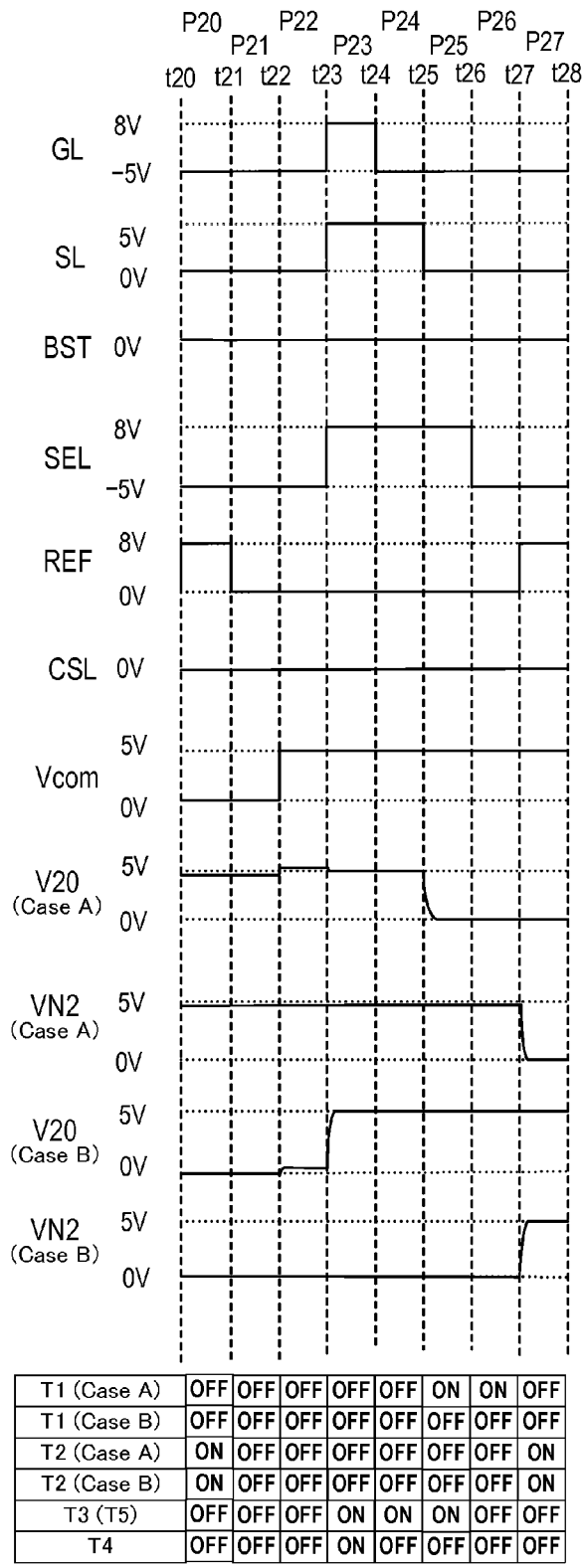
FIG. 24 is a timing chart of self-polarity-inverting actions performed by the pixel circuits of the second to third types.

FIG. 24 is different from FIG. 22 in that a high-level voltage is applied to the selecting line SEL in the phase P23. In this manner, the transistor T3 is set to a conducting state in the phase P23. In the pixel circuit 2C, the transistor T5 is also set to a conducting state. In this manner, the first switch circuit 22 is set to a conducting state, and the node N1 and the source line SL are electrically connected to each other.

Thereafter, a high-level voltage is continuously applied to the selecting line SEL until the phase P25. FIG. 24 is the same as FIG. 22 in that an application voltage to the selecting line SEL is shifted to a low level in the phase P26.

In this embodiment, since the first switch circuit 22 and the second switch circuit 23 are in a non-conducting state in a stage previous to the phase P14, an application voltage to the source line SL may be set to the first voltage state (0 V) or may be set to the second voltage state (5 V) during that period.

As in the third embodiment, inversion of the counter voltage Vcom may be performed before fall time t15 of the application voltage to the gate line GL after fall time t12 of the application voltage of the reference line REF.

In the second and third types, when the first switch circuit 22 is set to a non-conducting state, as shown in FIG. 19, the transistor T4 is completely turned off. For this reason, a voltage of the selecting line SEL to turn off the transistor T3 may not be −5 V but 0 V.

Figure 23:
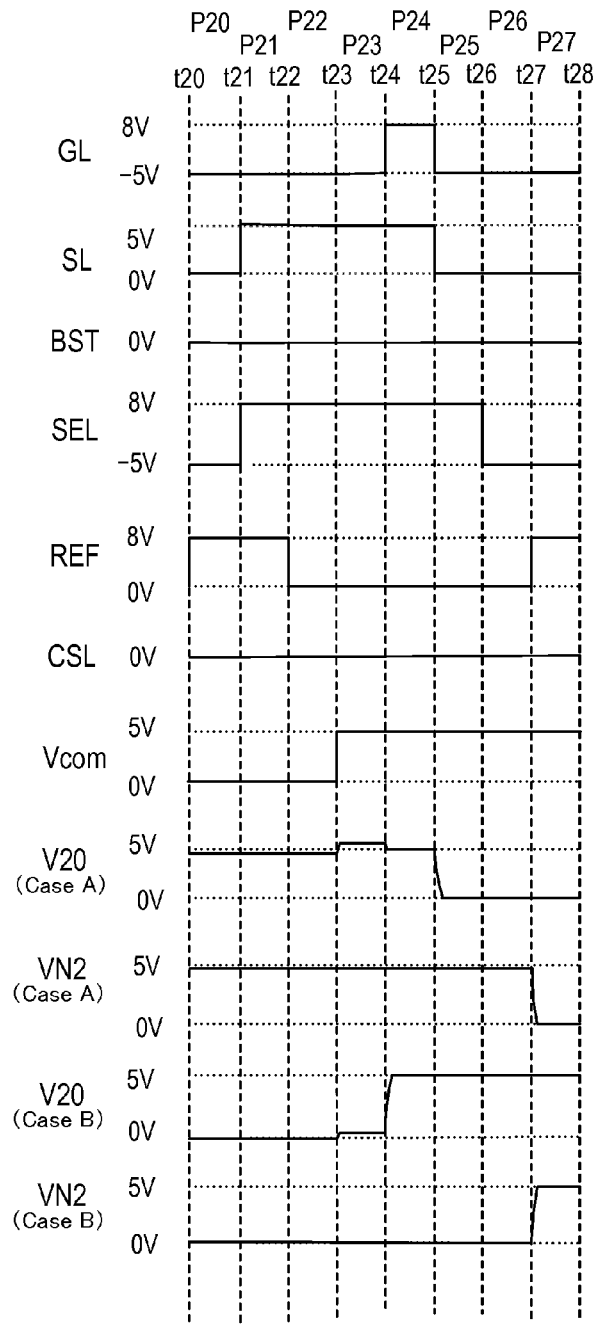
FIG. 23 is still another timing chart of a self-polarity-inverting action performed by the pixel circuit of the first type.

On the other hand, in the method shown in FIG. 23, 5 V is applied to the selecting line SEL when the gate line GL is shifted to a high level. Thus, it is understood that a self-polarity-inverting action can be executed by the same voltage applying method as that in FIG. 23 in the second and third types. Since a timing chart to be used is the same as that in FIG. 23, an explanation of the timing chart will be omitted.

In the method shown in the timing chart in FIG. 22, unlike in the third embodiment, a high-level voltage is not applied to the boost line BST. In the phase P25, a high-level voltage is applied to the selecting line SEL to set the transistor T3 to a conducting state. The second switch circuit 23 needs to be set to a conducting state in the case A, and the second switch circuit 23 needs to be set to a non-conducting state in the case B.

However, as in pixel circuits 2D to 2F of the fourth to sixth types, when the selecting line SEL serves as the boost line BST, the transistor T2 is in an off state in the phase P25. For this reason, a high-level voltage is applied to the selecting line SEL to raise the potential of the internal node N2. In this manner, the transistor T1 is set to a conducting state not only in the case A but also in the case B. Thus, the method shown in the timing chart in FIG. 22 cannot be employed in the pixel circuits of the fourth to sixth types.

On the other hand, when the method shown in FIG. 23 is used, self-polarity inversion can be performed to the pixel circuit 2D of the fourth type (see FIG. 13).

More specifically, after 8 V is applied to the reference line REF in the phase P20 to set the transistor T2 to a conducting state, a high-level voltage is applied to the selecting line SEL in the phase P21, and 5 V is applied to the source line SL. In the pixel circuit 2D of the fourth type, although the selecting line SEL is connected to one terminal of a first capacitor element Cbst, the transistor T2 is in a conducting state in both the cases. For this reason, even though a voltage level of the selecting line SEL rises, a potential of the output node N2 rarely rises. At this time, the transistor T3 is turned on, and 5 V is applied to, of the terminals of the transistor T1, a terminal on the opposite side of the internal node N1. In the case B, since the potential of the output node N2 is about 0 V, the transistor T1 is in an off state. Even in the case A, since the potential of the output node N2 is about 5 V, a voltage that is equal to or higher than the threshold voltage is not applied across the gate and the source, and the transistor T1 is still in an off state.

The reference line REF is set to 0 V in the phase P22 to set the transistor T2 to an off state. Thereafter, after the counter voltage Vcom is shifted to a high level (phase P23), the gate line GL is set to a high level (phase P24). At this time, since 5 V has been applied to the source line SL, the potential V20 of the internal node N1 is set to the first voltage state in both the cases. Thereafter, in the phase P25, the gate line GL is shifted to a low level, and a voltage applied to the source line SL is shifted to the second voltage state.

At this time, since the selecting line SEL has been at a high level, the transistor T1 is set to a conducting state only in the case A, and a potential of the internal node N1 decreases to the second voltage state. On the other hand, in the case B, since the potential of the output node N2 is low, the transistor T1 is still in a non-conducting state. For this reason, the potential of the internal node N1 is continuously maintained in the first voltage state.

Thereafter, the reference line REF is set at a high level, and the reference line REF in the phase P26 is set at a high level to turn on the transistor T2. In this manner, the potential V20 of the internal node N1 appears at the output node N2.

After the transistor T2 is turned on in the phase P26, the selecting line SEL is shifted to a low level in the phase P27. In this manner, the node N2 is slightly influenced by a variation in potential. When voltage application is performed by the above procedures, the self-polarity-inverting action is executed. A timing chart obtained at this time is shown in FIG. 25.

Figure 25:
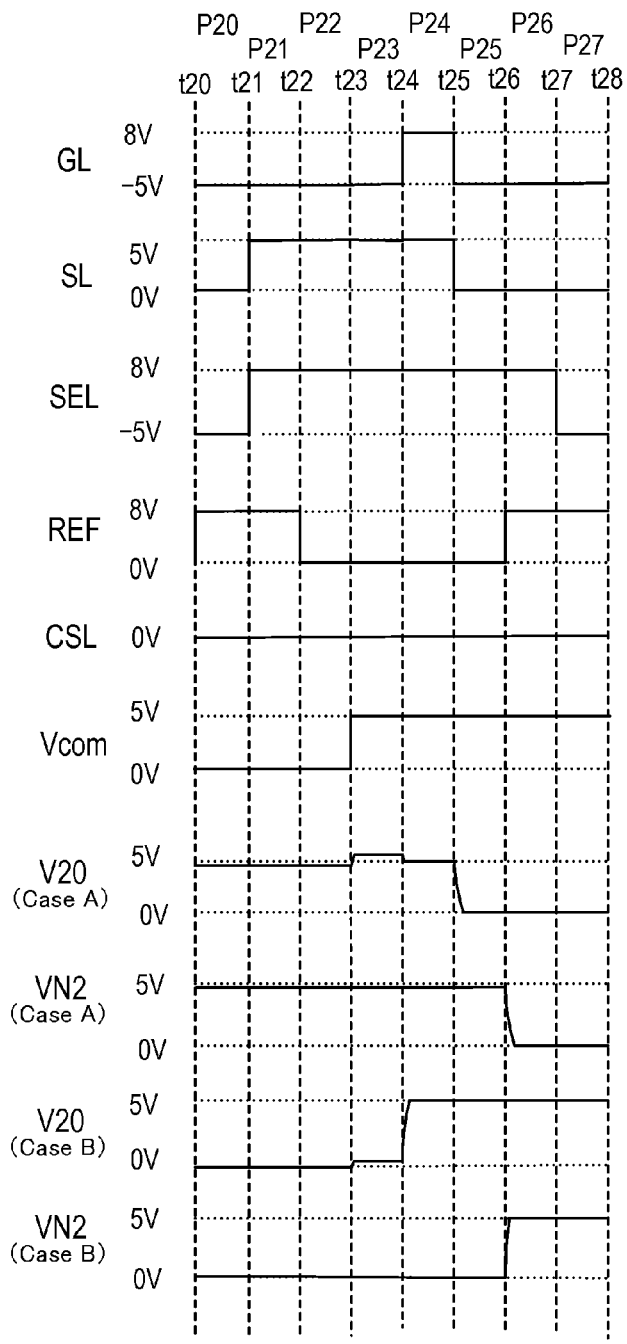
FIG. 25 is a timing chart of self-polarity-inverting actions performed by the pixel circuits of the fourth to sixth types.

Referring to FIG. 25, when the gate line GL is shifted to a high level, 5 V is applied to the selecting line SEL. Thus, it is understood that a self-polarity-inverting action can be executed by the same voltage applying method as that in FIG. 25 in the fifth and sixth types. Since a timing chart to be used is the same as that in FIG. 25, an explanation of the timing chart will be omitted.

Fifth Embodiment

In the fifth embodiment, a programming action in an always-on display mode will be described in units of types with reference to the accompanying drawings.

In the programming action in the always-on display mode, pixel data of one frame is divided in units of display lines in a horizontal direction (row direction), and a binary voltage corresponding to each pixel data of one display line, i.e., a high-level voltage (5 V) or a low-level voltage (0 V) is applied to the source lines SL of the columns for each horizontal period. A selected raw voltage of 8 V is applied to the gate line GL of a selected display line (selected row) to set the first switch circuits 22 of all the pixel circuits 2 of the selected row to a conducting state, and voltages of the source lines SL of the columns are transferred to the internal node N1 of each of the pixel circuits 2 of the selected row.

A non-selected row voltage of −5 V is applied to the gate lines GL of display lines (non-selected rows) except for the selected display lines to set the first switch circuits 22 of all the pixel circuits 2 of the non-selected row to a non-conducting state. Timing control of a voltage application of each signal line in a programming action (will be described later) is performed by the display control circuit 11, and each voltage application is performed by the display control circuit 11, the counter electrode drive circuit 12, the source driver 13, and the gate driver 14.

<<First Type>>

Figure 26:
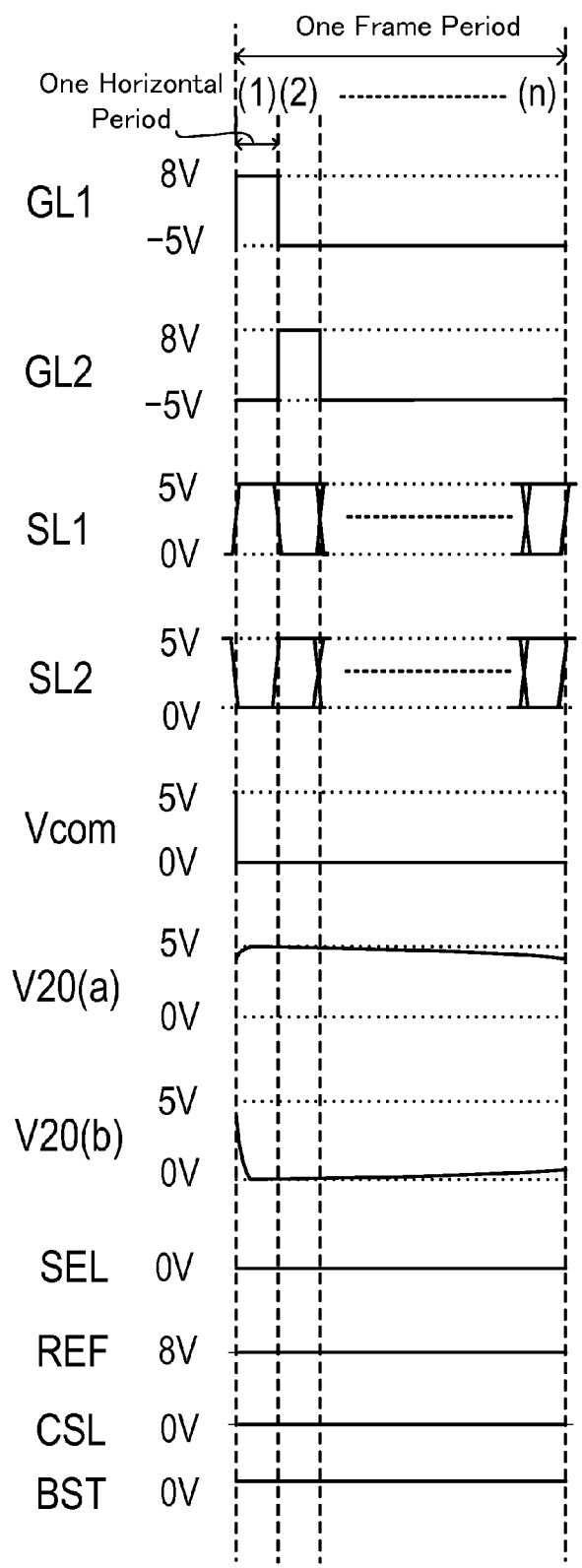
FIG. 26 is a timing chart of a programming action in the always-on display mode performed by the pixel circuit of the first type.

FIG. 26 is a timing chart of a programming action using the pixel circuit 2A of the first type. FIG. 26 shows voltage waveforms of two gate lines GL1 and GL2, two source lines SL1 and SL2, the selecting line SEL, the reference line REF, the auxiliary capacitive line CSL, and the boost line BST in a 1-frame period and a voltage waveform of the counter voltage Vcom. Furthermore, in FIG. 26, voltage waveforms of the pixel voltages V20 of the internal nodes N1 of the two pixel circuits 2A are additionally shown. One of the two pixel circuits 2A is a pixel circuit 2A(a) selected by the gate line GL1 and the source line SL1, and the other is a pixel circuit 2A(b) selected by the gate line GL1 and the source line SL2. The pixel circuits are discriminated from each other by adding (a) and (b) to the backs of the pixel voltages V20 in FIG. 26.

A 1-frame period is divided into horizontal periods the number of which is the number of gate lines GL, and gate lines GL1 to GLn to be selected are sequentially allocated to the horizontal periods, respectively. FIG. 26 shows changes in voltage of the two gate lines GL1 and GL2 in the first two horizontal periods. In the first horizontal period, a selected-row voltage of 8 V is applied to the gate line GL1, and a non-selected row voltage of −5 V is applied to the gate line GL2. In the second horizontal period, the selected-row voltage of 8 V is applied to the gate line GL2, and the non-selected row voltage of −5 V is applied to the gate line GL1. In the subsequent horizontal periods, the non-selected row voltage of −5 V is applied to both the gate lines GL1 and GL2.

Voltages (5 V, 0 V) corresponding to pixel data of a display line corresponding to each horizontal period are applied to the source lines SL of the respective columns. In FIG. 26, the two source lines SL1 and SL2 are shown as typical source lines SL. In the example shown in FIG. 26, to explain a change of the pixel voltage V20, voltages of the two source lines SL1 and SL2 of the first horizontal period are separately set to 5 V and 0 V, respectively.

In the pixel circuit 2A of the first type, since the first switch circuit 22 is configured by only the transistor T4, connection/disconnection control of the first switch circuit 22 is sufficiently performed by on/off-controlling only the transistor T4. Furthermore, the second switch circuit 23 need not be set to a conducting state in the programming action, and, in order to prevent the second switch circuit 23 from being set to a conducting state in the pixel circuit 2A of a non-selected row, in a 1-frame period, a non-selected voltage of 0 V (may be −5 V) is applied to the selecting line SEL connected to all the pixel circuits 2A. The same voltage as that of the selecting line SEL is also applied to the boost line BST.

In order to always set the transistor T2 to an on-state regardless of a voltage state of the internal node N1, 8 V that is higher than a high-level voltage (5 V) by a threshold voltage (about 2 V) or more is applied to the reference line REF in a 1-frame period. In this manner, the output node N2 and the internal node N1 are electrically connected, and auxiliary capacitor element Cs connected to the internal node N1 can be kept at the pixel voltage V20 to stabilize the pixel voltage V20. The auxiliary capacitive line CSL is fixed to a predetermined fixed voltage (for example, 0 V). Although the counter AC drive is performed at the counter voltage Vcom, the counter voltage Vcom is fixed to 0 V or 5 V in a 1-frame period. In FIG. 26, the counter voltage Vcom is fixed to 0 V.

<<Second, Third Types>>

The sequences of the second and third types are different from the sequence of the first type in that, since the first switch circuit 22 is configured by a series circuit of the transistor T4 and another transistor (T3 or T5), the transistor T3 or T5 needs to be set to a conducting state in a programming action.

Figure 27:
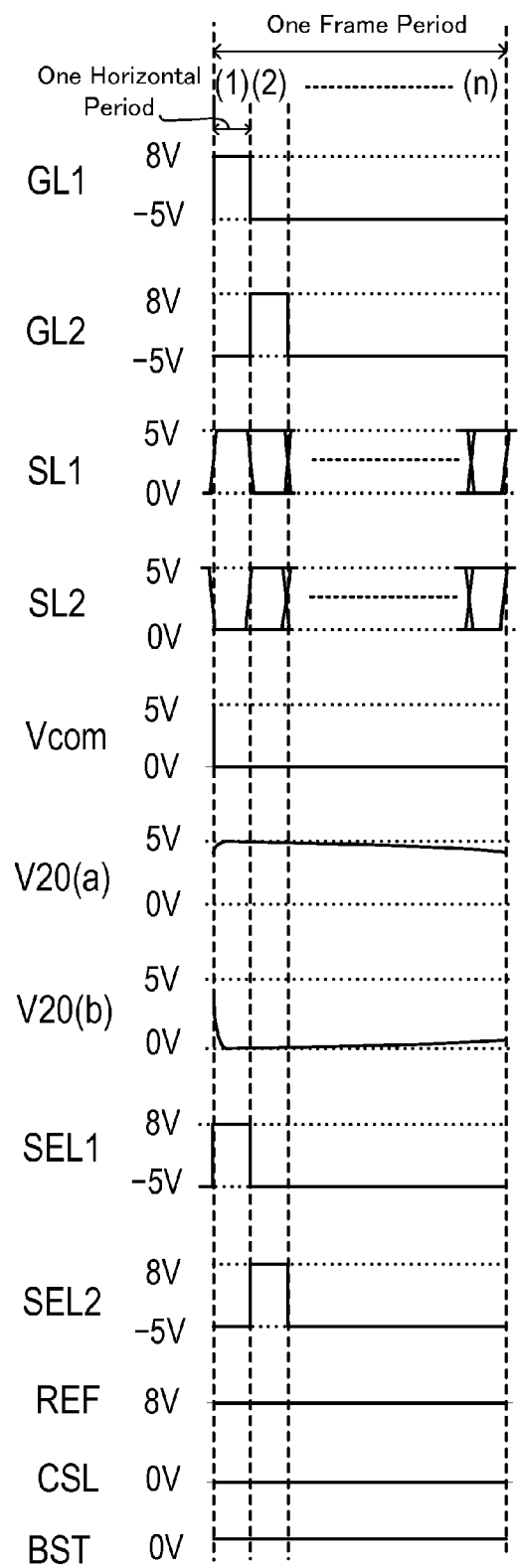
FIG. 27 is a timing chart of programming actions in the always-on display mode performed by the pixel circuits of the second to third types.

FIG. 27 is a timing chart of a programming action using the pixel circuits 2B and 2C of the second and third types. The items shown in FIG. 27 are the same as those in FIG. 26 except that two selecting lines SEL1 and SEL2 are shown.

Voltage application timings and voltage amplitudes of the gate lines GL (GL1, GL2) and source lines SL (SL1, SL2) are all the same as those in FIG. 26.

In the pixel circuits 2B and 2C, since the first switch circuit 22 is configured by the series circuit of the transistor T4 and the transistor T3 or T5, in connection/disconnection control of the first switch circuit 22, in addition to on/off-control of the transistor T4, on/off-control of the transistor T3 or T5 are required. Since the transistor T5 in the pixel circuit 2C has a control terminal connected to the control terminal of the transistor T3, the on/off-control of the transistors T3 and T4 is actually necessary.

Therefore, in the second and third types, all the selecting lines SEL are not controlled in a lump, but independently controlled in units of rows like the gate lines GL. More specifically, the selecting lines SEL the number of which is the same as the number of gate lines GL1 to GLn are arranged in units of rows one by one, and the selecting lines SEL are sequentially selected like the gate lines GL1 to GLn.

FIG. 27 shows changes in voltage of the two selecting lines SEL1 and SEL2 in the first two horizontal periods. In the first horizontal period, a selecting voltage of 8 V is applied to the selecting line SEL1, and a non-selecting voltage of −5 V is applied to the selecting line SEL2. In the second horizontal period, the selecting voltage of 8 V is applied to the selecting line SEL2, and the non-selecting voltage of −5 V is applied to the selecting line SEL1. In the subsequent horizontal periods, the non-selecting voltage of −5 V is applied to both the selecting lines SEL1 and SEL2.

Application voltages to the reference line REF, the auxiliary capacitive line CSL, and the boost line BST and the counter voltage Vcom are the same as those in the first type shown in FIG. 26. In a non-selected row, when the first switch circuit 22 is set to a non-conducting state, the transistor T4 is completely set to an off state. For this reason, a non-selecting voltage of the selecting line SEL to turn off the transistor T3 may not be −5 V but 0 V.

In the first to third types, since the boost line BST and the selecting line SEL are formed as different signal lines, different voltages are applied to the respective lines. However, the same voltage may be applied to both the lines. More specifically, 0 V may be applied to the selecting line SEL. In contrast to this, a negative voltage may be applied to the boost line BST. Since a total parasitic capacitance of the internal node N1 is larger than that of the output node N2, even though a negative voltage is applied to the boost line BST, an influence of a variation in potential on the node N1 can be neglected.

<<Fourth Type>>

The pixel circuit 2D of the fourth type has a configuration in which the boost line BST serves as the selecting line SEL for the pixel circuit 2A of the first type. Since the voltage changes of the selecting line SEL and the boost line BST are not provided in the first type, a programming action can be performed to the pixels 2D of the fourth type by the same sequence as that in the first type without using the boost line BST. At this time, 0 V may be applied to the selecting line SEL.

<<Fifth and Sixth Types>>

Pixel circuits 2E and 2F of the fifth and sixth types have configurations in which the boost lines BST serve as the selecting lines SEL for the pixel circuits 2B and 2C of the second and third types.

In the second and third types, a high-level voltage is applied to the gate line GL and the selecting line SEL for each selected row to set a first switch circuit to a conducting state at the time of selection. However, in the pixel circuits of the fifth and sixth types, according to this method, theoretically, a potential of the node N2 is raised when a high-level voltage is applied to the selecting line SEL.

However, since a high voltage to turn on the transistor T2 is applied to the reference line REF, the nodes N1 and N2 are electrically connected to each other. As described above, since a parasitic capacitance of the internal node N1 is considerably larger than a parasitic capacitance of the output node N2, the potential of the internal node N1 rarely increases even though a high-level voltage is applied to the selecting line SEL. Consequently, a programming action can be realized by the same sequence as that in the second and third types.

Sixth Embodiment

In the sixth embodiment, a relationship between a self-refresh action and a programming action in an always-on display mode will be described.

In the always-on display mode, after a programming action is executed to image data of one frame, display contents obtained by the immediately previous programming action can be maintained without performing the programming action in a predetermined period.

By the programming action, a voltage is given to the pixel electrode 20 in each pixel through the source line SL. Thereafter, the gate line GL is set at a low level, and the transistor T4 is set to a non-conducting state. However, a potential of the pixel electrode 20 is kept by the presence of charges accumulated in the pixel electrode 20 by the immediately previous programming action. More specifically, a voltage Vlc is maintained between the pixel electrode 20 and the counter electrode 80. In this manner, even after the programming action is completed, a state in which a voltage required to display image data is applied across both the terminals of the liquid crystal capacitance Clc continues.

When a potential of the counter electrode 80 is fixed, the liquid crystal voltage Vlc depends on the potential of the pixel electrode 20. The potential varies with time based on occurrence of a leakage current of a transistor in the pixel circuit 2. For example, when a potential of the source line SL is lower than a potential of the internal node N1, a leakage current flowing from the internal node N1 to the source line SL is generated, and the pixel voltage V20 decreases with time. In contrast to this, when the potential of the source line SL is higher than the potential of the internal node N1, a leakage current flowing from the source line SL to the internal node N1 is generated, a potential of the pixel electrode 20 increases with time. More specifically, when time has elapsed without performing an external programming action, the liquid crystal voltage Vlc gradually changes. As a result, a displayed image changes.

In a normal display mode, a programming action is executed to all the pixel circuits 2 for each frame even in a still image. Therefore, electric charges accumulated in the pixel electrode 20 need only be maintained in a one-frame period. Since a variation in potential of the pixel electrode 20 in a 1-frame period at most is very small, the variation in potential meanwhile does not give an influence that is enough to be visually confirmed to image data to be displayed. For this reason, in the normal display mode, the variation in potential of the pixel electrode 20 does not cause a serious problem.

In contrast to this, in the always-on display mode, a programming action is not configured to be executed for each frame. Therefore, while the potential of the counter electrode 80 is fixed, depending on the circumstances, the potential of the pixel electrode 20 needs to be kept for several frames. However, when the pixel circuit is left without performing a programming action for several frame periods, a potential of the pixel electrode 20 intermittently varies due to generation of the leakage current described above. As a result, image data to be displayed may be changed enough to be visually confirmed.

Figure 28:
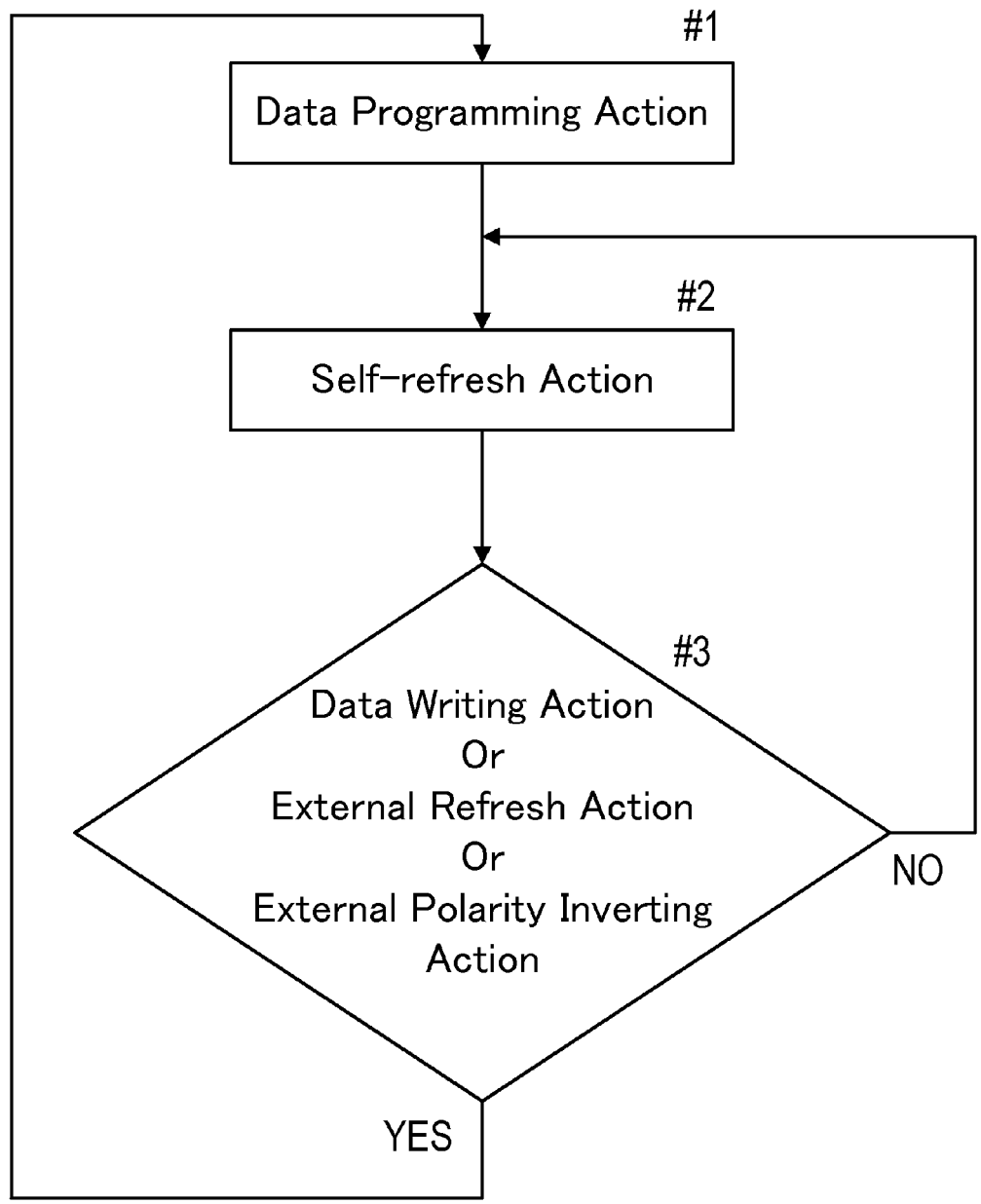
FIG. 28 is a flow chart showing procedures of the programming action and the self-refresh action in the always-on display mode.

In order to avoid the phenomenon, in the always-on display mode, by the manner shown in the flow chart in FIG. 28, the self-polarity-inverting action and the programming action are executed in combination with each other to considerably reduce a power consumption while suppressing a variation in potential of the pixel electrode.

A programming action of pixel data of one frame in the always-on display mode is executed by the manner described in the above fifth embodiment (step #1).

After the programming action in step #1, a self-refresh action is executed by the manner described in the above second embodiment (step #2). The self-refresh action is realized by the phase P1 that applies a pulse voltage and the phase P2 that sets a standby state.

In this case, in a period of the phase P2 of the self-refresh action period, when a request for a programming action (data writing) of new pixel data, an external refresh action, or an external polarity inverting action is received (YES in step #3), the control flow returns to step #1 to execute the programming action of the new pixel data or previous pixel data. In the period of the phase P2, when the request is not received (NO in step #3), the control flow returns to step #2 to execute the self-refresh action again. In this manner, a change of a display image due to an influence of a leakage current can be suppressed.

A refresh action is to be performed by a programming action without performing a self-refresh action, a power consumption expressed by the relational expression shown in numerical expression 1 described above is obtained. However, the self-refresh action is repeated at the same refresh rate, the number of times all source line voltages are driven is one. For this reason, the variable n in numerical expression 1 becomes 1. When VGA is supposed as a display resolution (the number of pixels), m=1920 and n=480. Thus, a power consumption is expected to be reduced to one-480$^{th}$ of it.

In this embodiment, the self-refresh action, and the external refresh action or the external polarity inverting action are combined to cope with the following case. That is, even in the pixel circuit 2 that normally operates at first, the second switch circuit 23 or the control circuit 24 is defected by aging, although a programming action can be performed without a trouble, a self-refresh action cannot be normally executed in some pixel circuits 2. More specifically, when only the self-refresh action is performed, displays of the pixel circuits 2 are deteriorated and the deterioration is fixed. However, when the external polarity inverting action is additionally used, the display defect can be prevented from being fixed.

Seventh Embodiment

In the seventh embodiment, a relationship between a self-polarity-inverting action and a programming action in an always-on display mode will be described.

In the always-on display mode, the programming action is not executed for each frame, and, after a predetermined number of frame periods have elapsed, the programming action is intermittently executed. Meanwhile, all the pixel circuits 2A are set to a non-conducting state, a non-selected row voltage of −5 V is applied to all the gate lines GL, and the non-selected row voltage of −5 V is applied to all the selecting lines SEL. Both the first switch circuit 22 and the second switch circuit 23 are set to a non-conducting state, and the internal node N1 is electrically separated from the source lines SL.

However, as described above, by a leakage current generated when the transistor T4 or the like connected to the internal node N1 is turned off, the pixel voltage V20 of the internal node N1 moderately changes. Therefore, when an interval between frame periods in which the programming action is stopped becomes long, a display image is changed by a variation of the liquid crystal voltage Vlc. Before the change exceeds a visual tolerance limit, a reprogramming action needs to be performed again. When the reprogramming action is to be performed to the same display image, the voltage value of the counter voltage Vcom is inverted between a high level (5 V) and a low level (0 V), and a voltage applied to the source line SL is inverted between the high level (5 V) and the low level (0 V) to make it possible to reprogram the same pixel data. This corresponds to an "external polarity inverting action" that is a polarity inverting action using a conventional external pixel memory.

In the above external polarity inverting action, as in the programming action, pixel data of one frame is programmed such that the pixel data is divided into horizontal periods the number of which is equal to the number of gate lines. For this reason, the source line SL of each column need to be changed for each up to one horizontal period, a large power consumption is required. For this reason, in this embodiment, in the always-on display mode, by a manner shown in the flow chart in FIG. 29, the self-polarity-inverting action and the programming action are executed in combination with each other to considerably reduce a power consumption.

First, a programming action of pixel data of one frame in always-on display mode is executed by the manner described in the fifth embodiment (step #11).

After the programming action in step #11, after a standby period corresponding to a predetermined number of frame periods has elapsed, a self-polarity-inverting action is executed in a lump to the pixel circuits 2 of one frame in the always-on display mode by the manner described in the third to fourth embodiment (step #12). As a result, while the standby period elapses, as shown in FIGS. 26 to 27, the pixel voltage V20 slightly varies, and, accordingly, the liquid crystal voltage Vlc in which a variation in voltage occurs is initialized, and the pixel voltage V20 returns to a voltage state obtained immediately after the programming action, and the liquid crystal voltage Vlc has the same absolute value as that of the voltage value obtained immediately after the programming action is performed and an inverted polarity of the voltage. Therefore, by the self-polarity-inverting action, the refresh action and the polarity inverting action of the liquid crystal voltage Vlc are simultaneously realized.

After the self-polarity-inverting action in step #12, while the standby period elapses, a request for a programming action (data writing) of new pixel data or an "external polarity inverting action" is received from the outside (YES in step #13), the control flow returns to step #11 to execute a programming action of the new pixel data or previous pixel data. While the standby period elapses, when the request is not received (NO in step #13), after the standby period has elapsed, the control flow returns to step #12 to execute the self-polarity-inverting action again. In this manner, each time the standby period has elapsed, the self-polarity-inverting action is repeatedly executed. For this reason, the refresh action and the polarity inverting action of the liquid crystal voltage Vlc are performed to make it possible to prevent a liquid crystal display element and image quality from being deteriorated.

Since the reason why a power consumption can be reduced by a self-polarity-inverting action and the reason why a self-polarity-inverting action and an external polarity inverting action are combined are the same as those in the case using a self-refresh action in the sixth embodiment, an explanation of the reasons will be omitted.

Eighth Embodiment

In the eighth embodiment, a relationship between a self-refresh action, a self-polarity-inverting action, and a programming action in an always-on display mode will be described. As described in the sixth and seventh embodiments, a self-refresh action and a self-polarity-inverting action can advantageously reduce power consumptions, respectively. In this embodiment, in the always-on display mode, by a manner shown in the flow chart in FIG. 30, the self-refresh action, the self-polarity-inverting action, and the programming action are executed in combination with each other to considerably reduce a power consumption.

A programming action of pixel data of one frame in the always-on display mode is executed by the manner described in the above fifth embodiment (step #21).

After the programming action in step #21, a self-refresh action is executed by the manner described in the above second embodiment (step #22).

Next, how many times the self-refresh action has been performed since the immediately previous programming action is detected. In other word, the number of frames of the self-refresh actions executed after the immediately previous programming action is performed is counted. When the count is equal to or smaller than the number of predetermined critical frames (NO in step #23), the control flow continuously returns to step #22 to execute a self-refresh action. On the other hand, when the count exceeds the number of critical frames (YES in step #23), a self-polarity-inverting action is executed by the manner described in the above third and fourth embodiments (step #24).

After the self-polarity-inverting action in step #24, a request for a programming action (data writing) of new pixel data or an "external polarity inverting action" is received from the outside (YES in step #25), the control flow returns to step #21 to execute a programming action of the new pixel data or previous pixel data. On the other hand, when the request is not received (NO in step #25), the control flow returns to step #22 to execute the self-refresh action again. In this manner, the self-refresh action and the self-polarity-inverting action are repeatedly executed. For this reason, the refresh action and the polarity inverting action of the liquid crystal voltage Vlc are performed to make it possible to prevent a liquid crystal display element and image quality from being deteriorated.

Figure 29:
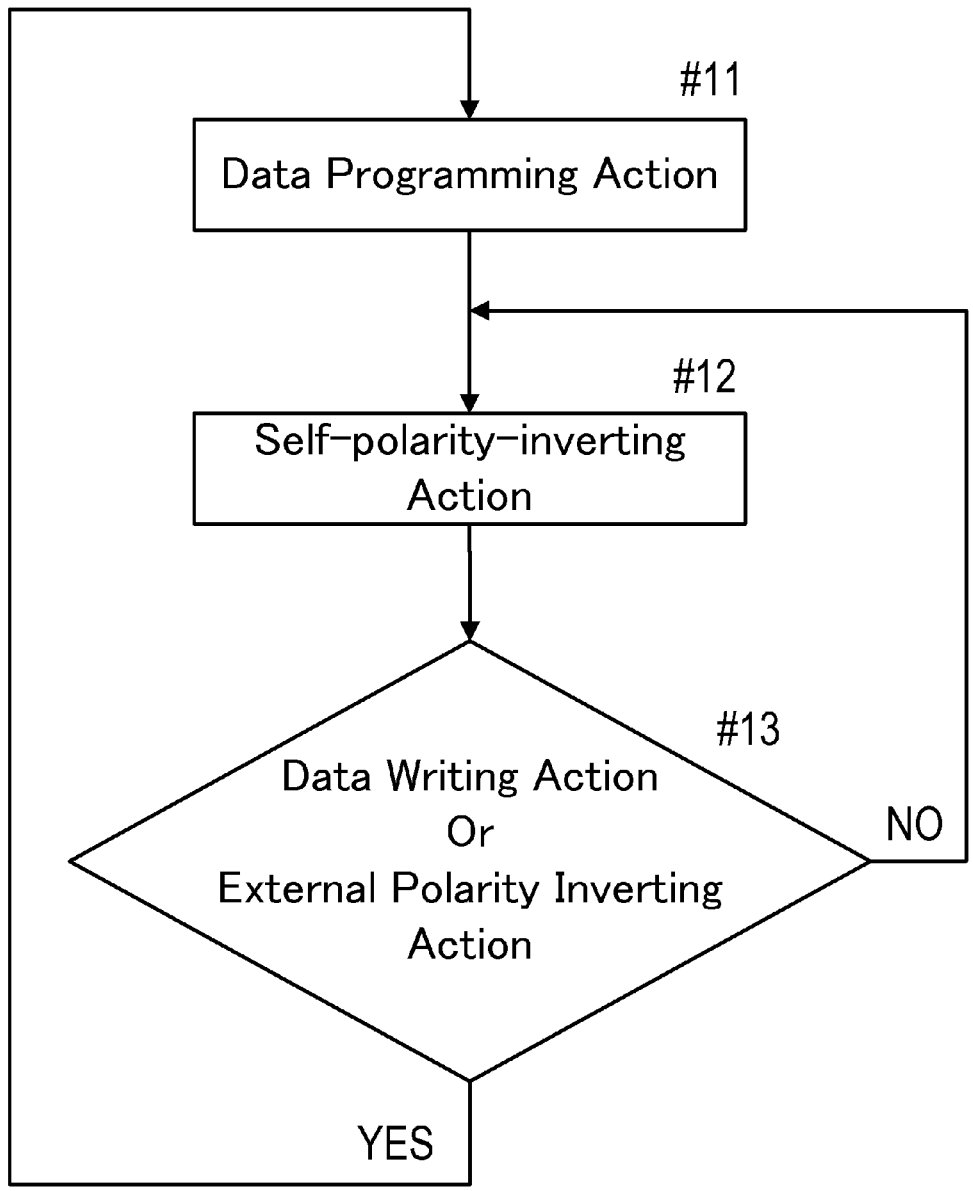
FIG. 29 is a flow chart showing procedures of the programming action and the self-polarity-inverting action in the always-on display mode.
Figure 30:
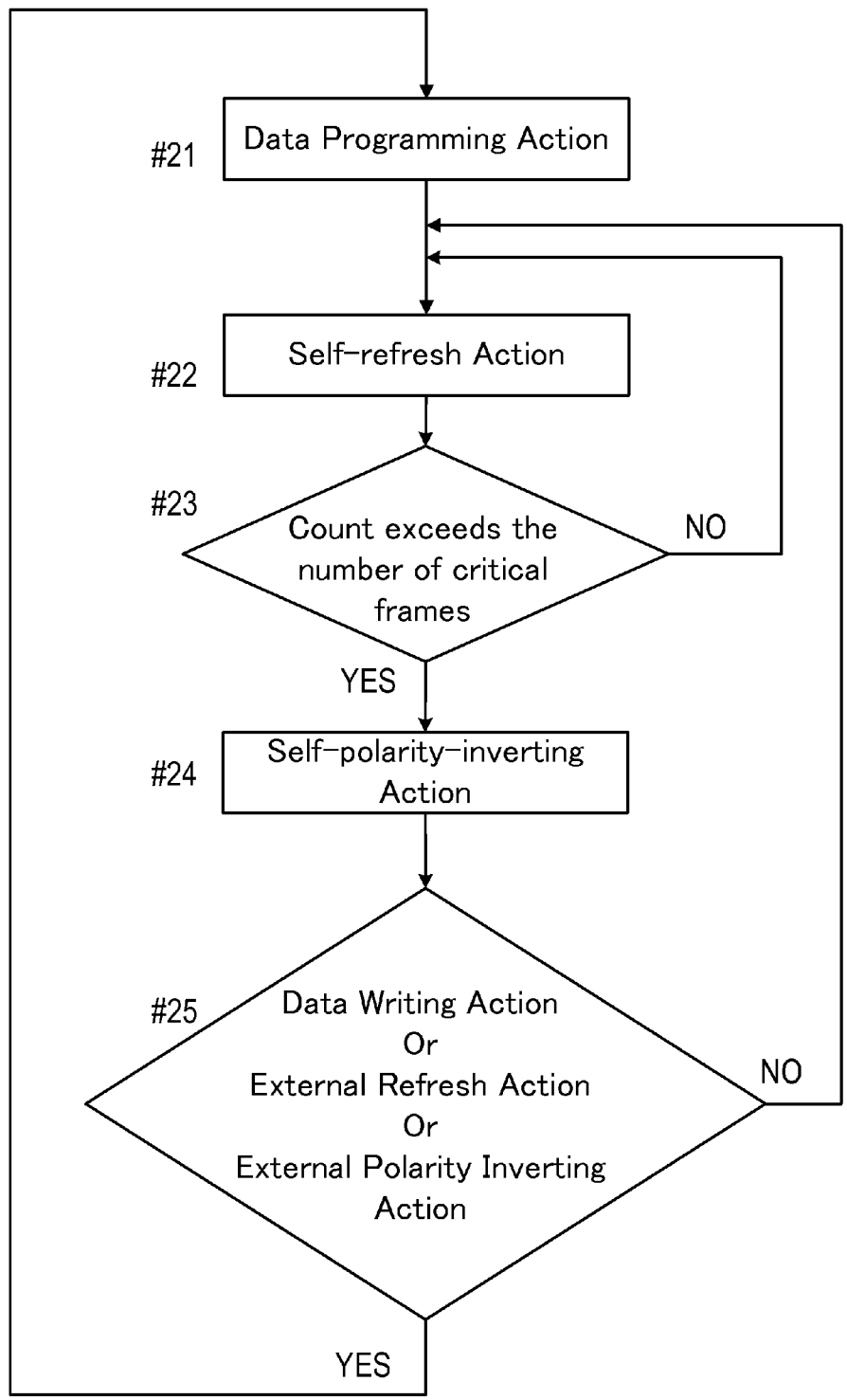
FIG. 30 is a flow chart showing procedures of the programming action, the self-refresh action, and the self-polarity-inverting action in the always-on display mode.

In place of the flow chart in FIG. 30, by arbitrarily combining the flowchart in FIG. 28 and the flow chart in FIG. 29 to each other, a configuration in which a self-refresh action and a self-polarity-inverting action are combined to each other may be used.

Ninth Embodiment

In the ninth embodiment, a programming action in a normal display mode will be described for each type with reference to the accompanying drawings.

In the programming action in the normal display mode, pixel data of one frame is divided in units of display lines in a horizontal direction (row direction), and a multi-tone analog voltage corresponding to each pixel data of one display line is applied to the source lines SL of each column for each horizontal period, and a selected-row voltage of 8 V is applied to the gate line GL of a selected display line (selected row) to set the first switch circuits 22 of all the pixel circuits 2 of the selected row to a conducting state, and voltages of the source lines SL of the respective columns are transferred to the internal node N1 of each of the pixel circuits 2 of the selected row. A non-selected row voltage of −5 V is applied to the gate lines GL of display lines (non-selected rows) except for the selected display line to set the first switch circuits 22 of all the pixel circuits 2 of the selected row to a non-conducting state.

Timing control of a voltage application of each signal line in a programming action (will be described later) is performed by the display control circuit 11 shown in FIG. 1, and each voltage application is performed by the display control circuit 11, the counter electrode drive circuit 12, the source driver 13, and the gate driver 14.

<<First Type>>

Figure 31:
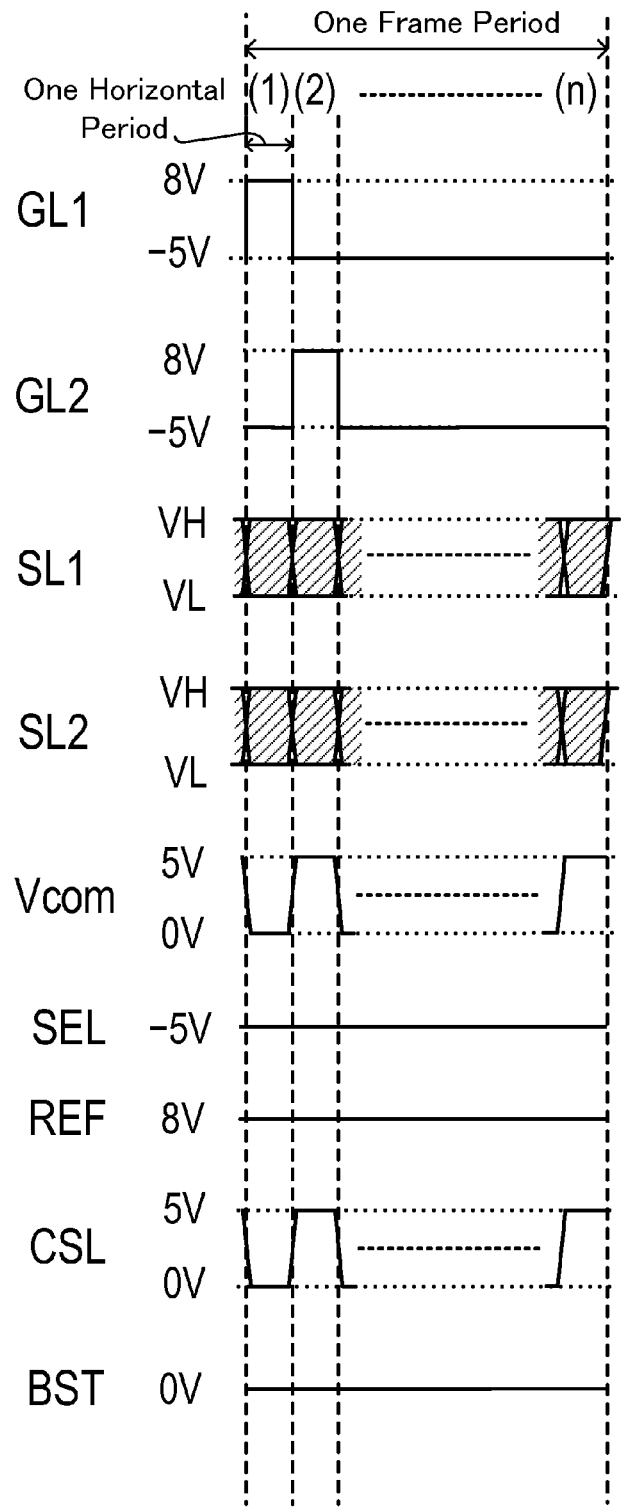
FIG. 31 is a timing chart of the programming action in a normal display mode performed by the pixel circuit of the first type.

FIG. 31 is a timing chart of a programming action using the pixel circuit 2A of the first type. FIG. 31 shows voltage waveforms of the two gate lines GL1 and GL2, the two source lines SL1 and SL2, the selecting line SEL, the reference line REF, the auxiliary capacitive line CSL, and the boost line BST in a 1-frame period and a voltage waveform of the counter voltage Vcom.

A 1-frame period is divided into horizontal periods the number of which is the number of gate lines GL, and gate lines GL1 to GLn to be selected are sequentially allocated to the horizontal periods, respectively. FIG. 31 shows changes in voltage of the two gate lines GL1 and GL2 in the first two horizontal periods. In the first horizontal period, a selected-row voltage of 8 V is applied to the gate line GL1, and a non-selected row voltage of −5 V is applied to the gate line GL2. In the second horizontal period, the selected-row voltage of 8 V is applied to the gate line GL2, and the non-selected row voltage of −5 V is applied to the gate line GL1. In the subsequent horizontal periods, the non-selected row voltage of −5 V is applied to both the gate lines GL1 and GL2.

A multi-tone analog voltage corresponding to pixel data of a display line corresponding to each horizontal period is applied to the source lines SL of the respective columns. In the normal display mode, a multi-tone analog voltage corresponding to pixel data of an analog display line is applied, and the application voltage is not uniquely specified. For this reason, this is expressed by hatching the area in FIG. 31. In FIG. 31, the two source lines SL1 and SL2 are shown as typical source lines SL1, SL2, . . . , SLm.

The counter voltage Vcom changes for each horizontal period (counter AC drive), the analog voltage has a voltage value corresponding to the counter voltage Vcom in the same horizontal period. More specifically, an analog voltage applied to the source line SL is set such that the voltage Vlc given by numerical expression 2 changes in only polarity without changing in absolute value depending on whether the counter voltage Vcom is 5 V or 0 V.

In the pixel circuits of the first and fourth types, since the first switch circuit 22 is configured by only the transistor T4, connection/disconnection control of the first switch circuit 22 is sufficiently performed by on/off-controlling only the transistor T4. Furthermore, the second switch circuit 23 need not be set to a conducting state in the programming action, and, in order to prevent the second switch circuit 23 from being set to a conducting state in the pixel circuit 2A of a non-selected row, in a 1-frame period, a non-selecting voltage of −5 V is applied to the selecting line SEL connected to all the pixel circuits 2A. The non-selecting voltage is not limited to a negative voltage and may be 0 V.

In the 1-frame period, a voltage to always set the transistor T2 to an on-state regardless of a voltage state of the internal node N1 is applied to the reference line REF. The voltage value need only be higher than a maximum value of voltage values given from the source line SL as multi-tone analog voltages by a threshold voltage of the transistor T2 or more. In FIG. 31, the maximum value is set to 5 V, and the threshold voltage is set to 2 V, and 8 V that is higher than the sum of the voltages is applied.

Since the counter AC drive is performed at the counter voltage Vcom for each horizontal period, the auxiliary capacitive line CSL is driven to have a voltage equal to the counter voltage Vcom. The pixel electrode 20 is capacitively coupled to the counter electrode 80 through a liquid crystal layer, and is also capacitivly coupled to the auxiliary capacitive line CSL through the auxiliary capacitor element Cs. For this reason, if the voltage of the auxiliary capacitor element Cs is fixed, only the voltage Vcom varies in numerical expression 2, thereby inducing variations of the liquid crystal voltages Vlc of the pixel circuits 2 of a non-selected row. For this reason, all the auxiliary capacitive lines CSL are driven at the same voltage as that of the counter voltage Vcom to change the voltages of the counter electrode 80 and the pixel electrode 20 in the same direction, thereby canceling the influence of the counter AC drive.

<<Second, Third Types>>

The sequences of the second and third types are different from the sequence of the first type in that, since the first switch circuit 22 is configured by a series circuit of the transistor T4 and another transistor (T3 or T5), the transistors T3 or T5 needs to be set to a conducting state in a programming action.

In the pixel circuit 2B of the second type, since the first switch circuit 22 is configured by a series circuit of the transistors T4 and T3, connection/disconnection control of the first switch circuit 22 requires not only on/off-control of the transistor T4 but also on/off-control of the transistor T3. In the pixel circuit 2C of the third type, although the first switch circuit 22 is configured by a series circuit of the transistors T4 and T5, since the gates of the transistors T5 and T3 are connected to each other, as in the pixel circuit 2B of the second type, on/off-control of the transistor T3 are required in addition to on/off-control of the transistor T4.

Therefore, in the pixel circuits, unlike in the first type, all the selecting lines SEL are not controlled in a lump, but independently controlled in units of rows like the gate lines GL. More specifically, the selecting lines SEL the number of which is the same as the number of gate lines GL1 to GLn are arranged in units of rows one by one, and the selecting lines SEL are sequentially selected like the gate lines GL1 to GLn.

More specifically, in the first horizontal period, a selecting voltage of 8 V is applied to the selecting line SEL1 of the same row as that of the gate line GL1, and a non-selecting voltage of −5 V is applied to the selecting line SEL2 of the same row as that of the gate line GL2. In the second horizontal period, a selecting voltage of 8 V is applied to the selecting line SEL2, and a non-selecting voltage of −5 V is applied to the selecting line SEL1. In the subsequent horizontal period, the non-selecting voltage of −5 V is applied to both the selecting lines SEL1 and SEL2. Application voltages to the reference line REF, the auxiliary capacitive line CSL, and the boost line BST and the counter voltage Vcom are the same as those in the first type shown in FIG. 31. The non-selecting voltage applied to the selected line is not limited to a negative voltage and may be 0 V as in the first type.

<<Fourth Type>>

The pixel circuit 2D of the fourth type has a configuration in which the boost line BST serves as the selecting line SEL for the pixel circuit 2A of the first type. Since the voltage changes of the selecting line SEL and the boost line BST are not provided in the first type, a programming action can be performed to the pixels 2D of the fourth type by the same sequence as that in the first type without using the boost line BST. At this time, a configuration in which 0 V is applied to the selecting line SEL may be used.

<<Fifth and Sixth Types>>

Pixel circuits 2E and 2F of the fifth and sixth types have configurations in which the boost lines BST also serve as the selecting lines SEL for the pixel circuits 2B and 2C of the second and third types.

In the second and third types, a high-level voltage is applied to the gate line GL and the selecting line SEL for each selected row to set the first switch circuit 22 to a conducting state at the time of selection. However, in the pixel circuits of the fifth and sixth types, according to the method, theoretically, a potential of the node N2 is raised when a high-level voltage is applied to the selecting line SEL.

However, since a high voltage to turn on the transistor T2 is applied to the reference line REF, the nodes N1 and N2 are electrically connected to each other. As described above, since a parasitic capacitance of the internal node N1 is considerably larger than a parasitic capacitance of the output node N2, the potential of the internal node N1 rarely increases even though a high-level voltage is applied to the selecting line SEL. Consequently, a programming action can be realized by the same sequence as that in the second and third types.

In the programming action in the normal display mode, as a method of inverting the polarity of each display line for each horizontal period, in addition to the "counter AC drive", there is a method of applying a predetermined fixed voltage to the counter electrode 80 as the counter voltage Vcom. According to the method, a voltage applied to the pixel electrode 20 alternately changes into a positive voltage or a negative voltage every horizontal period with reference to the counter voltage Vcom.

In this case, there are a method of directly programming the pixel voltage through the source line SL and a method of adjusting a voltage to any one of a positive voltage and a negative voltage with reference to the counter voltage Vcom by capacitive coupling using the auxiliary capacitor element Cs after a voltage falling within a voltage range centered at the counter voltage Vcom is programmed. In this case, the auxiliary capacitive line CSL is not driven at the same voltage as the counter voltage Vcom, and independently pulse-driven in units of rows.

As described above, with respect to the programming action in the normal display mode, when control of the selecting line SEL, the reference line REF, and the boost line BST is performed by the above manner, the pixel circuits 2A to 2F having the circuit configurations of the first to sixth types can be applied to various programming methods.

In the embodiment, in the programming action in the normal display mode, a method of inverting the polarity of each display line for each horizontal line is employed. However, the method is employed to cancel a disadvantage (will be described below) occurring when polarity inversion is performed in units of frames. As the method of canceling the disadvantage, there are a method of performing polarity inversion drive for each column and a method of performing polarity inversion drive in units of pixels in row and column directions at the same time.

It is assumed that the positive polarity liquid crystal voltage Vlc is applied in all pixels in a certain frame F1 and the negative polarity liquid crystal voltage Vlc is applied in all the pixels in the next frame F2. Even though the voltages having the same absolute value are applied to the liquid crystal layer 75, a slight difference may occur in light transmittance depending on the positive polarity or the negative polarity. When a high-quality still image is displayed, the presence of the slight difference may possibly cause small changes in display manners in the frame F1 and the frame F2. Even in a moving image display state, in a display area in which the same display contents should be displayed in the frames, the display manners may be possibly slightly changed. In display of a high-quality still image or moving image, it can be assumed that even the slight change can be visually recognized.

Since the normal display mode is a mode of displaying a high-quality still image or moving image, the above slight change may be possibly visually recognized. In order to avoid the phenomenon, in this embodiment, the polarity is inverted for each display line in the same frame. In this manner, since the liquid crystal voltages Vlc having polarities different between display lines are applied in the same frame, an influence on display image data based on the polarity of the liquid crystal voltage Vlc can be suppressed.

Another Embodiment

Another embodiment will be described below.

<1> With respect to the pixel circuits 2A to 2D of the first to fourth types, in programming actions in the normal display mode and the always-on display mode, a low-level voltage may be given to the reference line REF to set the transistor T2 to an off state. In this manner, when the internal node N1 and the output node N2 are electrically separated from each other, the potential of the pixel electrode 20 is not influenced by the voltage of the output node N2 obtained before the programming action. In this manner, the voltage of the pixel electrode 20 correctly reflects an application voltage to the source line SL, and the image data can be displayed without an error.

As described above, a total parasitic capacitance of the node N1 is considerably larger than that of the node N2, and the potential of the node N2 in the initial state rarely influence the potential of the pixel electrode 20. For this reason, the transistor T2 may be always set in an on-state.

Furthermore, in the pixel circuits 2D to 2F of the fifth to sixth types, when the selecting line SEL also serves as the boost line BST, the node N2 largely varies with a variation of the selecting line SEL. For this reason, in each pixel circuit of a non-selected row, a high-level voltage is applied to the selecting line SEL to set the second switch circuit 23 to a conducting state, and a voltage may be possibly applied from the source line SL through the second switch circuit 23. For this reason, in each of the pixel circuits, the transistor T2 needs to be always set in an on state at the time of programming.

<2> The above embodiment explains the case in which the self-polarity-inverting action is performed to all the pixel circuits in units of frames. However, for example, 1 frame is divided into a plurality of row groups each including a predetermined number of rows, and the self-polarity-inverting action may be executed in units of the row groups. For example, execution of the self-polarity-inverting action to pixel circuits of even-numbered rows and execution of the next self-polarity-inverting action to odd-numbered rows may be sequentially repeated. In this manner, when the self-polarity-inverting action is performed such that the even-numbered rows and the odd-numbered rows are separated from each other, even though a small display error occurs due to the self-polarity-inverting action, the small error is diffused in units of the even-numbered rows or the odd-numbered rows to make it possible to further reduce an influence on a display image. Similarly, one frame is divided into a plurality of column groups each including a predetermined number of columns, and self-polarity-inverting actions can be executed in units of the column groups.

<3> In the above embodiments, the second switch circuits 23 and the control circuits 24 are arranged in each of all the pixel circuits 2 arranged on the active matrix substrate 10. In contrast to this, on the active matrix substrate 10, when pixel units of two types, i.e., a transmissive pixel unit that performs a transmissive liquid crystal display and a reflective pixel unit that performs a reflective liquid crystal display are provided, only pixel circuits of the reflective pixel unit may include the second switch circuits 23 and the control circuits 24, and pixel circuits of the transmissive display unit may not include the second switch circuits 23 and the control circuits 24.

In this case, an image display is performed by the transmissive pixel unit in the normal display mode, and an image display is performed by the reflective pixel unit in the always-on display mode. With the above configuration, the number of elements formed on the entire area of the active matrix substrate 10 can be reduced.

<4> In the above embodiments, each of the pixel circuits 2 includes the auxiliary capacitor element Cs. However, the pixel circuit 2 need not include the auxiliary capacitor element Cs. However, in order to more stabilize the potential of the internal node N1 to reliably stabilize a display image, the auxiliary capacitor element Cs is preferably included.

Figure 32:
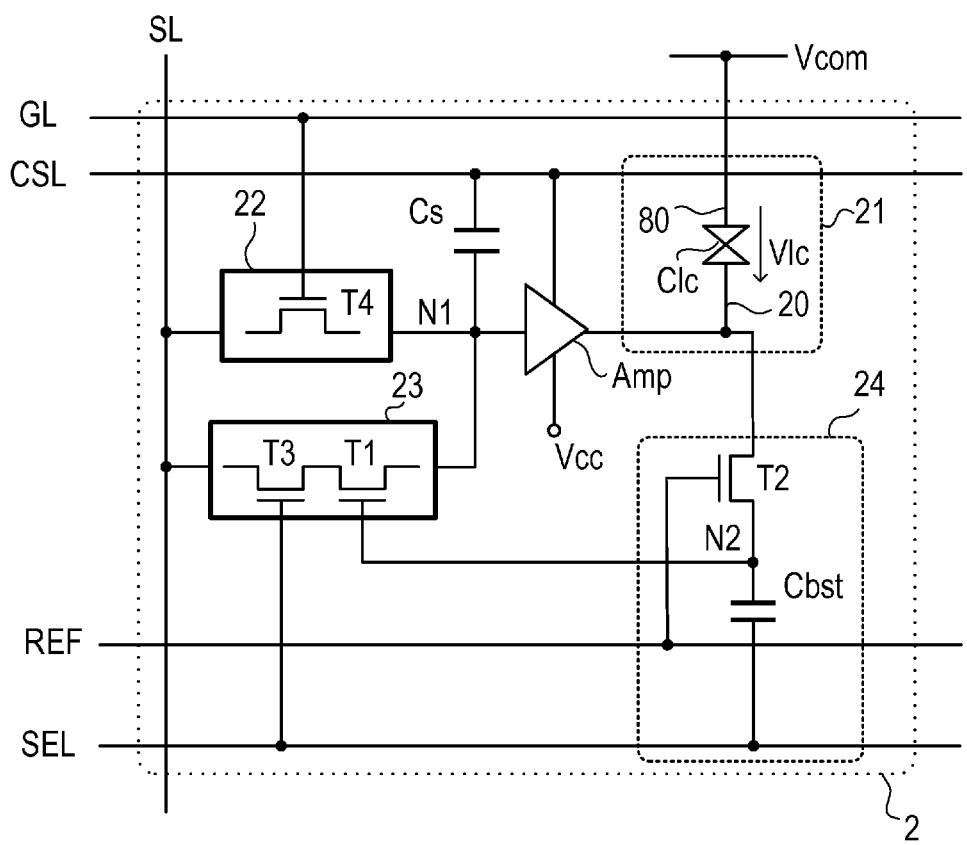
FIG. 32 is a circuit diagram showing still another basic circuit configuration of the pixel circuit of the present invention.

<5> In the above embodiments, it is assumed that the display element unit 21 of each of the pixel circuits 2 is configured by only the unit liquid crystal display element Clc. However, as shown in FIG. 32, an analog amplifier Amp (voltage amplifier) may be arranged between the internal node N1 and the pixel electrode 20. In FIG. 32, as an example, the auxiliary capacitive line CSL and a power supply line Vcc serve as a power supply line for the analog amplifier Amp.

In this case, a voltage given to the internal node N1 is amplified by a gain η set by the analog amplifier Amp, and the amplified voltage is supplied to the pixel electrode 20. Thus, in the configuration, a small voltage change at the internal node N1 can be reflected on a display image.

In this configuration, in the self-polarity-inverting action in the always-on display mode, the voltage of the internal node N1 is amplified by the gain η and supplied to the pixel electrode 20. For this reason, a voltage difference between the first and second voltage states applied to the source line SL is adjusted to make it possible to make the voltages in the first and second voltage states supplied to the pixel electrode 20 equal to the high-level and low-level voltages of the counter voltage Vcom.

<6> In the above embodiments, it is assumed that the transistors T1 to T4 in the pixel circuit 2 are n-channel polycrystalline silicon TFTs. However, a configuration using p-channel TFTs or a configuration using amorphous silicon TFTs can also be used. Also in a display device having a configuration using p-channel TFTs, by inverting the polarities of a power supply voltage and a voltage value shown as the above described action condition, by reversing application voltages in the case A and the case B, by replacing the first voltage state (5 V) and the second voltage state (0 V) with the first voltage state (0 V) and the second voltage state (5 V), respectively, in a programming action in an always-on display mode, and the like, the pixel circuits 2 can be operated by the same manner as that in each of the embodiments, and the same effect as that in the embodiment can be obtained.

<7> In the above embodiments, as the voltage values in the first and second voltage states of the pixel voltage V20 and the counter voltage Vcom in the always-on display mode, 0 V and 5 V are supposed, and, accordingly, voltage values applied to the signal lines are set to −5 V, 0 V, 5 V, and 8V, respectively. However, the voltage values can be arbitrarily set depending on the characteristics (threshold voltages or the like) of liquid crystal elements and transistor elements to be used.

<8> In the above embodiments, the liquid crystal display device is exemplified. However, the present invention is not limited to the embodiments. The present invention can be applied to any display device that has a capacitance corresponding to the pixel capacitance Cp to hold pixel data and displays an image based on a voltage held in the capacitance.

Figure 33:
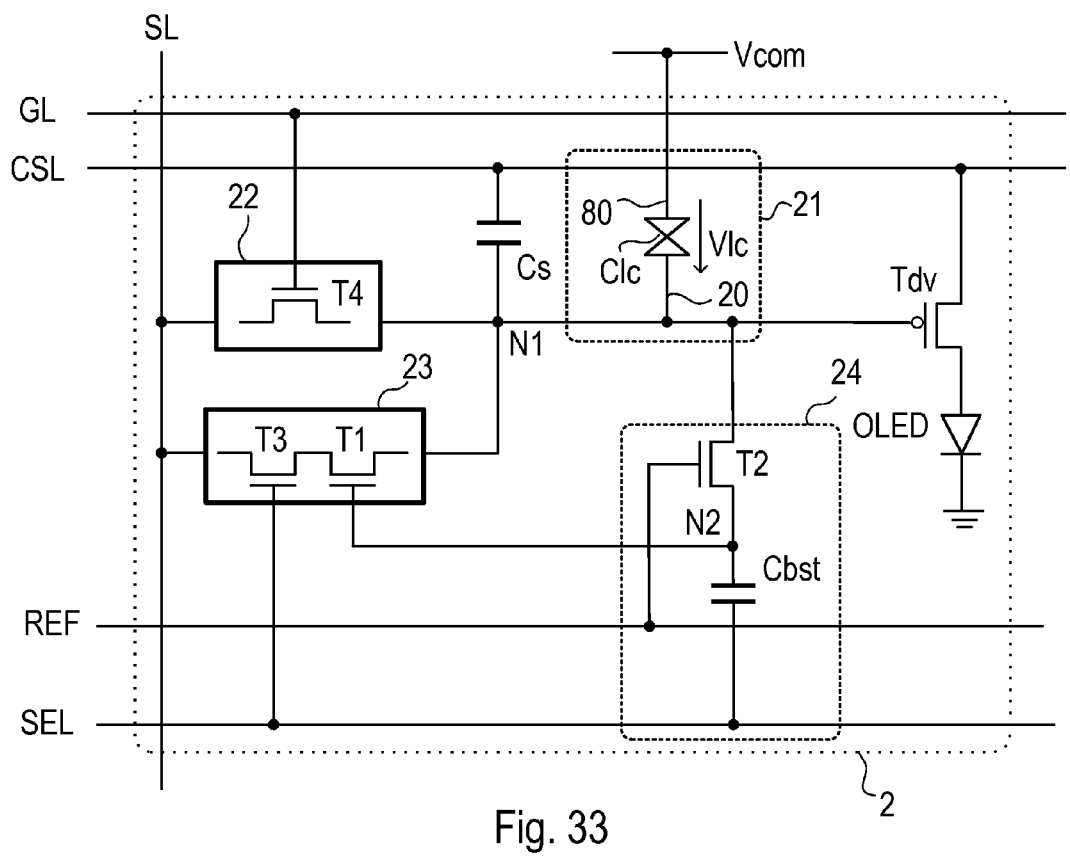
FIG. 33 is a circuit diagram showing still another basic circuit configuration of the pixel circuit of the present invention.

For example, in an organic EL (Electroluminescence) display device in which a voltage corresponding to pixel data is held in a capacitance corresponding to a pixel capacitance to display an image, the present invention can be especially applied to a self-refresh action. FIG. 33 is a circuit diagram showing an example of a pixel circuit of the organic EL display device. In the pixel circuit, a voltage held in the auxiliary capacitance Cs as pixel data is given to a gate terminal of a drive transistor Tdv configured by a TFT, and a current corresponding to the voltage flows in a light-emitting element OLED through the drive transistor Tdv. Thus, the auxiliary capacitance Cs corresponds to the pixel capacitance Cp in each of the above embodiments.

In the pixel circuit shown in FIG. 33, unlike in a liquid crystal display device in which a voltage is applied across electrodes to control a light transmittance to display an image, an element itself emits light by a current flowing in the element to display an image. For this reason, because of the rectification of the light-emitting element, the polarity of a voltage applied across both the terminals of the element cannot be inverted, and need not be inverted. For this reason, in the pixel circuit in FIG. 33, the self-polarity-inverting action described in the third and fourth embodiments cannot be performed.

EXPLANATION OF REFERENCES

1: Liquid crystal display device
2: Pixel circuit
2A,2B,2C,2D,2E,2F: Pixel circuit
10: Active matrix substrate
11: Display control circuit
12: Counter electrode drive circuit
13: Source driver
14: Gate driver
20: Pixel electrode
21: Display element unit
22: First switch circuit
23: Second switch circuit
24: Control circuit
74: Seal member
75: Liquid crystal layer
80: Counter electrode
81: Counter substrate
Amp: Analog amplifier
BST: Boost line
Cbst: Boost capacitor element
Clc: Liquid crystal display element
CML: Counter electrode wire
CSL: Auxiliary capacitive line
Cs: Auxiliary capacitor element
Ct: Timing signal
DA: Digital image signal
Dv: Data signal
GL (GL1, GL2, . . . , GLn): Gate line
Gtc: Scanning-side timing control signal
N1: Internal note
N2: Output node
OLED: Light emitting element
P1,P2: Phase
P10, P11, . . . , P18: Phase
P20, P21, . . . , P27: Phase
REF: Reference line
Sc1, Sc2, . . . , Scm: Source signal
SEL: Selecting line
SL (SL1, SL2, . . . , SLm): Source line
Stc: Data-side timing control signal
T1,T2,T3,T4,T5: Transistor
Tdv: Drive transistor
V20: Pixel electrode potential, internal node potential
Vcom: Counter voltage
Vlc: Liquid crystal voltage
VN2: Output node potential

The invention claimed is:

1. A pixel circuit comprising:
a display element unit including a unit display element;
an internal node that configures a part of the display element unit and holds a voltage of pixel data applied to the display element unit;
a first switch circuit configured to transfer the voltage of the pixel data supplied from a data signal line to the internal node through at least a switch element;
a second switch circuit configured to transfer the voltage supplied from the data signal line to the internal node without passing through the switch element; and
a control circuit configured to hold a given voltage depending on the voltage of the pixel data held by the internal node at one terminal of a first capacitor element and control a connection/disconnection of the second switch circuit, wherein
of first to third transistor elements each having a first terminal, a second terminal, and a control terminal configured to control a connection between the first and second terminal, the first and third transistor elements are included in the second switch circuit, and the second transistor element is included in the control circuit,
the second switch circuit is configured by a series circuit of the first transistor element and the third transistor element,
the control circuit is configured by a series circuit of the second transistor element and the first capacitor element,
one terminal of each of the first and second switch circuits is connected to the data signal line,
the other terminals of the first and second switch circuits and the first terminal of the second transistor element are connected to the internal node,
the control terminal of the first transistor element, the second terminal of the second transistor element, and the one terminal of the first capacitor element are connected to each other,
the control terminal of the second transistor element is connected to a first control line,
the control terminal of the third transistor element is connected to a second control line, and
the other terminal of the first capacitor element is connected to the second control line or a third control line.

2. The pixel circuit according to claim 1, wherein
the switch element is configured by a fourth transistor element having a first terminal, a second terminal, and a control terminal that controls connection between the first and second terminals, and
the control terminal of the fourth transistor element is connected to a scanning signal line.

3. The pixel circuit according to claim 1, wherein the first switch circuit does not include any switch elements except for the switch element.

4. The pixel circuit according to claim 1, wherein the first switch circuit is configured by a series circuit of the third transistor element in the second switch circuit and the switch element or a series circuit of a fifth transistor having a control terminal connected to the control terminal of the third transistor element in the second switch circuit and the switch element.

5. The pixel circuit according to claim 1, further comprising:
a second capacitor element having one terminal connected to the internal node and having the other terminal connected to a fourth control line or a fixed voltage line.

6. A display device, wherein
a plurality of pixel circuits according to claim 1 are arranged in a row direction and a column direction to configure a pixel circuit array,
the data signal line is arranged for each of columns one by one,
the pixel circuits arranged along the same column have one terminal of each of the first switch circuits connected to a common data signal line, the pixel circuits arranged along the same row or the same column have the control terminals of the second transistor elements connected to a common first control line, the pixel circuits arranged along the same row or the same column have the control terminals of the third transistor elements connected to a common second control line, and the pixel circuits arranged along the same row or the same column have the other terminals of the first capacitor elements connected to the common second control line or a common third control line, the display device comprises:
  a data signal line drive circuit configured to independently drive the data signal lines; and
  a control line drive circuit configured to,
    independently drive the first and the second control lines, and
    the control line drive circuit further drives the third control line in the case that the pixel circuits arranged along the same row or the same column have the other terminals of the first capacitor elements connected to the common third control line.

7. The display device according to claim 6, wherein
the first switch circuit does not include any switch elements except for the switch element,
the switch element is a fourth transistor element having a first terminal, a second terminal, and a control terminal that controls connection between the first and second terminals,
the first terminal, the second terminal, and the control terminal are connected to the internal node, the data signal line, and a scanning signal line, respectively,
the scanning signal line is arranged for each of rows one by one, and the pixel circuits arranged along the same row are connected to a common scanning signal line, and
a scanning signal line drive circuit configured to independently drive the scanning signal lines, is arranged.

8. The display device according to claim 6, wherein
the switch element is configured by a fourth transistor element having a first terminal, a second terminal, and a control terminal that controls connection between both the terminals,
the first switch circuit is configured by a series circuit of the third transistor element in the second switch circuit and the fourth transistor element or a series circuit of a fifth transistor having a control terminal connected to the control terminal of the third transistor element in the second switch circuit and the fourth transistor element,
a scanning signal line and the second control line are arranged for each row of the pixel circuit array,
the control terminal of the fourth transistor element is connected to the scanning signal line, and
the pixel circuits arranged along the same row are connected to a common scanning signal line and a common second control line, and
a scanning signal line drive circuit configured to independently drive the scanning signal lines is arranged.

9. The display device according to claim 7, wherein in a programming action to independently program the pixel data in the pixel circuits arranged along one selected row,
the scanning signal line drive circuit is configured to,
  apply a selected row voltage to the scanning signal line of the selected row to set the fourth transistor elements arranged along the selected row to a conducting state, and
  apply a non-selected row voltage to the scanning signal line of a non-selected row to set the fourth transistor elements arranged along the non-selected row to a non-conducting state, and
the data signal line drive circuit is configured to independently apply data voltages corresponding to pixel data to be programmed in the pixel circuits of the columns of the selected row to the data signal lines, respectively.

10. The display device according to claim 9, wherein in the programming action, the control line drive circuit is configured to apply an additional voltage to the second control line to set the third transistor element to a non-conducting state.

11. The display device according to claim 8, wherein in a programming action to independently program the pixel data in the pixel circuits arranged along one selected row,
the scanning signal line drive circuit is configured to,
  apply a selected row voltage to the scanning signal line of the selected row to set the fourth transistor elements arranged along the selected row to a conducting state, and
  apply a non-selected row voltage to the scanning signal line of a non-selected row to set the fourth transistor elements arranged along the non-selected row to a non-conducting state,
the control line drive circuit is configured to,
  apply a selecting voltage to the second control line of the selected row to set the third transistor element to a conducting state, and
  apply a non-selecting voltage to the second control line of the non-selected row to set the third transistor element to a non-conducting state, and
the data signal line drive circuit is configured to independently apply data voltages corresponding to the pixel data to be programmed in the pixel circuits of the columns of the selected row to the data signal lines, respectively.

12. The display device according to claim 9, wherein in the programming action, the control line drive circuit is configured to apply an additional voltage to the first control line to set the second transistor element to a conducting state.

13. The display device according to claim 7, wherein
in a self-refresh action to operate the second switch circuits and the control circuits to simultaneously compensate for variations in voltage of the internal nodes in the plurality of pixel circuits in a case where the other terminals of the first capacitor elements are connected to the third control line,
the scanning signal line drive circuit is configured to apply a first voltage to the scanning signal lines connected to all the pixel circuits in the pixel circuit array to set the fourth transistor element to a non-conducting state,
the control line drive circuit is configured to,
  apply a second voltage to the first control line so that when a voltage state of binary pixel data held by the internal node is a first voltage state, the second transistor element blocks a current flowing from the one terminal of the first capacitor element to the internal node, and when the voltage state is a second voltage state, the second transistor element is set to a conducting state,
  apply a third voltage to the second control line to set the third transistor element to a conducting state,
  apply a voltage pulse having a voltage amplitude to the third control line to give a change in voltage by a capacitive coupling through the first capacitor element to the one terminal of the first capacitor element, so that when a voltage of the internal node is in the first voltage state, the change in voltage is not suppressed and the first transistor element is set to a conducting state, and when the voltage of the internal node is in the second voltage state, the change in voltage is suppressed and the first transistor element is set to a non-conducting state, and the data signal line drive circuit is configured to supply a voltage of the pixel data in the first voltage state to all the data signal lines connected to the plurality of pixel circuits targeted by the self-refresh action.

14. The display device according to claim 7, wherein in a self-refresh action to operate the second switch circuits and the control circuits to simultaneously compensate for variations in voltage of the internal nodes in the plurality of pixel circuits in a case where the other terminals of the first capacitor elements are connected to the second control line, the scanning signal line drive circuit is configured to apply a first voltage to the scanning signal lines connected to all the pixel circuits in the pixel circuit array to set the fourth transistor element to a non-conducting state, the control line drive circuit is configured to, apply a second voltage to the first control line so that when a voltage state of binary pixel data held by the internal node is a first voltage state, the second transistor element blocks a current flowing from the one terminal of the first capacitor element to the internal node, and when the voltage state is a second voltage state, the second transistor element is set to a conducting state, apply a third voltage pulse having a voltage amplitude to the second control line to set the third transistor element to a conducting state and give a change in voltage by a capacitive coupling through the first capacitor element to the one terminal of the first capacitor element, so that when a voltage of the internal node is in the first voltage state, the change in voltage is not suppressed and the first transistor element is set to a conducting state, and when the voltage of the internal node is in the second voltage state, the change in voltage is suppressed and the first transistor element is set to a non-conducting state, and the data signal line drive circuit is configured to supply a voltage of the pixel data in the first voltage state to all the data signal lines connected to the plurality of pixel circuits targeted by the self-refresh action.

15. The display device according to claim 13, wherein in a standby state immediately after the self-refresh action is ended, the control line drive circuit is configured to, apply a fourth voltage to the second control line to set the third transistor element to a non-conducting state, and end an application of the voltage pulse to the third control line.

16. The display device according to claim 14, wherein in a standby state immediately after the self-refresh action is ended, the control line drive circuit is configured to end an application of the voltage pulse to the second control line to set the third transistor element to a non-conducting state.

17. The display device according to claim 15, wherein the self-refresh action is repeated through the standby state that is not less than 10 times the self-refresh action period.

18. The display device according to claim 15, wherein in the standby state, the data signal line drive circuit is configured to apply a fifth voltage in the second voltage state to the data signal line.

19. The display device according to claim 7, wherein the pixel circuit has a configuration in which the other terminal of the first capacitor element is connected to the third control line, the unit display element is configured by a liquid crystal display element including a pixel electrode, a counter electrode, and a liquid crystal layer interposed between the pixel electrode and the counter electrode, in the display element unit, the internal node is connected to the pixel electrode directly or through a voltage amplifier, a counter electrode voltage supply circuit configured to supply a voltage to the counter electrode, is arranged, in a self-polarity-inverting action to operate the first switch circuits, the second switch circuits, and the control circuits to simultaneously invert polarities of voltages applied across the pixel electrodes and the counter electrodes in the plurality of pixel circuits, and as an initial state setting action performed before the self-polarity-inverting action is started, the scanning signal line drive circuit is configured to apply a first voltage to the scanning signal lines connected to all the pixel circuits in the pixel circuit array to set the fourth transistor element to a non-conducting state, the control line drive circuit is configured to, apply a second voltage to the first control line to generate a voltage difference at the one terminal of the first capacitor element depending on whether a voltage state of binary pixel data held by the internal node is in a first voltage state or a second voltage state, apply a third voltage to the second control line to set the third transistor element to a non-conducting state, and apply an initial voltage to the third control line, after the initial state setting action, apply a pulse having a voltage amplitude to the third control line to give a change in voltage by a capacitive coupling through the first capacitor element to the one terminal of the first capacitor element, so that when a voltage of the internal node is in the first voltage state, since the second transistor element is set to a non-conducting state, the change in voltage is not suppressed and the first transistor element is set to a conducting state, and when the voltage of the internal node is in the second voltage state, since the second transistor element is set to a conducting state, the change in voltage is suppressed and the first transistor element is set to a non-conducting state, and, thereafter, apply a fourth voltage to the first control line to set the second transistor element to a non-conducting state regardless of the voltage state of the internal node, thereafter, the scanning signal line drive circuit is configured to apply a scanning voltage pulse to all the scanning signal lines connected to the plurality of pixel circuits targeted by the self-polarity-inverting action to temporarily set the fourth transistor element to a conducting state, thereafter, returns the fourth transistor element to a non-conducting state, the counter electrode voltage is configured to supply circuit changes the voltage applied to the counter electrode between the two voltage states after the second transistor element is set to a non-conducting state until the scanning signal line drive circuit ends application of the scanning voltage pulse, the control line drive circuit, for at least a period after the scanning signal line drive circuit ends application of the scanning voltage pulse, is configured to apply a fifth voltage to the second control line to set the third transistor element to a conducting state and, thereafter, stops pulse application to the third control line, and the data signal line drive circuit is configured to, apply a sixth voltage in the first voltage state, at least while the scanning signal line drive circuit applies the scanning voltage pulse, to all the data signal lines connected to the plurality of pixel circuits targeted by the self-polarity-inverting action, and apply a seventh voltage in the second voltage state to all the data signal lines connected to the plurality of pixel circuits targeted by the self-polarity-inverting action for at least a partial period immediately before the control line drive circuit ends the application of the fifth voltage to set the third transistor element to a conducting state to the second control line.

20. The display device according to claim 7, wherein the pixel circuit has a configuration in which the other terminal of the first capacitor element is connected to the third control line, the unit display element is configured by a liquid crystal display element including a pixel electrode, a counter electrode, and a liquid crystal layer interposed between the pixel electrode and the counter electrode, in the display element unit, the internal node is connected to the pixel electrode directly or through a voltage amplifier, and a counter electrode voltage supply circuit configured to supply a voltage to the counter electrode is arranged, in a self-polarity-inverting action to operate the first switch circuits, the second switch circuits, and the control circuits to simultaneously invert polarities of voltages applied across the pixel electrodes and the counter electrodes in the plurality of pixel circuits, and as an initial state setting action performed before the self-polarity-inverting action is started, the scanning signal line drive circuit is configured to apply a first voltage to the scanning signal lines connected to all the pixel circuits in the pixel circuit array to set the fourth transistor element to a non-conducting state, the control line drive circuit is configured to, apply a second voltage to the first control line to generate a voltage difference at the one terminal of the first capacitor element depending on whether a voltage state of binary pixel data held by the internal node is in a first voltage state or a second voltage state, apply a third voltage to the second control line to set the third transistor element to a non-conducting state, and apply a initial voltage to the third control line, after the initial state setting action, the control line drive circuit is configured to, apply a pulse having a voltage amplitude to the second control line and the third control line to give a change in voltage by a capacitive coupling through the first capacitor element to the one terminal of the first capacitor element, so that when a voltage of the internal node is in the first voltage state, since the second transistor element is set to a non-conducting state, the change in voltage is not suppressed and the first transistor element is set to a conducting state, and when the voltage of the internal node is in the second voltage state, since the second transistor element is set to a conducting state, the change in voltage is suppressed and the first transistor element is set to a non-conducting state, and, thereafter, apply a fourth voltage to the first control line to set the second transistor element to a non-conducting state regardless of the voltage state of the internal node, thereafter, the scanning signal line drive circuit is configured to apply a scanning voltage pulse to all the scanning signal lines connected to the plurality of pixel circuits targeted by the self-polarity-inverting action to temporarily set the fourth transistor element to a conducting state, thereafter, returns the fourth transistor element to a non-conducting state, the counter electrode voltage supply circuit is configured to change the voltage applied to the counter electrode between the two voltage states after the second transistor element is set to a non-conducting state until the scanning signal line drive circuit ends application of the scanning voltage pulse, the control line drive circuit is configured to stop pulse application to the second control line and the third control line at least after the scanning signal line drive circuit ends the application of the scanning voltage pulse, and the data signal line drive circuit is configured to, apply a fifth voltage in the first voltage state, at least while the scanning signal line drive circuit applies the scanning voltage pulse, to all the data signal lines connected to the plurality of pixel circuits targeted by the self-polarity-inverting action, and apply a sixth voltage in the second voltage state to all the data signal lines connected to the plurality of pixel circuits targeted by the self-polarity-inverting action for at least a partial period immediately before the control line drive circuit ends the pulse applications to the second control line and the third control line.

21. The display device according to claim 7, wherein the pixel circuit has a configuration in which the other terminal of the first capacitor element is connected to the second control line, the unit display element is configured by a liquid crystal display element including a pixel electrode, a counter electrode, and a liquid crystal layer interposed between the pixel electrode and the counter electrode, in the display element unit, the internal node is connected to the pixel electrode directly or through a voltage amplifier, and a counter electrode voltage supply circuit is configured to supply a voltage to the counter electrode is arranged, in a self-polarity-inverting action to operate the first switch circuits, the second switch circuits, and the control circuits to simultaneously invert polarities of voltages applied across the pixel electrodes and the counter electrodes in the plurality of pixel circuits, and as an initial state setting action performed before the self-polarity-inverting action is started, the scanning signal line drive circuit is configured to apply a first voltage to the scanning signal lines connected to all the pixel circuits in the pixel circuit array to set the fourth transistor element to a non-conducting state, the control line drive circuit is configured to, apply a second voltage to the first control line to generate a voltage difference at the one terminal of the first capacitor element depending on whether a voltage state of binary pixel data held by the internal node is in a first voltage state or a second voltage state, apply a third voltage to the second control line to set the third transistor element to a non-conducting state, after the initial state setting action, apply a pulse having a voltage amplitude to the second control line to give a change in voltage by a capacitive coupling through the first capacitor element to the one terminal of the first capacitor element, so that when a voltage of the internal node is in the first voltage state, since the second transistor element is set to a non-conducting state, the change in voltage is not suppressed and the first transistor element is set to a conducting state, and when the voltage of the internal node is in the second voltage state, since the second transistor element is set to a conducting state, the change in voltage is suppressed and the first transistor element is set to a non-conducting state, and, thereafter, apply a fourth voltage to the first control line to set the second transistor element to a non-conducting state regardless of a voltage state of the internal node, thereafter, the scanning signal line drive circuit is configured to apply a scanning voltage pulse to all the scanning signal lines connected to the plurality of pixel circuits targeted by the self-polarity-inverting action to temporarily set the fourth transistor element to a conducting state, thereafter, returns the fourth transistor element to a non-conducting state, the counter electrode voltage supply circuit is configured to change the voltage applied to the counter electrode between the two voltage states after the second transistor element is set to a non-conducting state until the scanning signal line drive circuit ends application of the scanning voltage pulse, the control line drive circuit is configured to stop pulse application to the second control line at least after the scanning signal line drive circuit ends the application of the scanning voltage pulse, and the data signal line drive circuit is configured to,
apply a fifth voltage in the first voltage state, at least while the scanning signal line drive circuit applies the scanning voltage pulse, to all the data signal lines connected to the plurality of pixel circuits targeted by the self-polarity-inverting action, and apply a sixth voltage in the second voltage state to all the data signal lines connected to the plurality of pixel circuits targeted by the self-polarity-inverting action for at least a partial period immediately before the control line drive circuit ends the pulse application to the second control line.

22. The display device according to claim 8, wherein
the pixel circuit has a configuration in which the other terminal of the first capacitor element is connected to the third control line,
the unit display element is configured by a liquid crystal display element including a pixel electrode, a counter electrode, and a liquid crystal layer interposed between the pixel electrode and the counter electrode,
in the display element unit, the internal node is connected to the pixel electrode directly or through a voltage amplifier, and
a counter electrode voltage supply circuit configured to supply a voltage to the counter electrode is arranged,
in a self-polarity-inverting action to operate the first switch circuits, the second switch circuits, and the control circuits to simultaneously invert polarities of voltages applied across the pixel electrodes and the counter electrodes in the plurality of pixel circuits, and as an initial state setting action performed before the self-polarity-inverting action is started,
the scanning signal line drive circuit is configured to apply a voltage to the scanning signal lines connected to all the pixel circuits in the pixel circuit array to set the fourth transistor element to a non-conducting state,
the control line drive circuit is configured to,
apply a first voltage to the first control line to generate a voltage difference at the one terminal of the first capacitor element depending on whether a voltage state of binary pixel data held by the internal node is in a first voltage state or a second voltage state,
apply a second voltage to set the third transistor element to a non-conducting state to the second control line, and
applies a initial voltage to the third control line, after the initial state setting action, the control line drive circuit is configured to,
apply a pulse having a voltage amplitude to the third control line to give a change in voltage by a capacitive coupling through the first capacitor element to the one terminal of the first capacitor element, so that when a voltage of the internal node is in the first voltage state, since the second transistor element is set to a non-conducting state, the change in voltage is not suppressed and the first transistor element is set to a conducting state, and when the voltage of the internal node is in the second voltage state, since the second transistor element is set to a conducting state, the change in voltage is suppressed and the first transistor element is set to a non-conducting state, and
thereafter, apply a third voltage to the first control line to set the second transistor element to a non-conducting state regardless of the voltage state of the internal node,
thereafter, the scanning signal line drive circuit is configured to apply a scanning voltage pulse to all the scanning signal lines connected to the plurality of pixel circuits targeted by the self-polarity-inverting action to temporarily set the fourth transistor element to a conducting state, thereafter, returns the fourth transistor element to a non-conducting state,
the counter electrode voltage supply circuit is configured to change the voltage applied to the counter electrode between the two voltage states after the second transistor element is set to a non-conducting state until the scanning signal line drive circuit ends application of the scanning voltage pulse,
the control line drive circuit, at least for a period when the scanning signal line drive circuit applies the scanning voltage pulse and a period after the pulse application is ended, is configured to,
apply a fourth voltage to the second control line to set the third transistor element to a conducting state, and
thereafter, stop the pulse application to the third control line, and the data signal line drive circuit is configured to,
apply a fifth voltage in the first voltage state, at least while the scanning signal line drive circuit applies the scanning voltage pulse, to all the data signal lines connected to the plurality of pixel circuits targeted by the self-polarity-inverting action, and
apply a sixth voltage in the second voltage state to all the data signal lines connected to the plurality of pixel circuits targeted by the self-polarity-inverting action for at least a partial period immediately before the control line drive circuit ends the application of the fourth voltage to set the third transistor element to a conducting state to the second control line.

23. The display device according to claim 8, wherein
the pixel circuit has a configuration in which the other terminal of the first capacitor element is connected to the third control line,
the unit display element is configured by a liquid crystal display element including a pixel electrode, a counter electrode, and a liquid crystal layer interposed between the pixel electrode and the counter electrode,
in the display element unit, the internal node is connected to the pixel electrode directly or through a voltage amplifier, and
a counter electrode voltage supply circuit configured to supply a voltage to the counter electrode is arranged,
in a self-polarity-inverting action to operate the first switch circuits, the second switch circuits, and the control circuits to simultaneously invert polarities of voltages applied across the pixel electrodes and the counter electrodes in the plurality of pixel circuits, and
as an initial state setting action performed before the self-polarity-inverting action is started,
the scanning signal line drive circuit is configured to apply a first voltage to the scanning signal lines connected to all the pixel circuits in the pixel circuit array to set the fourth transistor element to a non-conducting state,
the control line drive circuit is configured to,
apply a second voltage to the first control line to generate a voltage difference at the one terminal of the first capacitor element depending on whether a voltage state of binary pixel data held by the internal node is in a first voltage state or a second voltage state,
apply a third voltage to set the third transistor element to a non-conducting state to the second control line, and
apply a initial voltage to the third control line, after the initial state setting action, the control line drive circuit is configured to,
apply a pulse having a voltage amplitude to the second control line and the third control line to give a change in voltage by a capacitive coupling through the first capacitor element to the one terminal of the first capacitor element, so that when a voltage of the internal node is in the first voltage state, since the second transistor element is set to a non-conducting state, the change in voltage is not suppressed and the first transistor element is set to a conducting state, and when the voltage of the internal node is in the second voltage state, since the second transistor element is set to a conducting state, the change in voltage is suppressed and the first transistor element is set to a non-conducting state, and
thereafter, apply a fourth voltage to the first control line to set the second transistor element to a non-conducting state regardless of the voltage state of the internal node,
thereafter, the scanning signal line drive circuit is configured to apply a scanning voltage pulse to all the scanning signal lines connected to the plurality of pixel circuits targeted by the self-polarity-inverting action to temporarily set the fourth transistor element to a conducting state, thereafter, returns the fourth transistor element to a non-conducting state,
the counter electrode voltage supply circuit is configured to change the voltage applied to the counter electrode between the two voltage states after the second transistor element is set to a non-conducting state until the scanning signal line drive circuit ends application of the scanning voltage pulse,
the control line drive circuit is configured to stop pulse application to the second control line and the third control line at least after the scanning signal line drive circuit ends the application of the voltage pulse, and
the data signal line drive circuit is configured to,
apply a fifth voltage in the first voltage state, at least while the scanning signal line drive circuit applies the scanning voltage pulse, to all the data signal lines connected to the plurality of pixel circuits targeted by the self-polarity-inverting action, and
apply a sixth voltage in the second voltage state to all the data signal lines connected to the plurality of pixel circuits targeted by the self-polarity-inverting action for at least a partial period immediately before the control line drive circuit ends the pulse applications to the second control line and the third control line.

24. The display device according to claim 8, wherein
the pixel circuit has a configuration in which the other terminal of the first capacitor element is connected to the second control line,
the unit display element is configured by a liquid crystal display element including a pixel electrode, a counter electrode, and a liquid crystal layer interposed between the pixel electrode and the counter electrode,
in the display element unit, the internal node is connected to the pixel electrode directly or through a voltage amplifier, and
a counter electrode voltage supply circuit configured to supply a voltage to the counter electrode is arranged,
in a self-polarity-inverting action to operate the first switch circuits, the second switch circuits, and the control circuits to simultaneously invert polarities of voltages applied across the pixel electrodes and the counter electrodes in the plurality of pixel circuits, and
as an initial state setting action performed before the self-polarity-inverting action is started,
the scanning signal line drive circuit is configured to apply a first voltage to the scanning signal lines connected to all the pixel circuits in the pixel circuit array to set the fourth transistor element to a non-conducting state,
the control line drive circuit is configured to,
apply a second voltage to the first control line to generate a voltage difference at the one terminal of the first capacitor element depending on whether a voltage state of binary pixel data held by the internal node is in a first voltage state or a second voltage state, and
apply a third voltage to the second control line to set the third transistor element to a non-conducting state,
after the initial state setting action, the control line drive circuit is configured to,
apply a pulse having a voltage amplitude to the second control line to give a change in voltage by a capacitive coupling through the first capacitor element to the one terminal of the first capacitor element, so that when a voltage of the internal node is in the first voltage state, since the second transistor element is set to a non-conducting state, the change in voltage is not suppressed and the first transistor element is set to a conducting state, and when the voltage of the internal node is in the second voltage state, since the second transistor element is set to a conducting state, the change in voltage is suppressed and the first transistor element is set to a non-conducting state, and, thereafter, apply a fourth voltage to the first control line to set the second transistor element to a non-conducting state regardless of the voltage state of the internal node, thereafter, the scanning signal line drive circuit is configured to apply a scanning voltage pulse to all the scanning signal lines connected to the plurality of pixel circuits targeted by the self-polarity-inverting action to temporarily set the fourth transistor element to a conducting state, thereafter, returns the fourth transistor element to a non-conducting state, the counter electrode voltage supply circuit is configured to change the voltage applied to the counter electrode between the two voltage states after the second transistor element is set to a non-conducting state until the scanning signal line drive circuit ends application of the scanning voltage pulse, the control line drive circuit is configured to stop pulse application to the second control line at least after the scanning signal line drive circuit ends the application of the scanning voltage pulse, and the data signal line drive circuit is configured to,
apply a fifth voltage in the first voltage state, at least while the scanning signal line drive circuit applies the scanning voltage pulse, to all the data signal lines connected to the plurality of pixel circuits targeted by the self-polarity-inverting action, and apply a sixth voltage in the second voltage state to all the data signal lines connected to the plurality of pixel circuits targeted by the self-polarity-inverting action for at least a partial period immediately before the control line drive circuit ends the pulse application to the second control line.

25. The display device according to claim 7, wherein
the pixel circuit has a configuration in which the other terminal of the first capacitor element is connected to the third control line, the unit display element is configured by a liquid crystal display element including a pixel electrode, a counter electrode, and a liquid crystal layer interposed between the pixel electrode and the counter electrode, in the display element unit, the internal node is connected to the pixel electrode directly or through a voltage amplifier, and a counter electrode voltage supply circuit configured to supply a voltage to the counter electrode is arranged,
in a self-polarity-inverting action to operate the first switch circuits, the second switch circuits, and the control circuits to simultaneously invert polarities of voltages applied across the pixel electrodes and the counter electrodes in the plurality of pixel circuits, and as an initial state setting action performed before the self-polarity-inverting action is started, the scanning signal line drive circuit is configured to apply a first voltage to the scanning signal lines connected to all the pixel circuits in the pixel circuit array to set the fourth transistor element to a non-conducting state, the control line drive circuit is configured to,
apply a second voltage to the first control line to set the second transistor element to a conducting state regardless of whether the internal node is set in the first voltage state or the second voltage state, apply a third voltage to the second control line to set the third transistor element to a non-conducting state, and
apply a initial voltage to the third control line, after the initial state setting action, the control line drive circuit is configured to apply a fourth voltage to the first control line to set the second transistor element to a non-conducting state regardless of whether the internal node is set in the first voltage state or the second voltage state, thereafter, the scanning signal line drive circuit is configured to apply a scanning voltage pulse to all the scanning signal lines connected to the plurality of pixel circuits targeted by the self-polarity-inverting action to temporarily set the fourth transistor element to a conducting state, thereafter, returns the fourth transistor element to a non-conducting state, the counter electrode voltage supply circuit is configured to change the voltage applied to the counter electrode between the two voltage states after the second transistor element is set to a non-conducting state until the scanning signal line drive circuit ends application of the scanning voltage pulse, the control line drive circuit, for at least a period after the scanning signal line drive circuit ends application of the scanning voltage pulse, apply a fifth voltage to the second control line to set the third transistor element to a conducting state, and the data signal line drive circuit is configured to,
apply a sixth in the first voltage state, at least while the scanning signal line drive circuit applies the scanning voltage pulse, to all the data signal lines connected to the plurality of pixel circuits targeted by the self-polarity-inverting action, and apply a seventh in the second voltage state to all the data signal lines connected to the plurality of pixel circuits targeted by the self-polarity-inverting action for at least a partial period immediately before the control line drive circuit ends the application of the voltage to set the third transistor element to a conducting state to the second control line.

26. The display device according to claim 8, wherein
the pixel circuit has a configuration in which the other terminal of the first capacitor element is connected to the third control line, the unit display element is configured by a liquid crystal display element including a pixel electrode, a counter electrode, and a liquid crystal layer interposed between the pixel electrode and the counter electrode, in the display element unit, the internal node is connected to the pixel electrode directly or through a voltage amplifier, and a counter electrode voltage supply circuit configured to supply a voltage to the counter electrode is arranged,
in a self-polarity-inverting action to operate the first switch circuits, the second switch circuits, and the control circuits to simultaneously invert polarities of voltages applied across the pixel electrodes and the counter electrodes in the plurality of pixel circuits, and as an initial state setting action performed before the self-polarity-inverting action is started, the scanning signal line drive circuit is configured to apply a first voltage to the scanning signal lines connected to all the pixel circuits in the pixel circuit array to set the fourth transistor element to a non-conducting state, the control line drive circuit is configured to
apply a second voltage to the first control line to set the second transistor element to a conducting state regardless of whether the internal node is set in the first voltage state or the second voltage state, apply a third to the second control line to set the third transistor element to a non-conducting state, and apply an initial voltage to the third control line, after the initial state setting action, the control line drive circuit is configured to apply a fourth voltage to the first control line to set the second transistor element to a non-conducting state regardless of whether the internal node is set in the first voltage state or the second voltage state, thereafter, the scanning signal line drive circuit is configured to apply a scanning voltage pulse to all the scanning signal lines connected to the plurality of pixel circuits targeted by the self-polarity-inverting action to temporarily set the fourth transistor element to a conducting state, thereafter, returns the fourth transistor element to a non-conducting state, the counter electrode voltage supply circuit is configured to change the voltage applied to the counter electrode between the two voltage states after the second transistor element is set to a non-conducting state until the scanning signal line drive circuit ends application of the scanning voltage pulse, the control line drive circuit, for at least a period from when the scanning signal line drive circuit applies the scanning voltage pulse to when the scanning signal line drive circuit ends the application of the pulse, is configured to apply a fifth voltage to the second control line to set the third transistor element to a conducting state, and the data signal line drive circuit is configured to apply a sixth voltage in the first voltage state, at least while the scanning signal line drive circuit applies the scanning voltage pulse, to all the data signal lines connected to the plurality of pixel circuits targeted by the self-polarity-inverting action, and apply a seventh voltage in the second voltage state to all the data signal lines connected to the plurality of pixel circuits targeted by the self-polarity-inverting action for at least a partial period immediately before the control line drive circuit ends the application of the fifth voltage to set the third transistor element to a conducting state to the second control line.

27. The display device according to claim 19, wherein in a case where the pixel circuit includes a second capacitor element having one terminal connected to the internal node and the other terminal connected, to a fixed voltage line, after the scanning signal line drive circuit ends application of the scanning voltage pulse, a variation in voltage of the internal node caused when the application of the voltage pulse is ended is compensated for by adjusting a voltage of the fixed voltage line.

* * * * *